(12) United States Patent
Villanueva Gaviola et al.

(10) Patent No.:  US 12,619,705 B2
(45) Date of Patent:  May 5, 2026

(54) DIGITAL IDENTIFICATION CREDENTIAL USER INTERFACES

(71) Applicant: Apple Inc., Cupertino, CA (US)

(72) Inventors: Haya Iris Villanueva Gaviola, San Jose, CA (US); Antonio A. Allen, San Jose, CA (US); Mayura D. Deshpande, San Carlos, CA (US); Thomas John Miller, San Jose, CA (US); Policarpo Bonilla Wood, Jr., San Jose, CA (US); Ho Cheung Chung, San Jose, CA (US); Gianpaolo Fasoli, Burlingame, CA (US); Vinay Ganesh, San Jose, CA (US); Irene M. Graff, Cupertino, CA (US); Martijn Theo Haring, Utrecht (NL); Ahmer A. Khan, San Jose, CA (US); Franck Farian Rakotomalala, Apex, NC (US); Gordon Scott, Cupertino, CA (US); Christopher Sharp, Fort Myers, FL (US); David W. Silver, Los Altos, CA (US); Ka Yang, Palo Alto, CA (US); Ryan H. Depaola, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 17/951,818

(22) Filed: Sep. 23, 2022

(65) Prior Publication Data

US 2024/0104188 A1      Mar. 28, 2024

Related U.S. Application Data

(63) Continuation of application No. 17/485,098, filed on Sep. 24, 2021, now Pat. No. 11,526,591.

(60) Provisional application No. 63/197,432, filed on Jun. 6, 2021.

(51) Int. Cl.
G06F 21/45          (2013.01)

(52) U.S. Cl.
CPC .................................... G06F 21/45 (2013.01)

(58) Field of Classification Search
CPC ...................................................... G06F 21/45
USPC .......................................................... 726/19
See application file for complete search history.

(56) References Cited

U.S. PATENT DOCUMENTS

| 2,013,027 | A  | 9/1935 | Branch |
| 8,353,448 | B1 | 1/2013 | Miller et al. |
| 8,381,969 | B1 | 2/2013 | Miller et al. |
| 8,466,875 | B2 | 6/2013 | Nakada et al. |
| 8,720,771 | B2 | 5/2014 | Mackinnon Keith |
| 8,827,153 | B1 | 9/2014 | Rhoades et al. |

(Continued)

FOREIGN PATENT DOCUMENTS

| AU | 2021100511 A4 | 4/2021 |
| AU | 2021213717 A1 | 2/2022 |

(Continued)

OTHER PUBLICATIONS

Advisory Action received for U.S. Appl. No. 17/485,086, mailed on Sep. 9, 2022, 5 pages.

(Continued)

*Primary Examiner* — Linglan Edwards
*Assistant Examiner* — Phuc Pham
(74) *Attorney, Agent, or Firm* — YHE Law LLP

(57)          ABSTRACT

The present disclosure generally relates to digital identification credential user interfaces.

51 Claims, 40 Drawing Sheets

(56)　　　　References Cited

U.S. PATENT DOCUMENTS

| | | |
|---|---|---|
| 8,943,187 B1 | 1/2015 | Saylor |
| 9,324,067 B2 | 4/2016 | Van Os et al. |
| 9,348,492 B1 | 5/2016 | Penilla et al. |
| 9,485,251 B2 | 11/2016 | White et al. |
| 9,608,970 B1 | 3/2017 | Gehret et al. |
| 9,961,408 B2 | 5/2018 | Mickelsen et al. |
| 10,032,100 B2 | 7/2018 | Mullen et al. |
| 10,057,227 B1 | 8/2018 | Hess et al. |
| 10,108,909 B2 | 10/2018 | Sulavik et al. |
| 10,163,105 B1 | 12/2018 | Ziraknejad et al. |
| 10,164,975 B1 | 12/2018 | Son et al. |
| 10,192,217 B1 | 1/2019 | Ellis et al. |
| 10,223,631 B2 | 3/2019 | Mullen et al. |
| 10,234,953 B1 | 3/2019 | Li et al. |
| 10,242,351 B1 | 3/2019 | Wilson et al. |
| 10,255,545 B2 | 4/2019 | Mullen et al. |
| 10,275,958 B2 | 4/2019 | Gehret et al. |
| 10,282,727 B2 | 5/2019 | Van Os et al. |
| 10,332,104 B2 | 6/2019 | Prakash et al. |
| 10,339,521 B1 | 7/2019 | Bodkin et al. |
| 10,366,387 B2 | 7/2019 | Aabye et al. |
| 10,373,395 B1 | 8/2019 | Harned et al. |
| 10,503,912 B1 | 12/2019 | Kerr |
| 10,621,575 B1 | 4/2020 | Belleville et al. |
| 10,701,067 B1 | 6/2020 | Ziraknejad et al. |
| 10,769,625 B2 | 9/2020 | Pandiarajan et al. |
| 10,776,779 B1 | 9/2020 | Ellis et al. |
| 10,803,400 B2 | 10/2020 | Sindia et al. |
| 10,853,791 B1 | 12/2020 | Ellis et al. |
| 10,878,437 B2 | 12/2020 | Ye et al. |
| 11,026,085 B2 | 6/2021 | Grange |
| 11,080,700 B2 | 8/2021 | Ortiz et al. |
| 11,127,013 B1 | 9/2021 | Boyd et al. |
| 11,134,294 B2 | 9/2021 | Lee et al. |
| 11,157,918 B1 | 10/2021 | Ellison et al. |
| 11,182,774 B1 | 11/2021 | Boyd et al. |
| 11,206,544 B2 | 12/2021 | Boyd et al. |
| 11,312,207 B1 | 4/2022 | Sanders et al. |
| 11,488,140 B2 | 11/2022 | Bhuptani et al. |
| 11,615,199 B1* | 3/2023 | Poder ................. G06F 21/6218 726/6 |
| 11,748,507 B2 | 9/2023 | Cool et al. |
| 2002/0120867 A1 | 8/2002 | Mitchell et al. |
| 2005/0074126 A1 | 4/2005 | Stanko |
| 2005/0099275 A1 | 5/2005 | Kamdar et al. |
| 2005/0177867 A1 | 8/2005 | Toutonghi |
| 2006/0255906 A1 | 11/2006 | Ghabra et al. |
| 2008/0041936 A1 | 2/2008 | Vawter |
| 2008/0048022 A1 | 2/2008 | Vawter |
| 2008/0214150 A1 | 9/2008 | Ramer et al. |
| 2009/0320125 A1 | 12/2009 | Pleasant et al. |
| 2010/0026503 A1 | 2/2010 | Proefke et al. |
| 2010/0075656 A1 | 3/2010 | Howarter et al. |
| 2011/0077983 A1 | 3/2011 | Hua et al. |
| 2011/0113363 A1 | 5/2011 | Hunt et al. |
| 2011/0126003 A1 | 5/2011 | Engert |
| 2011/0131494 A1 | 6/2011 | Ono et al. |
| 2011/0165859 A1 | 7/2011 | Wengrovitz |
| 2011/0202988 A1 | 8/2011 | Otranen et al. |
| 2011/0231911 A1 | 9/2011 | White et al. |
| 2011/0282785 A1 | 11/2011 | Chin |
| 2012/0129493 A1 | 5/2012 | Vasudevan |
| 2012/0200390 A1 | 8/2012 | Saravanan |
| 2012/0323664 A1 | 12/2012 | Klems |
| 2013/0024371 A1 | 1/2013 | Hariramani et al. |
| 2013/0046600 A1 | 2/2013 | Coppinger |
| 2013/0073459 A1 | 3/2013 | Zacarias et al. |
| 2013/0099892 A1 | 4/2013 | Tucker et al. |
| 2013/0263211 A1 | 10/2013 | Neuman et al. |
| 2013/0275008 A1 | 10/2013 | Breed |
| 2013/0304642 A1 | 11/2013 | Campos |
| 2014/0047331 A1 | 2/2014 | Feldman et al. |
| 2014/0129053 A1 | 5/2014 | Kleve et al. |
| 2014/0244494 A1 | 8/2014 | Davis et al. |
| 2014/0244495 A1 | 8/2014 | Davis et al. |
| 2014/0244514 A1 | 8/2014 | Rodriguez et al. |
| 2014/0258110 A1 | 9/2014 | Davis et al. |
| 2014/0279519 A1 | 9/2014 | Mattes et al. |
| 2014/0304173 A1 | 10/2014 | Ernsdorff |
| 2014/0365466 A1 | 12/2014 | Chu et al. |
| 2015/0053757 A1 | 2/2015 | Williams et al. |
| 2015/0074774 A1 | 3/2015 | Nema et al. |
| 2015/0081346 A1 | 3/2015 | Charles |
| 2015/0178721 A1 | 6/2015 | Pandiarajan et al. |
| 2015/0210287 A1 | 7/2015 | Penilla et al. |
| 2015/0271175 A1 | 9/2015 | Je et al. |
| 2015/0278780 A1 | 10/2015 | Vaidyanathan et al. |
| 2015/0294515 A1 | 10/2015 | Bergdale et al. |
| 2015/0324791 A1 | 11/2015 | Khan |
| 2015/0348001 A1 | 12/2015 | Van Os et al. |
| 2016/0018525 A1 | 1/2016 | Lanzagorta |
| 2016/0050193 A1 | 2/2016 | Kanov et al. |
| 2016/0055511 A1 | 2/2016 | Chidella et al. |
| 2016/0057138 A1 | 2/2016 | Hoyos et al. |
| 2016/0070447 A1 | 3/2016 | Righter et al. |
| 2016/0072794 A1 | 3/2016 | Engert |
| 2016/0078143 A1 | 3/2016 | Huang et al. |
| 2016/0078581 A1 | 3/2016 | Maher |
| 2016/0134599 A1 | 5/2016 | Ross et al. |
| 2016/0180332 A1 | 6/2016 | Wilczynski |
| 2016/0232518 A1 | 8/2016 | Butler et al. |
| 2016/0252978 A1 | 9/2016 | Yoo et al. |
| 2016/0259497 A1* | 9/2016 | Foss ..................... G06F 3/0488 |
| 2016/0294831 A1 | 10/2016 | Borunda et al. |
| 2016/0295005 A1 | 10/2016 | Schussmann et al. |
| 2016/0300054 A1 | 10/2016 | Turgeman et al. |
| 2016/0357752 A1 | 12/2016 | Yang et al. |
| 2016/0373458 A1 | 12/2016 | Moreton et al. |
| 2017/0032485 A1 | 2/2017 | Vemury |
| 2017/0053470 A1 | 2/2017 | Bergerhoff et al. |
| 2017/0091765 A1 | 3/2017 | Lloyd et al. |
| 2017/0103388 A1* | 4/2017 | Pillai ................. G06Q 20/3823 |
| 2017/0109901 A1 | 4/2017 | Raj |
| 2017/0120864 A1 | 5/2017 | Fischer et al. |
| 2017/0124312 A1 | 5/2017 | Inoue |
| 2017/0140642 A1 | 5/2017 | Kim |
| 2017/0151928 A1 | 6/2017 | Kang et al. |
| 2017/0169528 A1 | 6/2017 | Kundu et al. |
| 2017/0193001 A1 | 7/2017 | Agrawal et al. |
| 2017/0213211 A1 | 7/2017 | Sibert et al. |
| 2017/0243200 A1 | 8/2017 | Vaidyanathan et al. |
| 2017/0248946 A1 | 8/2017 | Ogura et al. |
| 2017/0249791 A1 | 8/2017 | Woo et al. |
| 2017/0286648 A1 | 10/2017 | Yamaguchi et al. |
| 2017/0286656 A1 | 10/2017 | Kohli |
| 2017/0337542 A1 | 11/2017 | Kim et al. |
| 2017/0339151 A1 | 11/2017 | Van Os et al. |
| 2017/0343200 A1 | 11/2017 | Lai et al. |
| 2017/0357520 A1 | 12/2017 | De Vries et al. |
| 2017/0357973 A1 | 12/2017 | Van Os et al. |
| 2018/0006719 A1 | 1/2018 | Cress et al. |
| 2018/0013769 A1 | 1/2018 | Robinson et al. |
| 2018/0018595 A1 | 1/2018 | Scott et al. |
| 2018/0018664 A1 | 1/2018 | Purves et al. |
| 2018/0029560 A1 | 2/2018 | Mohaupt et al. |
| 2018/0033034 A1 | 2/2018 | Ye et al. |
| 2018/0041503 A1 | 2/2018 | Lindemann |
| 2018/0103414 A1 | 4/2018 | Golsch |
| 2018/0108031 A1 | 4/2018 | Jones et al. |
| 2018/0130044 A1 | 5/2018 | Gage et al. |
| 2018/0165655 A1 | 6/2018 | Marcelle et al. |
| 2018/0165676 A1 | 6/2018 | Bhatt et al. |
| 2018/0167387 A1 | 6/2018 | Bhatt et al. |
| 2018/0186333 A1 | 7/2018 | Santiano et al. |
| 2018/0191501 A1 | 7/2018 | Lindemann |
| 2018/0195874 A1 | 7/2018 | Andrew et al. |
| 2018/0198909 A1 | 7/2018 | Milstein |
| 2018/0260553 A1 | 9/2018 | Hoyos et al. |
| 2018/0265095 A1 | 9/2018 | Joe et al. |
| 2018/0276657 A1 | 9/2018 | Cho et al. |
| 2018/0322488 A1 | 11/2018 | Arana et al. |
| 2018/0335928 A1 | 11/2018 | Van Os et al. |
| 2018/0338327 A1 | 11/2018 | Wallace et al. |
| 2018/0349581 A1* | 12/2018 | Ramalingam ......... H04L 63/205 |

(56) References Cited

U.S. PATENT DOCUMENTS

| | | |
|---|---|---|
| 2018/0357846 A1 | 12/2018 | Chen |
| 2018/0367946 A1 | 12/2018 | Best |
| 2019/0043148 A1 | 2/2019 | Vemury |
| 2019/0057412 A1 | 2/2019 | Bhattacharjee et al. |
| 2019/0061687 A1 | 2/2019 | Khalil |
| 2019/0080070 A1 | 3/2019 | Van Os et al. |
| 2019/0080189 A1 | 3/2019 | Van Os et al. |
| 2019/0092279 A1 | 3/2019 | Jarvis et al. |
| 2019/0163876 A1 | 5/2019 | Remme et al. |
| 2019/0164165 A1 | 5/2019 | Ithabathula |
| 2019/0168036 A1 | 6/2019 | Conboy |
| 2019/0168410 A1 | 6/2019 | Conboy |
| 2019/0171998 A1 | 6/2019 | Conboy |
| 2019/0172149 A1 | 6/2019 | Conboy |
| 2019/0172161 A1 | 6/2019 | Conboy |
| 2019/0180021 A1 | 6/2019 | Mukundala |
| 2019/0197527 A1 | 6/2019 | Agarwalla et al. |
| 2019/0213525 A1 | 7/2019 | Haci et al. |
| 2019/0220662 A1 | 7/2019 | Shenouda Dawoud |
| 2019/0263356 A1 | 8/2019 | Golsch et al. |
| 2019/0287111 A1 | 9/2019 | Cvetkovich et al. |
| 2019/0304216 A1 | 10/2019 | Mendelson et al. |
| 2019/0305949 A1 | 10/2019 | Hamel et al. |
| 2019/0327228 A1 | 10/2019 | Pantfoerder et al. |
| 2019/0355191 A1* | 11/2019 | Jones .................. H04B 5/77 |
| 2019/0364020 A1 | 11/2019 | Wardell et al. |
| 2019/0370781 A1 | 12/2019 | Van Os et al. |
| 2019/0373320 A1 | 12/2019 | Balsamo |
| 2020/0020196 A1 | 1/2020 | Petersen et al. |
| 2020/0029173 A1 | 1/2020 | Pang et al. |
| 2020/0052905 A1 | 2/2020 | Mathias et al. |
| 2020/0065822 A1 | 2/2020 | Lin et al. |
| 2020/0079320 A1 | 3/2020 | Lacoss-Arnold |
| 2020/0125223 A1 | 4/2020 | Fu |
| 2020/0126052 A1 | 4/2020 | Deliwala et al. |
| 2020/0211031 A1 | 7/2020 | Patil |
| 2020/0254875 A1 | 8/2020 | Strandberg |
| 2020/0269811 A1 | 8/2020 | Kim et al. |
| 2020/0302519 A1 | 9/2020 | Van Os et al. |
| 2020/0320653 A1 | 10/2020 | Hastings et al. |
| 2020/0334429 A1 | 10/2020 | Singal et al. |
| 2020/0349244 A1 | 11/2020 | Kim et al. |
| 2020/0387686 A1 | 12/2020 | Jhang et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0049021 A1 | 2/2021 | De Jong et al. |
| 2021/0089635 A1 | 3/2021 | Weeresinghe |
| 2021/0127233 A1 | 4/2021 | Santavicca et al. |
| 2021/0168602 A1 | 6/2021 | Kim et al. |
| 2021/0229630 A1 | 7/2021 | Kramar et al. |
| 2021/0266500 A1 | 8/2021 | Taylor et al. |
| 2021/0287768 A1 | 9/2021 | Craig et al. |
| 2021/0319468 A1 | 10/2021 | Zhu et al. |
| 2021/0319862 A1 | 10/2021 | Boyd et al. |
| 2021/0321263 A1 | 10/2021 | Boyd et al. |
| 2021/0326426 A1 | 10/2021 | Bouse |
| 2021/0373744 A1 | 12/2021 | Miller et al. |
| 2021/0373745 A1 | 12/2021 | Chang |
| 2021/0374714 A1 | 12/2021 | Chang |
| 2021/0374750 A1 | 12/2021 | Miller et al. |
| 2021/0377742 A1 | 12/2021 | Boyd et al. |
| 2021/0392053 A1 | 12/2021 | Singh |
| 2021/0392125 A1 | 12/2021 | Bryson |
| 2022/0011999 A1* | 1/2022 | Lovelock ................ G06F 3/147 |
| 2022/0014353 A1 | 1/2022 | Lim et al. |
| 2022/0076261 A1 | 3/2022 | Rule et al. |
| 2022/0135001 A1 | 5/2022 | Alsina et al. |
| 2022/0277295 A1 | 9/2022 | Robinson-Morgan et al. |
| 2022/0332285 A1 | 10/2022 | Sanders et al. |
| 2022/0365643 A1 | 11/2022 | Triverio et al. |
| 2022/0391481 A1 | 12/2022 | Villanueva Gaviola et al. |
| 2022/0391482 A1 | 12/2022 | Villanueva Gaviola et al. |
| 2023/0039942 A1 | 2/2023 | Young et al. |
| 2023/0045850 A1 | 2/2023 | Sammoura et al. |
| 2023/0089689 A1 | 3/2023 | Pons Bordes et al. |
| 2023/0234537 A1 | 7/2023 | Kramar et al. |
| 2023/0259726 A1 | 8/2023 | Singal et al. |
| 2023/0394128 A1 | 12/2023 | Gaviola |
| 2023/0394899 A1 | 12/2023 | Young |
| 2024/0036713 A1 | 2/2024 | Chang |
| 2024/0147243 A1 | 5/2024 | Gaviola et al. |
| 2024/0198960 A1 | 6/2024 | Kramar et al. |
| 2024/0253419 A1 | 8/2024 | Sanders et al. |
| 2024/0403481 A1 | 12/2024 | V. Gaviola et al. |
| 2025/0142343 A1 | 5/2025 | Villanueva Gaviola et al. |
| 2025/0196805 A1 | 6/2025 | Kramar et al. |
| 2025/0217466 A1 | 7/2025 | Pons Bordes et al. |
| 2025/0263046 A1 | 8/2025 | Alsina |
| 2025/0356710 A1 | 11/2025 | Young |
| 2025/0376129 A1 | 12/2025 | Young et al. |

FOREIGN PATENT DOCUMENTS

| | | | |
|---|---|---|---|
| CN | 101689188 A | 3/2010 | |
| CN | 101884188 A | 11/2010 | |
| CN | 103635923 A | 3/2014 | |
| CN | 103886460 A | 6/2014 | |
| CN | 104823383 A | 8/2015 | |
| CN | 105099694 A | 11/2015 | |
| CN | 105190659 A | 12/2015 | |
| CN | 105321067 A | 2/2016 | |
| CN | 105338066 A | 2/2016 | |
| CN | 105787755 A | 7/2016 | |
| CN | 106157125 A | 11/2016 | |
| CN | 106453341 A | 2/2017 | |
| CN | 107609865 A | 1/2018 | |
| CN | 108064393 A | 5/2018 | |
| CN | 109353309 A | 2/2019 | |
| CN | 109583876 A | 4/2019 | |
| CN | 109949120 A | 6/2019 | |
| CN | 110086609 A | 8/2019 | |
| CN | 110135872 A | 8/2019 | |
| CN | 110197059 A | 9/2019 | |
| CN | 112819475 A | 5/2021 | |
| EP | 2981115 A2 | 2/2016 | |
| EP | 3460692 A1 | 3/2019 | |
| EP | 3476670 A1 | 5/2019 | |
| EP | 3926888 A1 | 12/2021 | |
| JP | 2004-213362 A | 7/2004 | |
| JP | 2010-86327 A | 4/2010 | |
| JP | 2012-508930 A | 4/2012 | |
| JP | 2013-37568 A | 2/2013 | |
| JP | 2013-257878 A | 12/2013 | |
| JP | 2014-44719 A | 3/2014 | |
| JP | 2016-133969 A | 7/2016 | |
| JP | 2016-526211 A | 9/2016 | |
| JP | 2017-517788 A | 6/2017 | |
| JP | 2018-501680 A | 1/2018 | |
| JP | 2018-136886 A | 8/2018 | |
| JP | 2018-156283 | 10/2018 | |
| JP | 2019-46122 A | 3/2019 | |
| JP | 2019-95880 A | 6/2019 | |
| JP | 2019-149167 A | 9/2019 | |
| JP | 2019-191753 A | 10/2019 | |
| JP | 2019-197332 A | 11/2019 | |
| JP | 2019-535931 A | 12/2019 | |
| KR | 10-2013-0035286 A | 4/2013 | |
| KR | 10-2013-0131956 | 12/2013 | |
| KR | 10-1509596 | 4/2015 | |
| KR | 10-2015-0066892 | 6/2015 | |
| KR | 10-1684188 | 12/2016 | |
| KR | 10-2062919 B1 | 1/2020 | |
| KR | 10-2020-0108515 | 9/2020 | |
| WO | 2008/157016 A1 | 12/2008 | |
| WO | 2009/009788 A1 | 1/2009 | |
| WO | 2013/003210 A3 | 2/2013 | |
| WO | 2014/105162 A1 | 7/2014 | |
| WO | 2014/134180 A2 | 9/2014 | |
| WO | 2014/146186 A1 | 9/2014 | |
| WO | 2015/153154 | 10/2015 | |
| WO | 2015/184353 A1 | 12/2015 | |
| WO | 2015/194135 A1 | 12/2015 | |
| WO | 2016/128569 A1 | 8/2016 | |

(56)             References Cited

FOREIGN PATENT DOCUMENTS

| WO | 2016/196054 | A1 | 12/2016 |
| WO | 2016/196143 | A1 | 12/2016 |
| WO | 2017/078635 | A1 | 5/2017 |
| WO | 2017/218490 | A1 | 12/2017 |
| WO | 2018/048703 | A1 | 3/2018 |
| WO | 2018/071674 | | 4/2018 |
| WO | 2018/074504 | A1 | 4/2018 |
| WO | 2018/081317 | A1 | 5/2018 |
| WO | 2018/160863 | A1 | 9/2018 |
| WO | 2019/069129 | A1 | 4/2019 |
| WO | 2019/191213 | A1 | 10/2019 |
| WO | 2020/197694 | A1 | 10/2020 |
| WO | 2021/038298 | A2 | 3/2021 |

OTHER PUBLICATIONS

Applicant Initiated Interview Summary received for U.S. Appl. No. 17/485,086, mailed on Apr. 26, 2022, 2 pages.
Corrected Notice of Allowance received for U.S. Appl. No. 17/030,256, mailed on Nov. 9, 2022, 8 pages.
Final Office Action received for U.S. Appl. No. 17/030,260, mailed on Nov. 4, 2022, 39 pages.
Final Office Action received for U.S. Appl. No. 17/485,086, mailed on May 4, 2022, 21 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Office Action received for European Patent Application No. 21707473.1, mailed on Oct. 31, 2022, 7 pages.
Office Action received for Japanese Patent Application No. 2022-520133, mailed on Oct. 17, 2022, 4 pages (2 pages of English Translation and 2 pages of Official Copy).
August et al., "Mobile web searching", Bell Lab Technical Journal, vol. 6, No. 2, 2002, pp. 84-98.
Dahan et al., "Increasing Tera Grid User Productivity through Integration of Information and Interactive Services", IEEE, 2008, 11 pages.
Advisory Action received for U.S. Appl. No. 17/900,734, mailed on Mar. 21, 2024, 5 pages.
Office Action received for Chinese Patent Application No. 202180005556.8, mailed on Feb. 8, 2024, 16 pages (9 pages of English Translation and 7 pages of Official Copy).
Office Action received for European Patent Application No. 23165330.4, mailed on Mar. 18, 2024, 4 pages.
Summons to Attend Oral Proceedings received for European Patent Application No. 21707473.1, mailed on Mar. 22, 2024, 9 pages.
Applicant-Initiated Interview Summary received for U.S. Appl. No. 17/375,767, mailed on Dec. 22, 2023, 2 pages.
Final Office Action received for U.S. Appl. No. 17/222,568, mailed on Dec. 14, 2023, 92 pages.
International Preliminary Report on Patentability received for PCT Patent Application No. PCT/US2022/030567, mailed on Dec. 21, 2023, 18 pages.
Notice of Allowance received for Japanese Patent Application No. 2022-573404, mailed on Dec. 11, 2023, 4 pages (1 page of English Translation and 3 pages of Official Copy).
Office Action received for Japanese Patent Application No. 2023-528157, mailed on Dec. 8, 2023, 4 pages (2 pages of English Translation and 2 pages of Official Copy).
Office Action received for Korean Patent Application No. 10-2023-7033718, mailed on Dec. 4, 2023, 5 pages (2 pages of English Translation and 3 pages of Official Copy).
Applicant-Initiated Interview Summary received for U.S. Appl. No. 17/900,734, mailed on Nov. 20, 2023, 4 pages.
Corrected Notice of Allowance received for U.S. Appl. No. 17/398,723, mailed on Nov. 15, 2023, 12 pages.
Corrected Notice of Allowance received for U.S. Appl. No. 18/128,775, mailed on Nov. 17, 2023, 2 pages.

Office Action received for Australian Patent Application No. 2023200021, mailed on Nov. 1, 2023, 3 pages.
Office Action received for Korean Patent Application No. 10-2021-0182662, mailed on Oct. 26, 2023, 13 pages (6 pages of English Translation and 7 pages of Official Copy).
Notice of Acceptance received for Australian Patent Application No. 2023200021, mailed on Jul. 22, 2024, 3 pages.
Notice of Allowance received for Japanese Patent Application No. 2023-168764, mailed on Jul. 26, 2024, 4 pages (1 page of English Translation and 3 pages of Official Copy).
Office Action received for Japanese Patent Application No. 2023-168764, mailed on Feb. 5, 2024, 5 pages (2 pages of English Translation and 3 pages of Official Copy).
Applicant-Initiated Interview Summary received for U.S. Appl. No. 17/030,257, mailed on Jan. 31, 2023, 7 pages.
Corrected Notice of Allowance received for U.S. Appl. No. 17/077,820, mailed on Jan. 19, 2023, 2 pages.
Intention to Grant received for Danish Patent Application No. PA202170598, mailed on Jan. 16, 2023, 2 pages.
Notice of Allowance received for U.S. Appl. No. 17/485,086, mailed on Jan. 30, 2023, 9 pages.
Office Action received for Korean Patent Application No. 10-2021-0151108, mailed on Jan. 13, 2023, 10 pages (5 pages of English Translation and 5 pages of Official Copy).
Applicant-Initiated Interview Summary received for U.S. Appl. No. 17/030,256, mailed on Jun. 17, 2022, 2 pages.
Applicant-Initiated Interview Summary received for U.S. Appl. No. 17/030,257, mailed on Aug. 29, 2022, 5 pages.
Applicant-Initiated Interview Summary received for U.S. Appl. No. 17/030,260, mailed on May 5, 2022, 2 pages.
Applicant-Initiated Interview Summary received for U.S. Appl. No. 17/030,260, mailed on Oct. 11, 2022, 2 pages.
Applicant-Initiated Interview Summary received for U.S. Appl. No. 17/077,820, mailed on Oct. 6, 2022, 2 pages.
Applicant-Initiated Interview Summary received for U.S. Appl. No. 17/375,767, mailed on Oct. 27, 2022, 4 pages.
Corrected Notice of Allowance received for U.S. Appl. No. 17/030,259, mailed on Apr. 4, 2022, 2 pages.
Corrected Notice of Allowance received for U.S. Appl. No. 17/484,306, mailed on Mar. 30, 2022, 4 pages.
Final Office Action received for U.S. Appl. No. 17/030,256, mailed on Mar. 14, 2022, 20 pages.
International Preliminary Report on Patentability received for PCT Patent Application No. PCT/US2021/015123, mailed on Aug. 11, 2022, 14 pages.
International Search Report and Written Opinion received for PCT Patent Application No. PCT/US2021/057325, mailed on Jan. 5, 2022, 14 pages.
International Search Report and Written Opinion received for PCT Patent Application No. PCT/US2022/025365, mailed on Sep. 27, 2022, 16 pages.
Invitation to Pay Additional Fees received for PCT Patent Application No. PCT/US2022/025365, mailed on Aug. 4, 2022, 9 pages.
Non-Final Office Action received for U.S. Appl. No. 17/030,257, mailed on Jun. 20, 2022, 27 pages.
Non-Final Office Action received for U.S. Appl. No. 17/030,260, mailed on Jul. 8, 2022, 36 pages.
Non-Final Office Action received for U.S. Appl. No. 17/077,820, mailed on Aug. 31, 2022, 10 pages.
Non-Final Office Action received for U.S. Appl. No. 17/222,568, mailed on Sep. 16, 2022, 32 pages.
Non-Final Office Action received for U.S. Appl. No. 17/375,767, mailed on Sep. 29, 2022, 10 pages.
Notice of Acceptance received for Australian Patent Application No. 2021213717, mailed on Sep. 21, 2022, 3 pages.
Notice of Allowance received for Korean Patent Application No. 10-2022-0003867, mailed on Oct. 21, 2022, 7 pages (2 pages of English Translation and 5 pages of Official Copy).
Notice of Allowance received for U.S. Appl. No. 17/030,256, mailed on Jul. 20, 2022, 9 pages.
Notice of Allowance received for U.S. Appl. No. 17/484,306, mailed on Nov. 26, 2021, 9 pages.

(56) References Cited

OTHER PUBLICATIONS

Office Action received for Australian Patent Application No. 2021203367, mailed on May 23, 2022, 5 pages.
Office Action received for Australian Patent Application No. 2021213717, mailed on Jun. 17, 2022, 4 pages.
Office Action received for Danish Patent Application No. PA202170598, mailed on Sep. 7, 2022, 4 pages.
Office Action received for Korean Patent Application No. 10-2022-0003867, mailed on May 17, 2022, 19 pages (9 pages of English Translation and 10 pages of Official Copy).
Kormann et al., "Risks of the Passport Single Signon Protocol", IEEE Computer Networks, Jul. 2000, 12 pages.
Non-Final Office Action received for U.S. Appl. No. 17/900,734, mailed on Oct. 24, 2023, 12 pages.
Office Action received for European Patent Application No. 21731662.9, mailed on Oct. 12, 2023, 8 pages.
International Preliminary Report on Patentability rreceived for PCT Patent Application No. PCT/US2022/025365, mailed on Nov. 2, 2023, 11 pages.
Notice of Allowance received for U.S. Appl. No. 17/398,723, mailed on Oct. 26, 2023, 15 pages.
Notice of Allowance received for U.S. Appl. No. 18/128,775, mailed on Nov. 2, 2023, 10 pages.
Office Action received for European Patent Application No. 21707473.1, mailed on Oct. 27, 2023, 5 pages.
Office Action received for Korean Patent Application No. 10-2021-7037387, mailed on Oct. 12, 2023, 14 pages (6 pages of English Translation and 8 pages of Official Copy).
Notice of Allowance received for Japanese Patent Application No. 2023-528157, mailed on Feb. 5, 2024, 4 pages (1 page of English Translation and 3 pages of Official Copy).
Notice of Allowance received for Korean Patent Application No. 10-2021-7037387, mailed on Jan. 31, 2024, 7 pages (2 pages of English Translation and 5 pages of Official Copy).
Notice of Allowance received for U.S. Appl. No. 17/398,723, mailed on Jan. 30, 2024, 15 pages.
Office Action received for Australian Patent Application No. 2023200021, mailed on Feb. 1, 2024, 4 pages.
Extended European Search Report received for European Patent Application No. 23200887.0, mailed on Mar. 26, 2024, 9 pages.
International Preliminary Report on Patentability received for PCT Patent Application No. PCT/US2022/042978, mailed on Apr. 4, 2024, 12 pages.
Applicant-Initiated Interview Summary received for U.S. Appl. No. 17/485,086, mailed on Dec. 23, 2022, 2 pages.
Final Office Action received for U.S. Appl. No. 17/375,767, mailed on Dec. 29, 2022, 13 pages.
Notice of Allowance received for U.S. Appl. No. 17/077,820, mailed on Jan. 6, 2023, 11 pages.
Corrected Notice of Allowance received for U.S. Appl. No. 17/077,820, mailed on Mar. 8, 2023, 2 pages.
Non-Final Office Action received for U.S. Appl. No. 17/375,767, mailed on Feb. 16, 2023, 12 pages.
Notice of Allowance received for U.S. Appl. No. 17/398,723, mailed on Feb. 23, 2023, 17 pages.
Advisory Action received for U.S. Appl. No. 17/222,568, mailed on Apr. 20, 2023, 5 pages.
Advisory Action received for U.S. Appl. No. 17/375,767, mailed on Jun. 29, 2023, 2 pages.
Applicant-Initiated Interview Summary received for U.S. Appl. No. 17/375,767, mailed on Apr. 13, 2023, 2 pages.
Applicant-Initiated Interview Summary received for U.S. Appl. No. 17/375,767, mailed on Jun. 26, 2023, 2 pages.
Decision to Grant received for Danish Patent Application No. PA202170598, mailed on Jul. 11, 2023, 1 page.
Extended European Search Report received for European Patent Application No. 23165330.4, mailed on Jun. 28, 2023, 10 pages.
Final Office Action received for U.S. Appl. No. 17/375,767, mailed on Jun. 1, 2023, 15 pages.

Intention to Grant received for Danish Patent Application No. PA202170598, mailed on Apr. 24, 2023, 2 pages.
International Preliminary Report on Patentability received for PCT Patent Application No. PCT/US2021/057325, mailed on May 19, 2023, 8 pages.
International Search Report and Written Opinion received for PCT Patent Application No. PCT/US2022/042978, mailed on Nov. 29, 2022, 15 pages.
Non-Final Office Action received for U.S. Appl. No. 17/222,568, mailed on May 25, 2023, 72 pages.
Notice of Acceptance received for Australian Patent Application No. 2022235545, mailed on Jun. 27, 2023, 3 pages.
Notice of Allowance received for Japanese Patent Application No. 2023-028792, mailed on Jun. 26, 2023, 4 pages (1 page of English Translation and 3 pages of Official Copy).
Notice of Allowance received for Korean Patent Application No. 10-2022-7045895, mailed on Apr. 19, 2023, 7 pages (2 pages of English Translation and 5 pages of Official Copy),.
Notice of Allowance received for U.S. Appl. No. 17/030,257, mailed on Jul. 26, 2023, 14 pages.
Notice of Allowance received for U.S. Appl. No. 17/030,260, mailed on Aug. 7, 2023, 11 pages.
Notice of Allowance received for U.S. Appl. No. 17/030,260, mailed on Jun. 28, 2023, 11 pages.
Notice of Allowance received for U.S. Appl. No. 17/030,260, mailed on May 3, 2023, 14 pages.
Notice of Allowance received for U.S. Appl. No. 17/398,723, mailed on Jun. 15, 2023, 15 pages.
Office Action received for Australian Patent Application No. 2022235545, mailed on May 11, 2023, 3 pages.
Office Action received for Chinese Patent Application No. 202310033917.0, mailed on Jun. 28, 2023, 19 pages (10 pages of English Translation and 9 pages of Official Copy).
Office Action received for Danish Patent Application No. 202270438, mailed on Jul. 10, 2023, 4 pages.
Office Action received for European Patent Application No. 21707473.1, mailed on May 4, 2023, 5 pages.
Office Action received for Japanese Patent Application No. 2022-573404, mailed on Jul. 3, 2023, 12 pages (6 pages of English Translation and 6 pages of Official Copy).
Office Action received for Korean Patent Application No. 10-2023-7010480, mailed on Jul. 20, 2023, 14 pages (7 pages of English Translation and 7 pages of Official Copy).
Search Report received for Danish Patent Application No. 202270438, mailed on Dec. 5, 2022, 9 pages.
Eminagaoglu et al., "A Two-Factor Authentication System with QR Codes for Web and Mobile Applications", 2014 Fifth International Conference on Emerging Security Technologies, 2014, pp. 105-112.
Corrected Notice of Allowance received for U.S. Appl. No. 18/128,775, mailed on Jan. 8, 2024, 2 pages.
Final Office Action received for U.S. Appl. No. 17/900,734, mailed on Jan. 19, 2024, 11 pages.
Advisory Action received for U.S. Appl. No. 17/030,260, mailed on Dec. 13, 2022, 4 pages.
Applicant-Initiated Interview Summary received for U.S. Appl. No. 17/030,260, mailed on Nov. 29, 2022, 2 pages.
Cease, Dictionary.com, Merriam-Webster, 2022, 1 page.
Final Office Action received for U.S. Appl. No. 17/030,257, mailed on Dec. 8, 2022, 29 pages.
International Preliminary Report on Patentability received for PCT Patent Application No. PCT/US2021/033051, mailed on Dec. 8, 2022, 14 pages.
International Search Report and Written Opinion received for PCT Patent Application No. PCT/US2022/030567, mailed on Dec. 9, 2022, 24 pages.
Intention to Grant received for European Patent Application No. 21731662.9, mailed on May 3, 2024, 9 pages.
Notice of Allowance received for Korean Patent Application No. 10-2023-7033718, mailed on Apr. 18, 2024, 7 pages (2 pages of English Translation and 5 pages of Official Copy).
Office Action received for Australian Patent Application No. 2023200021, mailed on Apr. 24, 2024, 4 pages.

(56) References Cited

OTHER PUBLICATIONS

Office Action received for Japanese Patent Application No. 2023-200980, mailed on Apr. 22, 2024, 8 pages (4 pages of English Translation and 4 pages of Official Copy).
Applicant-Initiated Interview Summary received for U.S. Appl. No. 17/030,256, mailed on Feb. 23, 2022, 2 pages.
Applicant-Initiated Interview Summary received for U.S. Appl. No. 17/030,257, mailed on Feb. 7, 2022, 5 pages.
Applicant-Initiated Interview Summary received for U.S. Appl. No. 17/030,259, mailed on Nov. 19, 2021, 18 pages.
Applicant-Initiated Interview Summary received for U.S. Appl. No. 17/030,260, mailed on Jan. 7, 2022, 2 pages.
Certificate of Examination received for Australian Patent Application No. 2021100511, mailed on Nov. 5, 2021, 2 pages.
Corrected Notice of Allowance received for U.S. Appl. No. 17/030,259, mailed on Jan. 5, 2022, 2 pages.
Corrected Notice of Allowance received for U.S. Appl. No. 17/485,098, mailed on Oct. 13, 2022, 8 pages.
Decision to Grant received for Danish Patent Application No. PA202170032, mailed on Feb. 1, 2022, 2 pages.
Final Office Action received for U.S. Appl. No. 17/030,260, mailed on Mar. 9, 2022, 42 pages.
Intention to Grant received for Danish Patent Application No. PA202170032, mailed on Oct. 6, 2021, 2 pages.
International Search Report and Written Opinion received for PCT Patent Application No. PCT/US2021/015123, mailed on Aug. 9, 2021, 20 pages.
International Search Report and Written Opinion received for PCT Patent Application No. PCT/US2021/033051, mailed on Oct. 29, 2021, 20 pages.
Invitation to Pay Addition Fees received for PCT Patent Application No. PCT/US2021/015123, mailed on Jun. 16, 2021, 12 pages.
Invitation to Pay Additional Fees and Partial International Search Report received for PCT Patent Application No. PCT/US2022/030567, mailed on Sep. 13, 2022, 13 pages.
Invitation to Pay Additional Fees received for PCT Patent Application No. PCT/US2021/033051, mailed on Aug. 26, 2021, 10 pages.
Juan, "Everything you can do with WeChat QR codes in 2019", Available online at: https://qpsoftware.net/blog/wechat-qr-code, Jul. 1, 2019, 13 pages.
Linelovers,"4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.
Lurey C., "Keeper fortifies industry best security architecture with integrated two-factor codes", Online available at: <URL: https://www.keepersecurity.com/blog/2019/08/29/keeper-fortifies-industry-best-securityarchitecture-with-integrated-two-factor-codes/>, Aug. 29, 2019, 8 pages.
Mack Brandon, "How Do Snapchat's Snapcodes Work?", Available online at: https://blackatlascreative.com/blog/how-do-snapchats-snapcodes-work/, Nov. 10, 2015, 10 pages.
Meet Your Model 3, Available Online at: https://www.tesla.com/support/meet-your-tesla/model-3#keys, 2021, 3 pages.
Non-Final Office Action received for U.S. Appl. No. 17/030,256, mailed on Jan. 18, 2022, 20 pages.
Non-Final Office Action received for U.S. Appl. No. 17/030,259, mailed on Aug. 19, 2021, 20 pages.
Non-Final Office Action received for U.S. Appl. No. 17/030,260, mailed on Oct. 6, 2021, 43 pages.
Non-Final received for U.S. Appl. No. 17/030,257, mailed on Dec. 24, 2021, 24 pages.
Notice of Allowance received for U.S. Appl. No. 17/030,259, mailed on Dec. 14, 2021, 8 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.

Notice of Allowance received for U.S. Appl. No. 17/485,098, mailed on Aug. 5, 2022, 12 pages.
Office Action received for Australian Patent Application No. 2021100511, mailed on May 26, 2021, 5 pages.
Office Action received for Australian Patent Application No. 2021100511, mailed on Sep. 2, 2021, 3 pages.
Office Action received for Australian Patent Application No. 2021102823, mailed on Aug. 24, 2021, 8 pages.
Office Action received for Australian Patent Application No. 2021102823, mailed on Feb. 22, 2022, 5 pages.
Office Action received for Australian Patent Application No. 2021102823, mailed on Nov. 24, 2021, 7 pages.
Office Action received for Australian Patent Application No. 2021213717, mailed on Feb. 10, 2022, 4 pages.
Office Action received for Danish Patent Application No. PA202170032, mailed on May 7, 2021, 7 pages.
Search Report and Opinion received for Danish Patent Application No. PA202170598, mailed on Feb. 15, 2022, 11 pages.
Sibila Alex, "Tesla App Full Walkthrough (Mar. 2020)", Available Online at: https://www.youtube.com/watch?v=RHMWPj_RXLU, Mar. 16, 2020, 3 pages.
Use your iPhone or Apple Watch as a car key, Available Online at: https://support.apple.com/en-us/HT211234, Mar. 16, 2021, 5 pages.
Volvo On Call app: Operating remote start of the car, Available Online at: https://www.volvocars.com/en-ca/support/topics/volvo-on-call/app/volvo-on-call-app-operating-remote-start-of-the-car-2, Nov. 5, 2020, 4 pages.
Office Action received for Korean Patent Application No. 10-2021-0151108, mailed on Sep. 21, 2023, 12 pages (6 pages of English Translation and 6 pages of Official Copy).
Applicant-Initiated Interview Summary received for U.S. Appl. No. 17/900,734, mailed on Feb. 22, 2024, 3 pages.
Extended European Search Report received for European Patent Application No. 23214955.9, mailed on Feb. 22, 2024, 10 pages.
Notice of Allowance received for U.S. Appl. No. 17/375,767, mailed on Feb. 20, 2024, 6 pages.
Notice of Allowance received for U.S. Appl. No. 18/128,775, mailed on Feb. 28, 2024, 11 pages.
Office Action received for Chinese Patent Application No. 202310865934.0, mailed on Jan. 16, 2024, 12 pages (6 pages of English Translation and 6 pages of Official Copy).
Office Action received for European Patent Application No. 22732745.9, mailed on Apr. 10, 2024, 7 pages.
Corrected Notice of Allowance received for U.S. Appl. No. 18/128,775, mailed on Jun. 6, 2024, 2 pages.
Notice of Allowance received for Korean Patent Application No. 10-2021-0151108, mailed on May 26, 2024, 7 pages (2 pages of English Translation and 5 pages of Official Copy).
Notice of Allowance received for Korean Patent Application No. 10-2021-0182662, mailed on Jun. 2, 2024, 6 pages (2 pages of English Translation and 4 pages of Official Copy).
Applicant-Initiated Interview Summary received for U.S. Appl. No. 17/375,767, mailed on Feb. 2, 2023, 2 pages.
Corrected Notice of Allowance received for U.S. Appl. No. 17/077,820, mailed on Feb. 6, 2023, 2 pages.
Final Office Action received for U.S. Appl. No. 17/222,568, mailed on Feb. 8, 2023, 68 pages.
Notice of Allowance received for Japanese Patent Application No. 2022-520133, mailed on Jan. 27, 2023, 4 pages (1 page of English Translation and 3 pages of Official Copy).
Notice of Allowance received for Chinese Patent Application No. 202310865934.0, mailed on May 8, 2024, 2 pages (1 page of English Translation and 1 page of Official Copy).
Office Action received for Japanese Patent Application No. 2023-168764, mailed on May 17, 2024, 6 pages (3 pages of English Translation and 3 pages of Official Copy).
Applicant-Initiated Interview Summary received for U.S. Appl. No. 17/222,568. mailed on Aug. 25, 2023, 2 pages.
Corrected Notice of Allowance received for U.S. Appl. No. 17/030,257, mailed on Sep. 12, 2023, 2 pages.
Non-Final Office Action received for U.S. Appl. No. 17/375,767, mailed on Aug. 31, 2023, 16 pages.

(56) References Cited

OTHER PUBLICATIONS

Corrected Notice of Allowance received for U.S. Appl. No. 17/030,257, mailed on Nov. 24, 2023, 2 pages.

Corrected Notice of Allowance received for U.S. Appl. No. 18/128,775, mailed on Dec. 7, 2023, 2 pages.

International Search Report and Written Opinion received for PCT Patent Application No. PCT/US2023/023766, mailed on Nov. 7, 2023, 20 pages.

International Search Report and Written Opinion received for PCT Patent Application No. PCT/US2023/024123, mailed on Sep. 15, 2023, 11 pages.

Invitation to Pay Additional Fees and Partial International Search Report received for PCT Patent Application No. PCT/US2023/023766, mailed on Sep. 14, 2023, 14 pages.

Non-Final Office Action received for U.S. Appl. No. 17/375,767, mailed on Nov. 28, 2023, 16 pages.

Notice of Allowance received for Chinese Patent Application No. 202310033917.0, mailed on Nov. 26, 2023, 2 pages (1 page of English Translation and 1 page of Official Copy).

Notice of Allowance received for Korean Patent Application No. 10-2023-7010480, mailed on Nov. 29, 2023, 7 pages (2 pages of English Translation and 5 pages of Official Copy).

Decision to Grant received for European Patent Application No. 21731662.9, mailed on Sep. 12, 2024, 4 pages.

Notice of Allowance received for Chinese Patent Application No. 202311569957.3, mailed on Sep. 2, 2024, 5 pages (1 page of English Translation and 4 pages of Official Copy).

Result of Consultation received for European Patent Application No. 21707473.1, mailed on Sep. 6, 2024, 3 pages.

Summons to Attend Oral Proceedings received for European Patent Application No. 22732745.9, mailed on Sep. 3, 2024, 11 pages.

Office Action received for European Patent Application No. 22785826.3, mailed on Aug. 1, 2024, 7 pages.

Office Action received for Japanese Patent Application No. 2023-200980, mailed on Aug. 2, 2024, 8 pages (4 pages of English Translation and 4 pages of Official Copy).

Applicant-Initiated Interview Summary received for U.S. Appl. No. 17/900,734, mailed on Feb. 3, 2025, 4 pages.

Applicant-Initiated Interview Summary received for U.S. Appl. No. 18/595,238, mailed on Oct. 25, 2024, 2 pages.

Corrected Notice of Allowance received for U.S. Appl. No. 18/595,238, mailed on Dec. 10, 2024, 2 pages.

Emilio, Di Paolo M. , "CES 2021: Wearable Device with Biometric Authentication", Available online at: https://www.eetimes.eu/ces-2021-wearable-device-with-biometric-authentication/—EE Times Europe, Jan. 11, 2021, 6 pages.

Intention to Grant received for European Patent Application No. 22732745.9, mailed on Feb. 7, 2025, 14 pages.

Intention to Grant received for European Patent Application No. 23165330.4, mailed on Feb. 19, 2025, 8 pages.

Intention to Grant received for European Patent Application No. 23200887.0, mailed on Jan. 7, 2025, 8 pages.

Intention to Grant received for European Patent Application No. 23214955.9, mailed on Dec. 3, 2024, 8 pages.

International Preliminary Report on Patentability received for PCT Patent Application No. PCT/US2023/023766, mailed on Dec. 19, 2024, 15 pages.

International Preliminary Report on Patentability received for PCT Patent Application No. PCT/US2023/024123, mailed on Dec. 19, 2024, 7 pages.

International Search Report and Written Opinion received for PCT Patent Application No. PCT/US2024/031045, mailed on Sep. 26, 2024, 10 pages.

Invitation to Pay Search Fees received for European Patent Application No. 22723512.4, mailed on Nov. 11, 2024, 3 pages.

Khedekar et al., "Strength of QR Code over Design and Implementation of Authentication System", International Conference on Communication and Signal Processing, Online available at: https://ieeexplore.ieee.org/document/7754571, Apr. 6-8, 2016, pp. 2190-2193.

Non-Final Office Action received for U.S. Appl. No. 17/900,734, mailed on Jan. 16, 2025, 7 pages.

Non-Final Office Action received for U.S. Appl. No. 18/375,932, mailed on Jan. 29, 2025, 39 pages.

Non-Final Office Action received for U.S. Appl. No. 18/595,238, mailed on Sep. 26, 2024, 8 pages.

Notice of Allowance received for Chinese Patent Application No. 202311323829.0, mailed on Nov. 29, 2024, 4 pages (1 page of English Translation and 3 pages of Official Copy).

Notice of Allowance received for Japanese Patent Application No. 2023-200980, mailed on Nov. 5, 2024, 4 pages (1 page of English Translation and 3 pages of Official Copy).

Notice of Allowance received for Korean Patent Application No. 10-2024-0100836, mailed on Oct. 14, 2024, 7 pages (2 pages of English Translation and 5 pages of Official Copy).

Notice of Allowance received for U.S. Appl. No. 17/222,568, mailed on Dec. 11, 2024, 14 pages.

Notice of Allowance received for U.S. Appl. No. 17/900,734, mailed on Feb. 26, 2025, 8 pages.

Notice of Allowance received for U.S. Appl. No. 18/404,058, mailed on Oct. 9, 2024, 12 pages.

Notice of Allowance received for U.S. Appl. No. 18/595,238, mailed on Nov. 20, 2024, 9 pages.

Office Action received for Chinese Patent Application No. 202311323829.0, mailed on Sep. 5, 2024, 11 pages (6 pages of English Translation and 5 pages of Official Copy).

Office Action received for European Patent Application No. 21707473.1, mailed on Feb. 11, 2025, 9 pages.

Office Action received for European Patent Application No. 22723512.4, mailed on Feb. 10, 2025, 9 pages.

Office Action received for European Patent Application No. 22785826.3, mailed on Jan. 9, 2025, 9 pages.

Office Action received for Indian Patent Application No. 202217048935, mailed on Oct. 29, 2024, 9 pages.

Result of Consultation received for European Patent Application No. 22732745.9, mailed on Jan. 15, 2025, 13 pages.

Result of Consultation received for European Patent Application No. 22732745.9, mailed on Jan. 23, 2025, 4 pages.

Corrected Notice of Allowance received for U.S. Appl. No. 17/900,734, mailed on Mar. 17, 2025, 2 pages.

Non-Final Office Action received for U.S. Appl. No. 17/949,042, mailed on Mar. 13, 2025, 12 pages.

Corrected Notice of Allowance received for U.S. Appl. No. 17/900,734, mailed on Mar. 10, 2025, 3 pages.

Non-Final Office Action received for U.S. Appl. No. 17/971,407, mailed on Feb. 27, 2025, 9 pages.

Applicant-Initiated Interview Summary received for U.S. Appl. No. 17/949,042, mailed on Apr. 2, 2025, 2 pages.

Applicant-Initiated Interview Summary received for U.S. Appl. No. 17/971,407, mailed on Apr. 1, 2025, 2 pages.

Non-Final Office Action received for U.S. Appl. No. 18/204,334, mailed on Mar. 26, 2025, 12 pages.

Notice of Allowance received for U.S. Appl. No. 17/222,568, mailed on Mar. 27, 2025, 15 pages.

Office Action received for Japanese Patent Application No. 2024-211628, mailed on Feb. 25, 2025, 12 pages (6 pages of English Translation and 6 pages of Official Copy).

Applicant-Initiated Interview Summary received for U.S. Appl. No. 17/222,568, mailed on Apr. 16, 2025, 3 pages.

Corrected Notice of Allowance received for U.S. Appl. No. 17/222,568, mailed on Apr. 24, 2025, 2 pages.

Decision to Grant received for European Patent Application No. 23214955.9, mailed on Apr. 10, 2025, 4 pages.

Notice of Allowance received for U.S. Appl. No. 17/971,407, mailed on Apr. 16, 2025, 7 pages.

Extended European Search Report received for European Patent Application No. 25175055.0, mailed on Jul. 17, 2025, 9 pages.

Intention to Grant received for European Patent Application No. 23165330.4, mailed on Jul. 17, 2025, 7 pages.

Office Action received for Korean Patent Application No. 10-2023-7024663, mailed on Jul. 15, 2025, 12 pages (5 pages of English Translation and 7 pages of Official Copy).

(56) References Cited

OTHER PUBLICATIONS

Applicant-Initiated Interview Summary received for U.S. Appl. No. 18/204,334, mailed on Aug. 4, 2025, 2 pages.

Final Office Action received for U.S. Appl. No. 18/375,932, mailed on Aug. 12, 2025, 34 pages.

Applicant-Initiated Interview Summary received for U.S. Appl. No. 18/204,334, mailed on May 15, 2025, 2 pages.

Corrected Notice of Allowance received for U.S. Appl. No. 17/971,407, mailed on Jun. 17, 2025, 2 pages.

Corrected Notice of Allowance received for U.S. Appl. No. 17/971,407, mailed on May 20, 2025, 2 pages.

Decision to Grant received for European Patent Application No. 22732745.9, mailed on May 22, 2025, 4 pages.

Decision to Grant received for European Patent Application No. 23200887.0, mailed on May 22, 2025, 4 pages.

Final Office Action received for U.S. Appl. No. 18/204,334, mailed on Jun. 9, 2025, 15 pages.

Notice of Allowance received for Japanese Patent Application No. 2024-211628, mailed on Jul. 4, 2025, 4 pages (1 page of English Translation and 3 pages of Official Copy).

Notice of Allowance received for U.S. Appl. No. 17/949,042, mailed on Jul. 1, 2025, 6 pages.

Notice of Hearing received for Indian Patent Application No. 202217048935, mailed on May 26, 2025, 3 pages.

Office Action received for Australian Patent Application No. 2023233133, mailed on May 23, 2025, 5 pages.

Office Action received for Chinese Patent Application No. 202410869730.9, mailed on May 28, 2025, 11 pages (6 pages of English Translation and 5 pages of Official Copy).

Office Action received for European Patent Application No. 21707473.1, mailed on May 9, 2025, 7 pages.

Office Action received for European Patent Application No. 22723512.4, mailed on Jun. 18, 2025, 5 pages.

Office Action received for European Patent Application No. 22785826.3, mailed on May 8, 2025, 7 pages.

Office Action received for Japanese Patent Application No. 2024-032427, mailed on Apr. 21, 2025, 11 pages (5 pages of English Translation and 6 pages of Official Copy).

Non-Final Office Action received for U.S. Appl. No. 18/628,031, mailed on Oct. 28, 2025, 10 pages.

Office Action received for European Patent Application No. 21707473.1, mailed on Oct. 23, 2025, 6 pages.

Decision to Refuse received for Japanese Patent Application No. 2024-032427, mailed on Oct. 10, 2025, 18 pages (8 pages of English Translation and 10 pages of Official Copy).

Notice of Allowance received for U.S. Appl. No. 18/204,334, mailed on Oct. 21, 2025, 7 pages.

Office Action received for Korean Patent Application No. 10-2024-0114771, mailed on Sep. 29, 2025, 5 pages (2 pages of English Translation and 3 pages of Official Copy).

Notice of Allowance received for Korean Patent Application No. 10-2023-7018460, mailed on Aug. 27, 2025, 7 pages (2 pages of English Translation and 5 pages of Official Copy).

Applicant-Initiated Interview Summary received for U.S. Appl. No. 18/628,031, mailed on Dec. 2, 2025, 2 pages.

Corrected Notice of Allowance received for U.S. Appl. No. 18/204,334, mailed on Dec. 4, 2025, 5 pages.

Intention to Grant received for European Patent Application No. 22723512.4, mailed on Dec. 12, 2025, 9 pages.

International Search Report and Written Opinion received for PCT Patent Application No. PCT/US2025/029289, mailed on Nov. 12, 2025, 20 pages.

Invitation to Pay Additional Fees and Partial International Search Report received for PCT Patent Application No. PCT/US2025/029289, mailed on Sep. 22, 2025, 16 pages.

Result of Consultation received for European Patent Application No. 22723512.4, mailed on Nov. 26, 2025, 5 pages.

Decision to Grant received for European Patent Application No. 23165330.4, mailed on Nov. 20, 2025, 2 pages.

Extended European Search Report received for European Patent Application No. 25176097.1, mailed on Nov. 18, 2025, 5 pages.

Office Action received for Chinese Patent Application No. 202510359797.2, mailed on Sep. 22, 2025, 14 pages (7 pages of English Translation and 7 pages of Official Copy).

Applicant-Initiated Interview Summary received for U.S. Appl. No. 18/204,334, mailed on Oct. 2, 2025, 2 pages.

Intention to Grant received for European Patent Application No. 22785826.3, mailed on Oct. 2, 2025, 9 pages.

Non-Final Office Action received for U.S. Appl. No. 18/204,334, mailed on Sep. 10, 2025, 13 pages.

Notice of Allowance received for Chinese Patent Application No. 202410869730.9, mailed on Sep. 29, 2025, 4 pages (1 page of English Translation and 3 pages of Official Copy).

Office Action received for Australian Patent Application No. 2024220018, mailed on Sep. 24, 2025, 3 pages.

* cited by examiner

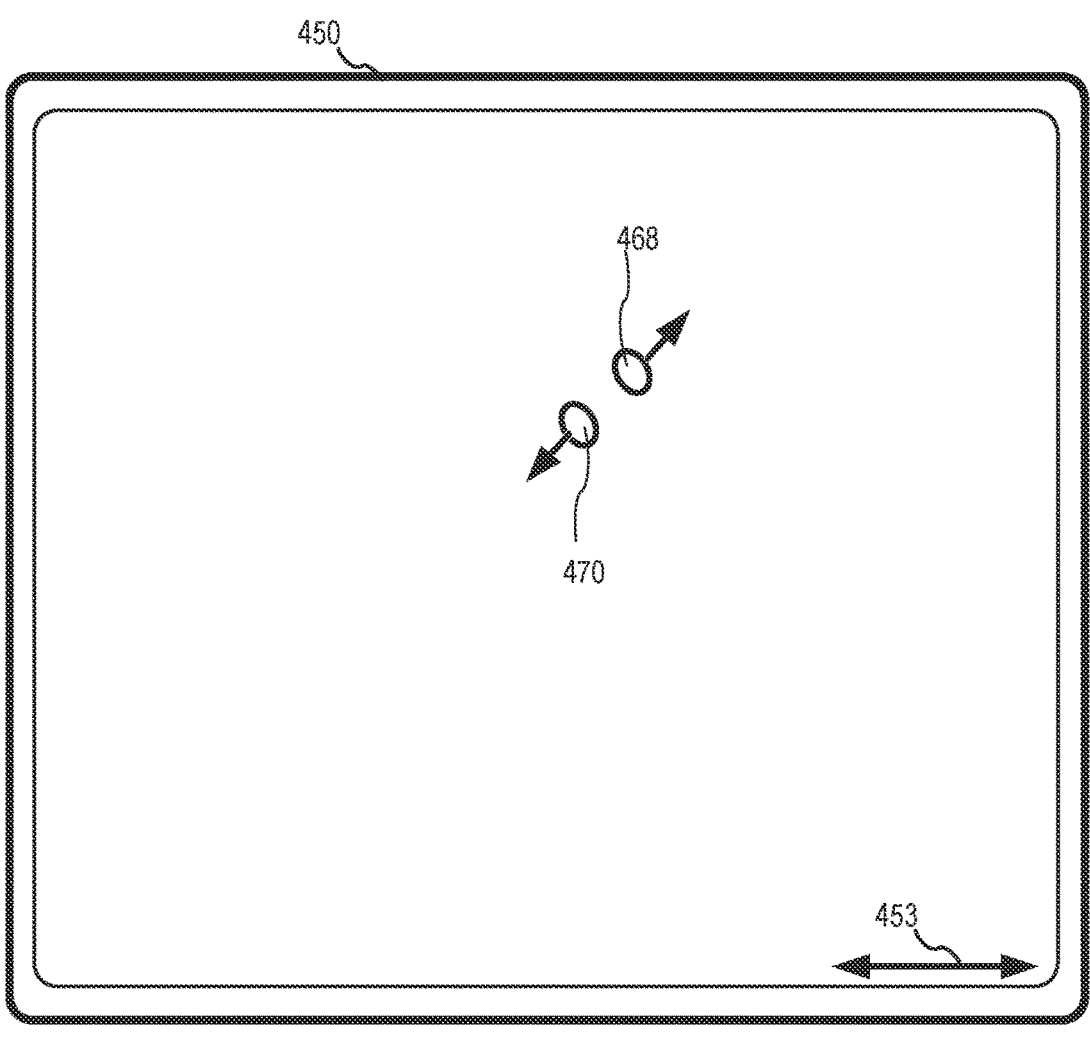
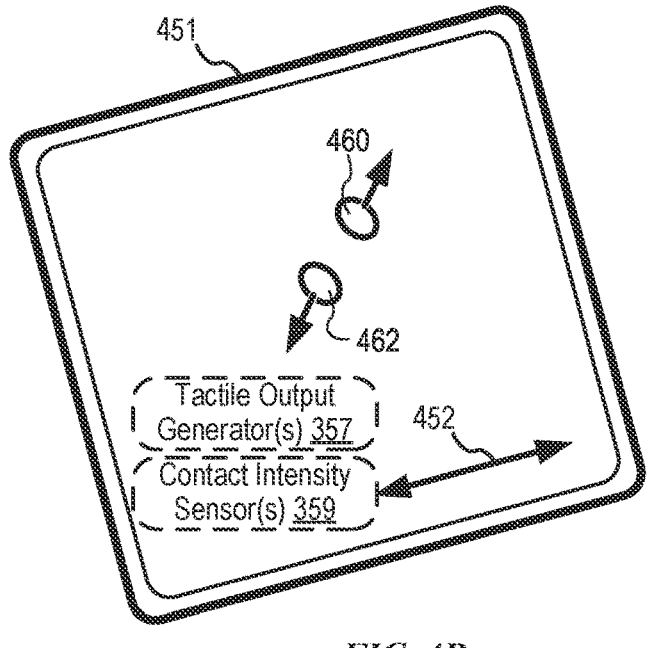
*FIG. 4B*

638C

638D

638F

TURN YOUR HEAD RIGHT UNTIL
YOU - FEEL YOUR PHONE VIBRATE.

ACCESSIBILITY OPTIONS

10:09    636

CANCEL 600
602
638A

638C

638D

638F

TURN YOUR HEAD RIGHT UNTIL
YOU FEEL YOUR PHONE VIBRATE.

ACCESSIBILITY OPTIONS

10:09    636

CANCEL 600
602
638A

TURN YOUR HEAD RIGHT UNTIL YOU FEEL YOUR PHONE VIBRATE.

FOLLOW THE INSTRUCTION

TRY A DIFFERENT MOVEMENT

MOVEMENT CAPTURED.

CONTINUE

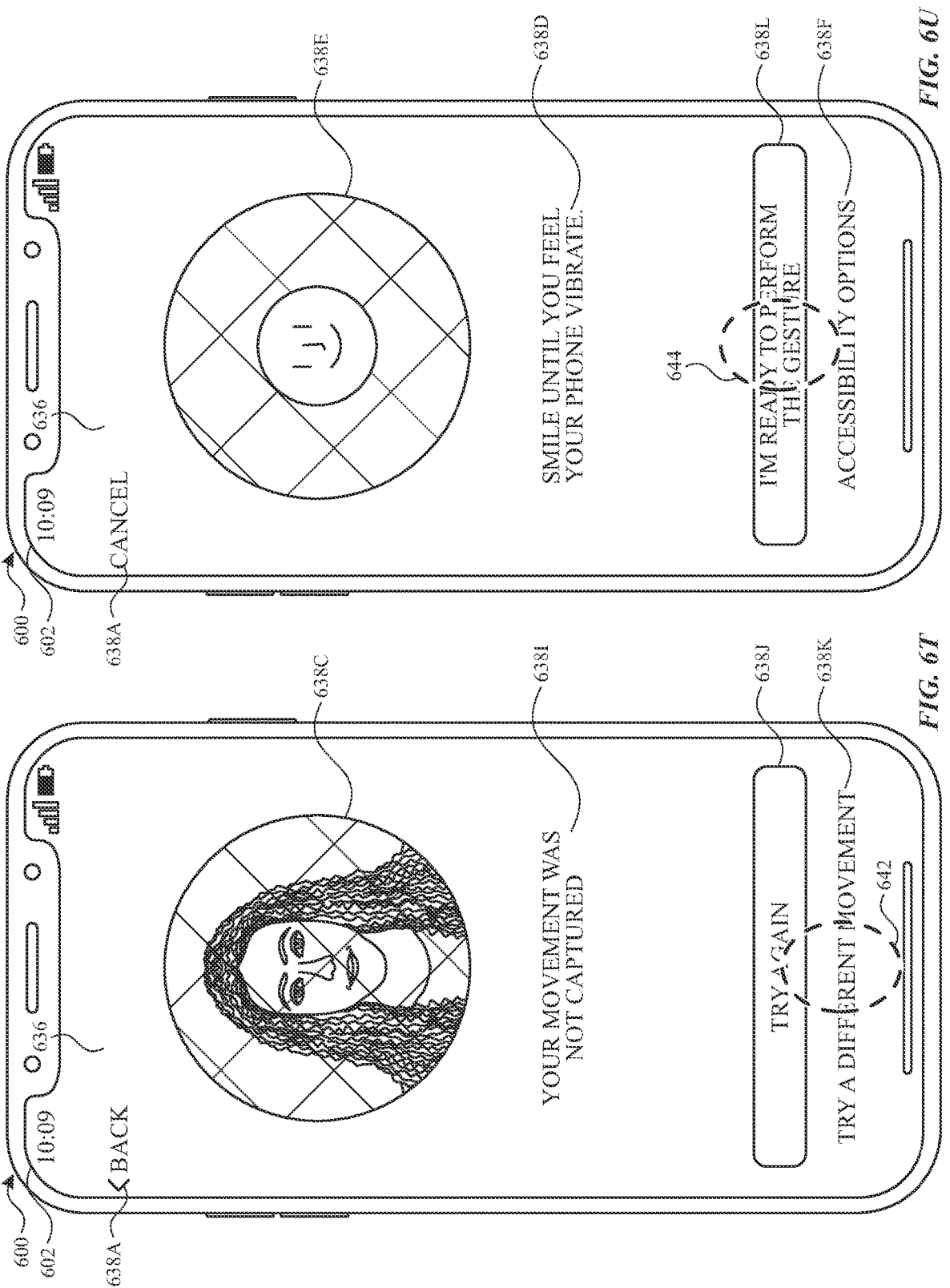

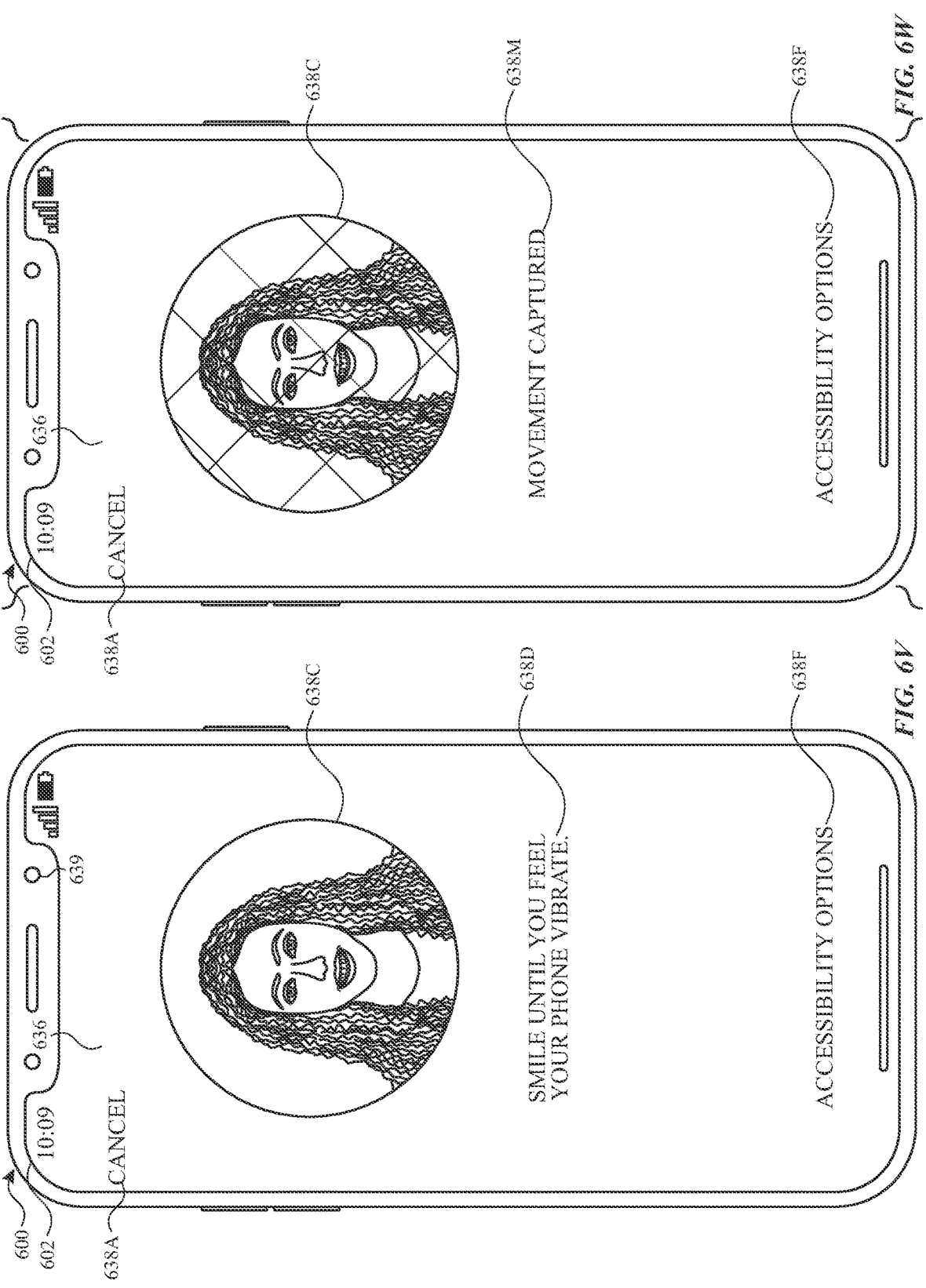

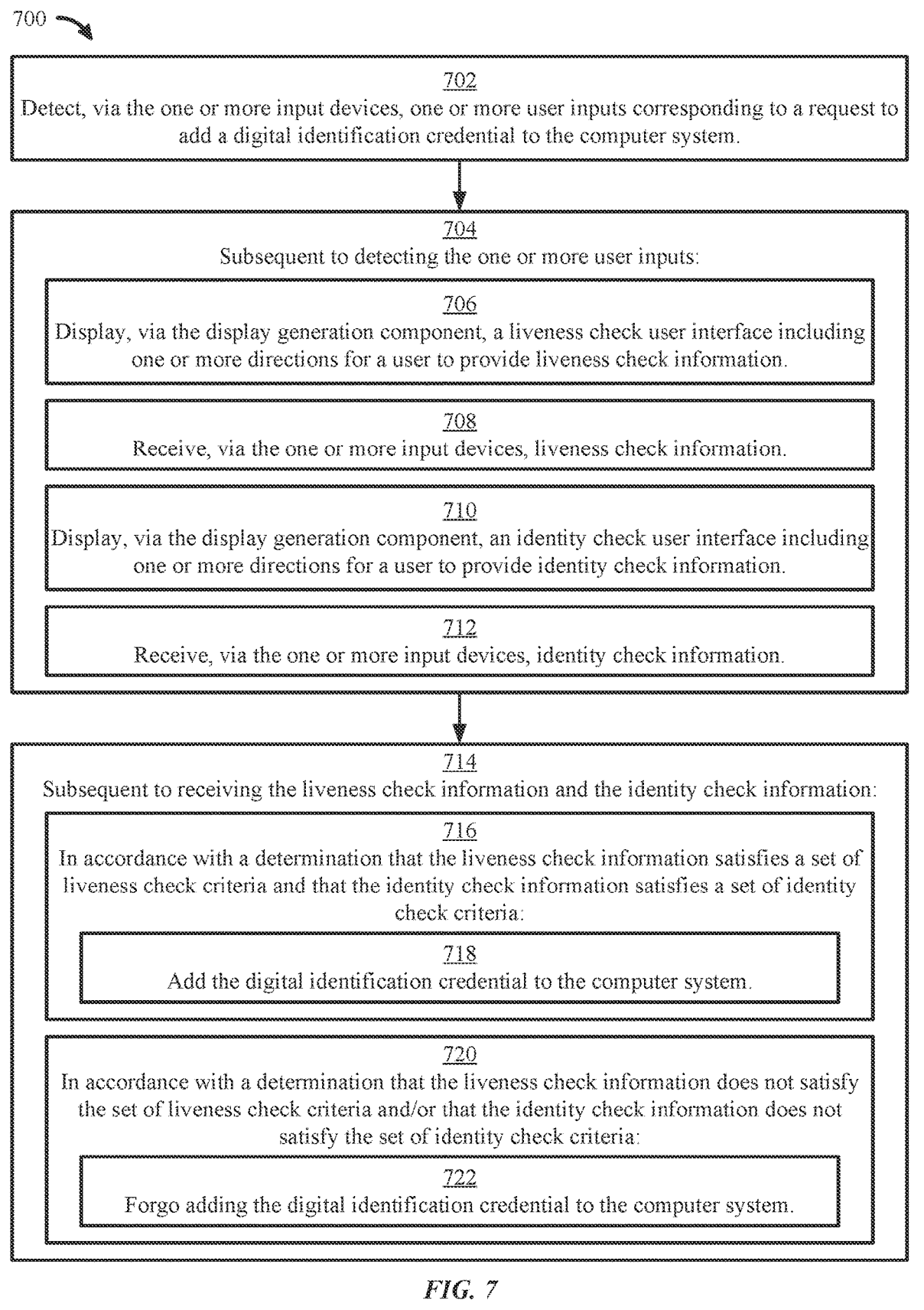

700

702
Detect, via the one or more input devices, one or more user inputs corresponding to a request to add a digital identification credential to the computer system.

704
Subsequent to detecting the one or more user inputs:

706
Display, via the display generation component, a liveness check user interface including one or more directions for a user to provide liveness check information.

708
Receive, via the one or more input devices, liveness check information.

710
Display, via the display generation component, an identity check user interface including one or more directions for a user to provide identity check information.

712
Receive, via the one or more input devices, identity check information.

714
Subsequent to receiving the liveness check information and the identity check information:

716
In accordance with a determination that the liveness check information satisfies a set of liveness check criteria and that the identity check information satisfies a set of identity check criteria:

718
Add the digital identification credential to the computer system.

720
In accordance with a determination that the liveness check information does not satisfy the set of liveness check criteria and/or that the identity check information does not satisfy the set of identity check criteria:

722
Forgo adding the digital identification credential to the computer system.

*FIG. 7*

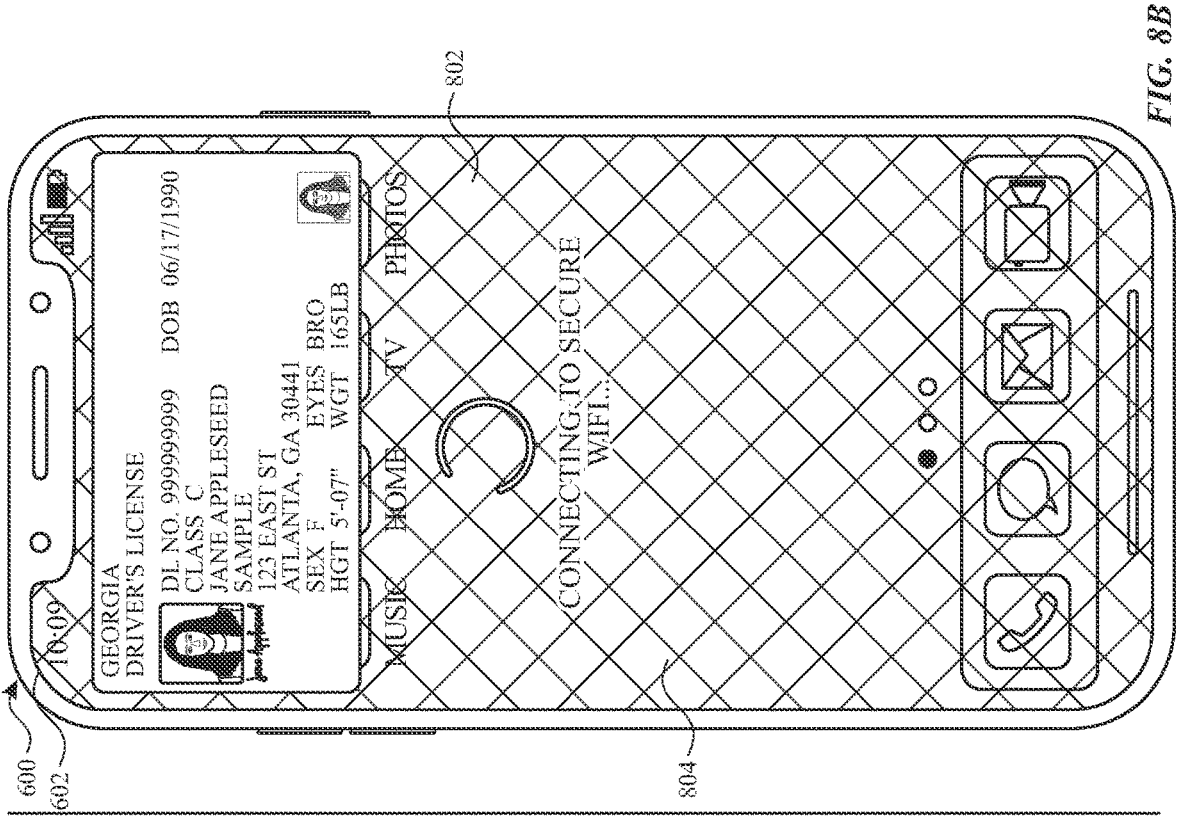
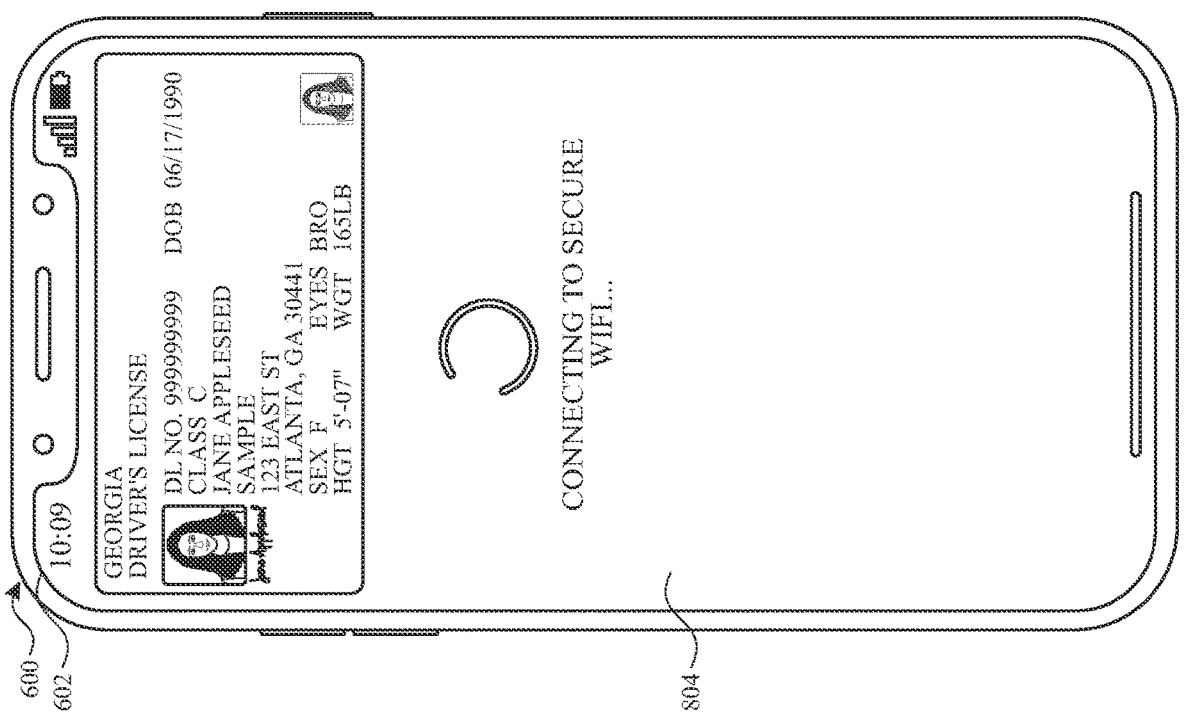
FIG. 8B

Figure 9:
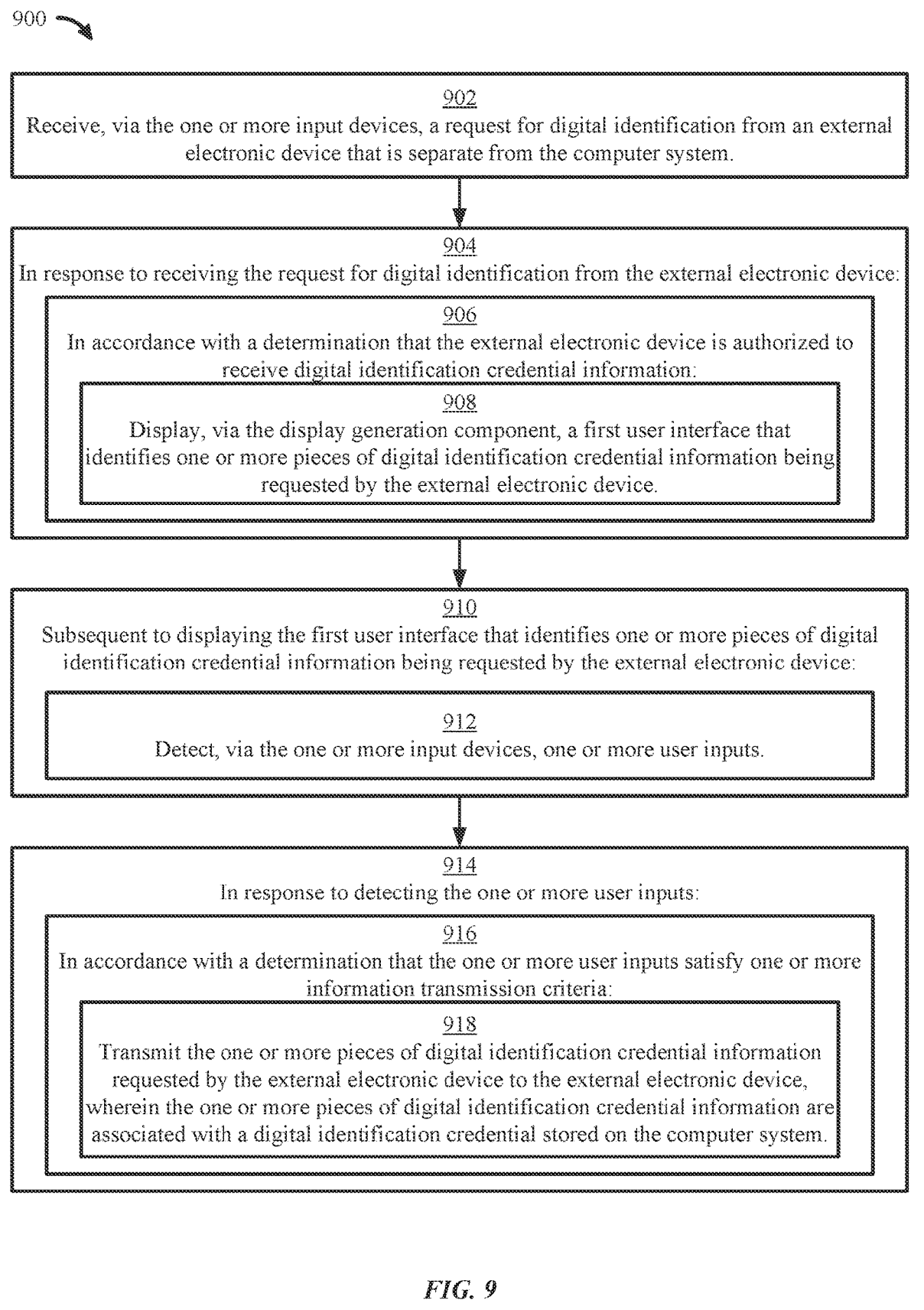

900

902
Receive, via the one or more input devices, a request for digital identification from an external electronic device that is separate from the computer system.

904
In response to receiving the request for digital identification from the external electronic device:

906
In accordance with a determination that the external electronic device is authorized to receive digital identification credential information:

908
Display, via the display generation component, a first user interface that identifies one or more pieces of digital identification credential information being requested by the external electronic device.

910
Subsequent to displaying the first user interface that identifies one or more pieces of digital identification credential information being requested by the external electronic device:

912
Detect, via the one or more input devices, one or more user inputs.

914
In response to detecting the one or more user inputs:

916
In accordance with a determination that the one or more user inputs satisfy one or more information transmission criteria:

918
Transmit the one or more pieces of digital identification credential information requested by the external electronic device to the external electronic device, wherein the one or more pieces of digital identification credential information are associated with a digital identification credential stored on the computer system.

1102
Display, via the display generation component, a first user interface that includes one or more representations of digital identification credentials stored on the computer system including a representation of a first digital identification credential.

↓

1104
While displaying the first user interface:

1106
Detect, via the one or more input devices, one or more user inputs corresponding to selection of the representation of the first digital identification credential.

↓

1108
In response to detecting the one or more user inputs corresponding to selection of the representation of the first digital identification credential:

1110
Display, via the display generation component, a second user interface corresponding to the first digital identification credential, wherein:

1112
The second user interface includes representations of a plurality of information transmission instances associated with the first digital identification credential, including a representation of a first transmission instance and a representation of a second transmission instance.

1114
The first transmission instance corresponds to a first instance in which a first set of digital credential information associated with the first digital identification credential was transmitted to a first external electronic device.

1116
The second transmission instance corresponds to a second instance in which a second set of digital credential information associated with the first digital identification credential was transmitted to a second external electronic device.

↓

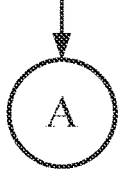

*FIG. 11A*

1118
While displaying the second user interface:

1120
Detect, via the one or more input devices, one or more selection inputs.

1122
In response to detecting the one or more selection inputs:

1124
In accordance with a determination that the one or more selection inputs corresponding to selection of the representation of the first transmission instance:

1126
Display, via the display generation component, representations of the first set of digital credential information that was transmitted to the first external electronic device in the first instance.

1128
In accordance with a determination that the one or more selection inputs corresponding to selection of the representation of the second transmission instance:

1130
Display, via the display generation component, representations of the second set of digital credential information that was transmitted to the second external electronic device in the second instance.

*FIG. 11B*

DIGITAL IDENTIFICATION CREDENTIAL USER INTERFACES

CROSS-REFERENCE TO RELATED APPLICATIONS

This application is a continuation of U.S. patent application Ser. No. 17/485,098, "DIGITAL IDENTIFICATION CREDENTIAL USER INTERFACES," filed Sep. 24, 2021, which claims priority to U.S. Provisional Application Ser. No. 63/197,432, entitled "DIGITAL IDENTIFICATION CREDENTIAL USER INTERFACES," filed Jun. 6, 2021, the entire contents of which are hereby incorporated by reference.

FIELD

The present disclosure relates generally to computer user interfaces, and more specifically to techniques for enrolling, managing, and using digital credentials, including digital identification credentials.

BACKGROUND

As electronic devices such as smartphones have become more widely used, their functions have grown beyond phone calls and text messaging. Providing an efficient method for using and implementing the various functions on these electronic devices can be complex and time-consuming.

BRIEF SUMMARY

Some techniques for enrolling, managing, and using digital credentials using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for enrolling, managing, and using digital credentials. Such methods and interfaces optionally complement or replace other methods for enrolling, managing, and using digital credentials. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: detecting, via the one or more input devices, one or more user inputs corresponding to a request to add a digital identification credential to the computer system; subsequent to detecting the one or more user inputs: displaying, via the display generation component, a liveness check user interface including one or more directions for a user to provide liveness check information; receiving, via the one or more input devices, liveness check information; displaying, via the display generation component, an identity check user interface including one or more directions for a user to provide identity check information; and receiving, via the one or more input devices, identity check information; and subsequent to receiving the liveness check information and the identity check information: in accordance with a determination that the liveness check information satisfies a set of liveness check criteria and that the identity check information satisfies a set of identity check criteria: adding the digital identification credential to the computer system; and in accordance with a determination that the liveness check information does not satisfy the set of liveness check criteria and/or that the identity check information does not satisfy the set of identity check criteria: forgoing adding the digital identification credential to the computer system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, one or more user inputs corresponding to a request to add a digital identification credential to the computer system; subsequent to detecting the one or more user inputs: displaying, via the display generation component, a liveness check user interface including one or more directions for a user to provide liveness check information; receiving, via the one or more input devices, liveness check information; displaying, via the display generation component, an identity check user interface including one or more directions for a user to provide identity check information; and receiving, via the one or more input devices, identity check information; and subsequent to receiving the liveness check information and the identity check information: in accordance with a determination that the liveness check information satisfies a set of liveness check criteria and that the identity check information satisfies a set of identity check criteria: adding the digital identification credential to the computer system; and in accordance with a determination that the liveness check information does not satisfy the set of liveness check criteria and/or that the identity check information does not satisfy the set of identity check criteria: forgoing adding the digital identification credential to the computer system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, one or more user inputs corresponding to a request to add a digital identification credential to the computer system; subsequent to detecting the one or more user inputs: displaying, via the display generation component, a liveness check user interface including one or more directions for a user to provide liveness check information; receiving, via the one or more input devices, liveness check information; displaying, via the display generation component, an identity check user interface including one or more directions for a user to provide identity check information; and receiving, via the one or more input devices, identity check information; and subsequent to receiving the liveness check information and the identity check information: in accordance with a determination that the liveness check information satisfies a set of liveness check criteria and that the identity check information satisfies a set of identity check criteria: adding the digital identification credential to the computer system; and in accordance with a determination that the liveness check information does not satisfy the set of liveness check criteria and/or that the identity check information does not satisfy the set of identity check criteria: forgoing adding the digital identification credential to the computer system.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: detecting, via the one or more input devices, one or more user inputs corresponding to a request to add a digital identification credential to the computer system; subsequent to detecting the one or more user inputs: displaying, via the display generation component, a liveness check user interface including one or more directions for a user to provide liveness check information; receiving, via the one or more input devices, liveness check information; displaying, via the display generation component, an identity check user interface including one or more directions for a user to provide identity check information; and receiving, via the one or more input devices, identity check information; and subsequent to receiving the liveness check information and the identity check information: in accordance with a determination that the liveness check information satisfies a set of liveness check criteria and that the identity check information satisfies a set of identity check criteria: adding the digital identification credential to the computer system; and in accordance with a determination that the liveness check information does not satisfy the set of liveness check criteria and/or that the identity check information does not satisfy the set of identity check criteria: forgoing adding the digital identification credential to the computer system.

In accordance with some embodiments, a computer system is described. The computer system is configured to communicate with a display generation component and one or more input devices, and comprises: means for detecting, via the one or more input devices, one or more user inputs corresponding to a request to add a digital identification credential to the computer system; means for, subsequent to detecting the one or more user inputs: displaying, via the display generation component, a liveness check user interface including one or more directions for a user to provide liveness check information; receiving, via the one or more input devices, liveness check information; displaying, via the display generation component, an identity check user interface including one or more directions for a user to provide identity check information; and receiving, via the one or more input devices, identity check information; and means for, subsequent to receiving the liveness check information and the identity check information: in accordance with a determination that the liveness check information satisfies a set of liveness check criteria and that the identity check information satisfies a set of identity check criteria: adding the digital identification credential to the computer system; and in accordance with a determination that the liveness check information does not satisfy the set of liveness check criteria and/or that the identity check information does not satisfy the set of identity check criteria: forgoing adding the digital identification credential to the computer system.

In accordance with some embodiments, a computer program product is described. The computer program product comprises one or more programs configured to be executed by one or more processors of a computer system that is in communication with a display generation component and one or more input devices, the one or more programs including instructions for: detecting, via the one or more input devices, one or more user inputs corresponding to a request to add a digital identification credential to the computer system; subsequent to detecting the one or more user inputs: displaying, via the display generation component, a liveness check user interface including one or more directions for a user to provide liveness check information; receiving, via the one or more input devices, liveness check information; displaying, via the display generation component, an identity check user interface including one or more directions for a user to provide identity check information; and receiving, via the one or more input devices, identity check information; and subsequent to receiving the liveness check information and the identity check information: in accordance with a determination that the liveness check information satisfies a set of liveness check criteria and that the identity check information satisfies a set of identity check criteria: adding the digital identification credential to the computer system; and in accordance with a determination that the liveness check information does not satisfy the set of liveness check criteria and/or that the identity check information does not satisfy the set of identity check criteria: forgoing adding the digital identification credential to the computer system.

In accordance with some embodiments, a method is described. The method comprises: at a computer system that is in communication with a display generation component and one or more input devices: receiving, via the one or more input devices, a request for digital identification from an external electronic device that is separate from the computer system; in response to receiving the request for digital identification from the external electronic device: in accordance with a determination that the external electronic device is authorized to receive digital identification credential information: displaying, via the display generation component, a first user interface that identifies one or more pieces of digital identification credential information being requested by the external electronic device; subsequent to displaying the first user interface that identifies one or more pieces of digital identification credential information being requested by the external electronic device, detecting, via the one or more input devices, one or more user inputs; and in response to detecting the one or more user inputs: in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, a request for digital identification from an external electronic device that is separate from the computer system; in response to receiving the request for digital identification from the external electronic device: in accordance with a determination that the external electronic device is authorized to receive digital identification credential information: displaying, via the display generation component, a first user interface that identifies one or more pieces of digital identification credential information being requested by the external electronic device; subsequent to displaying the first user interface that identifies one or more pieces of digital identification credential information being requested by the external electronic device, detecting, via the one or more input devices, one or more user inputs; and in response to detecting the one or more user inputs: in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, a request for digital identification from an external electronic device that is separate from the computer system; in response to receiving the request for digital identification from the external electronic device: in accordance with a determination that the external electronic device is authorized to receive digital identification credential information: displaying, via the display generation component, a first user interface that identifies one or more pieces of digital identification credential information being requested by the external electronic device; subsequent to displaying the first user interface that identifies one or more pieces of digital identification credential information being requested by the external electronic device, detecting, via the one or more input devices, one or more user inputs; and in response to detecting the one or more user inputs: in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: receiving, via the one or more input devices, a request for digital identification from an external electronic device that is separate from the computer system; in response to receiving the request for digital identification from the external electronic device: in accordance with a determination that the external electronic device is authorized to receive digital identification credential information: displaying, via the display generation component, a first user interface that identifies one or more pieces of digital identification credential information being requested by the external electronic device; subsequent to displaying the first user interface that identifies one or more pieces of digital identification credential information being requested by the external electronic device, detecting, via the one or more input devices, one or more user inputs; and in response to detecting the one or more user inputs: in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

In accordance with some embodiments, a computer system is described. The computer system is configured to communicate with a display generation component and one or more input devices, and comprises: means for receiving, via the one or more input devices, a request for digital identification from an external electronic device that is separate from the computer system; means for, in response to receiving the request for digital identification from the external electronic device: in accordance with a determination that the external electronic device is authorized to receive digital identification credential information: displaying, via the display generation component, a first user interface that identifies one or more pieces of digital identification credential information being requested by the external electronic device; means for, subsequent to displaying the first user interface that identifies one or more pieces of digital identification credential information being requested by the external electronic device, detecting, via the one or more input devices, one or more user inputs; and means for, in response to detecting the one or more user inputs: in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

In accordance with some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request for digital identification from an external electronic device that is separate from the computer system; in response to receiving the request for digital identification from the external electronic device: in accordance with a determination that the external electronic device is authorized to receive digital identification credential information: displaying, via the display generation component, a first user interface that identifies one or more pieces of digital identification credential information being requested by the external electronic device; subsequent to displaying the first user interface that identifies one or more pieces of digital identification credential information being requested by the external electronic device, detecting, via the one or more input devices, one or more user inputs; and in response to detecting the one or more user inputs: in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

In accordance with some embodiments, a method is described. The method comprises: at a computer system that is in communication with a display generation component and one or more input devices: displaying, via the display generation component, a first user interface that includes one or more representations of digital identification credentials stored on the computer system including a representation of a first digital identification credential; while displaying the first user interface, detecting, via the one or more input devices, one or more user inputs corresponding to selection of the representation of the first digital identification credential; in response to detecting the one or more user inputs corresponding to selection of the representation of the first digital identification credential, displaying, via the display generation component, a second user interface corresponding to the first digital identification credential, wherein: the second user interface includes representations of a plurality of information transmission instances associated with the first digital identification credential, including a representation of a first transmission instance and a representation of a second transmission instance, the first transmission instance corresponds to a first instance in which a first set of digital credential information associated with the first digital identification credential was transmitted to a first external electronic device, and the second transmission instance corresponds to a second instance in which a second set of digital credential information associated with the first digital identification credential was transmitted to a second external electronic device; while displaying the second user interface, detecting, via the one or more input devices, one or more selection inputs; and in response to detecting the one or more selection inputs: in accordance with a determination that the one or more selection inputs correspond to selection of the representation of the first transmission instance, displaying, via the display generation component, representations of the first set of digital credential information that was transmitted to the first external electronic device in the first instance; and in accordance with a determination that the one or more selection inputs correspond to selection of the representation of the second transmission instance, displaying, via the display generation component, representations of the second set of digital credential information that was transmitted to the second external electronic device in the second instance.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first user interface that includes one or more representations of digital identification credentials stored on the computer system including a representation of a first digital identification credential; while displaying the first user interface, detecting, via the one or more input devices, one or more user inputs corresponding to selection of the representation of the first digital identification credential; in response to detecting the one or more user inputs corresponding to selection of the representation of the first digital identification credential, displaying, via the display generation component, a second user interface corresponding to the first digital identification credential, wherein: the second user interface includes representations of a plurality of information transmission instances associated with the first digital identification credential, including a representation of a first transmission instance and a representation of a second transmission instance, the first transmission instance corresponds to a first instance in which a first set of digital credential information associated with the first digital identification credential was transmitted to a first external electronic device, and the second transmission instance corresponds to a second instance in which a second set of digital credential information associated with the first digital identification credential was transmitted to a second external electronic device; while displaying the second user interface, detecting, via the one or more input devices, one or more selection inputs; and in response to detecting the one or more selection inputs: in accordance with a determination that the one or more selection inputs correspond to selection of the representation of the first transmission instance, displaying, via the display generation component, representations of the first set of digital credential information that was transmitted to the first external electronic device in the first instance; and in accordance with a determination that the one or more selection inputs correspond to selection of the representation of the second transmission instance, displaying, via the display generation component, representations of the second set of digital credential information that was transmitted to the second external electronic device in the second instance.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a first user interface that includes one or more representations of digital identification credentials stored on the computer system including a representation of a first digital identification credential; while displaying the first user interface, detecting, via the one or more input devices, one or more user inputs corresponding to selection of the representation of the first digital identification credential; in response to detecting the one or more user inputs corresponding to selection of the representation of the first digital identification credential, displaying, via the display generation component, a second user interface corresponding to the first digital identification credential, wherein: the second user interface includes representations of a plurality of information transmission instances associated with the first digital identification credential, including a representation of a first transmission instance and a representation of a second transmission instance, the first transmission instance corresponds to a first instance in which a first set of digital credential information associated with the first digital identification credential was transmitted to a first external electronic device, and the second transmission instance corresponds to a second instance in which a second set of digital credential information associated with the first digital identification credential was transmitted to a second external electronic device; while displaying the second user interface, detecting, via the one or more input devices, one or more selection inputs; and in response to detecting the one or more selection inputs: in accordance with a determination that the one or more selection inputs correspond to selection of the representation of the first transmission instance, displaying, via the display generation component, representations of the first set of digital credential information that was transmitted to the first external electronic device in the first instance; and in accordance with a determination that the one or more selection inputs correspond to selection of the representation of the second transmission instance, displaying, via the display generation component, representations of the second set of digital credential information that was transmitted to the second external electronic device in the second instance.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: displaying, via the display generation component, a first user interface that includes one or more representations of digital identification credentials stored on the computer system including a representation of a first digital identification credential; while displaying the first user interface, detecting, via the one or more input devices, one or more user inputs corresponding to selection of the representation of the first digital identification credential; in response to detecting the one or more user inputs corresponding to selection of the representation of the first digital identification credential, displaying, via the display generation component, a second user interface corresponding to the first digital identification credential, wherein: the second user interface includes representations of a plurality of information transmission instances associated with the first digital identification credential, including a representation of a first transmission instance and a representation of a second transmission instance, the first transmission instance corresponds to a first instance in which a first set of digital credential information associated with the first digital identification credential was transmitted to a first external electronic device, and the second transmission instance corresponds to a second instance in which a second set of digital credential information associated with the first digital identification credential was transmitted to a second external electronic device; while displaying the second user interface, detecting, via the one or more input devices, one or more selection inputs; and in response to detecting the one or more selection inputs: in accordance with a determination that the one or more selection inputs correspond to selection of the representation of the first transmission instance, displaying, via the display generation component, representations of the first set of digital credential information that was transmitted to the first external electronic device in the first instance; and in accordance with a determination that the one or more selection inputs correspond to selection of the representation of the second transmission instance, displaying, via the display generation component, representations of the second set of digital credential information that was transmitted to the second external electronic device in the second instance.

In accordance with some embodiments, a computer system is described. The computer system is configured to communicate with a display generation component and one or more input devices, and comprises: means for displaying, via the display generation component, a first user interface that includes one or more representations of digital identification credentials stored on the computer system including a representation of a first digital identification credential; means for, while displaying the first user interface, detecting, via the one or more input devices, one or more user inputs corresponding to selection of the representation of the first digital identification credential; means for, in response to detecting the one or more user inputs corresponding to selection of the representation of the first digital identification credential, displaying, via the display generation component, a second user interface corresponding to the first digital identification credential, wherein: the second user interface includes representations of a plurality of information transmission instances associated with the first digital identification credential, including a representation of a first transmission instance and a representation of a second transmission instance, the first transmission instance corresponds to a first instance in which a first set of digital credential information associated with the first digital identification credential was transmitted to a first external electronic device, and the second transmission instance corresponds to a second instance in which a second set of digital credential information associated with the first digital identification credential was transmitted to a second external electronic device; means for, while displaying the second user interface, detecting, via the one or more input devices, one or more selection inputs; and means for, in response to detecting the one or more selection inputs: in accordance with a determination that the one or more selection inputs correspond to selection of the representation of the first transmission instance, displaying, via the display generation component, representations of the first set of digital credential information that was transmitted to the first external electronic device in the first instance; and in accordance with a determination that the one or more selection inputs correspond to selection of the representation of the second transmission instance, displaying, via the display generation component, representations of the second set of digital credential information that was transmitted to the second external electronic device in the second instance.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a first user interface that includes one or more representations of digital identification credentials stored on the computer system including a representation of a first digital identification credential; while displaying the first user interface, detecting, via the one or more input devices, one or more user inputs corresponding to selection of the representation of the first digital identification credential; in response to detecting the one or more user inputs corresponding to selection of the representation of the first digital identification credential, displaying, via the display generation component, a second user interface corresponding to the first digital identification credential, wherein: the second user interface includes representations of a plurality of information transmission instances associated with the first digital identification credential, including a representation of a first transmission instance and a representation of a second transmission instance, the first transmission instance corresponds to a first instance in which a first set of digital credential information associated with the first digital identification credential was transmitted to a first external electronic device, and the second transmission instance corresponds to a second instance in which a second set of digital credential information associated with the first digital identification credential was transmitted to a second external electronic device; while displaying the second user interface, detecting, via the one or more input devices, one or more selection inputs; and in response to detecting the one or more selection inputs: in accordance with a determination that the one or more selection inputs correspond to selection of the representation of the first transmission instance, displaying, via the display generation component, representations of the first set of digital credential information that was transmitted to the first external electronic device in the first instance; and in accordance with a determination that the one or more selection inputs correspond to selection of the representation of the second transmission instance, displaying, via the display generation component, representations of the second set of digital credential information that was transmitted to the second external electronic device in the second instance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for enrolling, managing, and using digital credentials, thereby increasing the effectiveness, efficiency, and user satisfaction with such devices. Such methods and interfaces may complement or replace other methods for enrolling, managing, and using digital credentials.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 illustrates a flow diagram depicting a method for enrolling a digital identification credential in accordance with some embodiments.

FIGS. 8A-8H illustrate exemplary user interfaces for using a digital identification credential in accordance with some embodiments.

FIG. 9 illustrates a flow diagram depicting a method for using a digital identification credential in accordance with some embodiments.

FIGS. 11A-11B illustrate a flow diagram depicting a method for managing digital identification credentials in accordance with some embodiments.

DESCRIPTION OF EMBODIMENTS

Figure 1A:
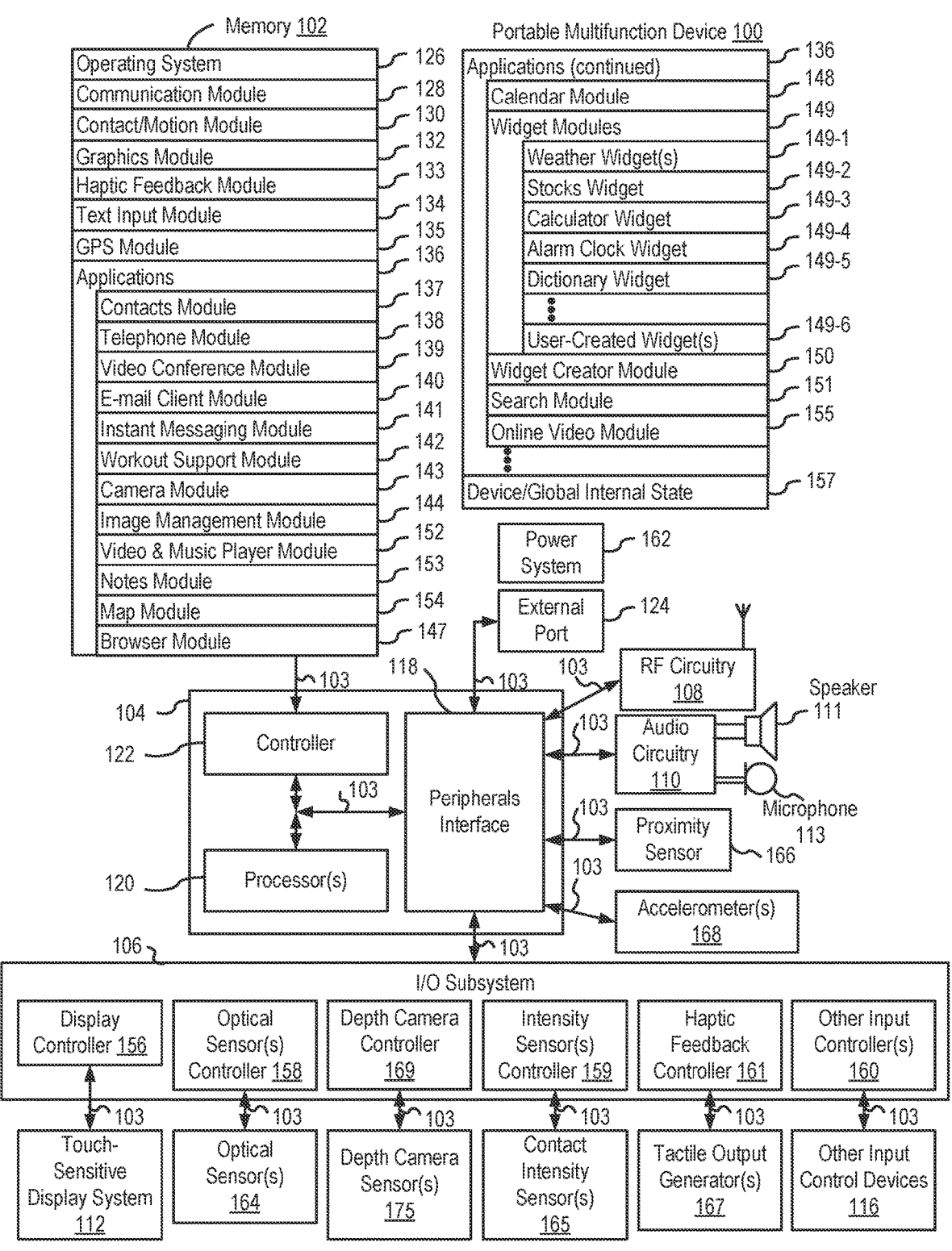
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for enrolling, using, and managing digital credentials. For example, there is a need for techniques that provide a secure way to enroll, use, and manage digital credentials while minimizing unnecessary manual effort by a user to enroll, use, and manage digital credentials. Such techniques can reduce the cognitive burden on a user who enrolls, uses, and manages digital credentials, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6AF illustrate exemplary user interfaces for enrolling a digital identification credential. FIG. 7 is a flow diagram illustrating methods of enrolling a digital identification credential in accordance with some embodiments. The user interfaces in FIGS. 6A-6AF are used to illustrate the processes described below, including the processes in FIG. 7. FIGS. 8A-8H illustrate exemplary user interfaces for using a digital identification credential. FIG. 9 is a flow diagram illustrating methods of using a digital identification credential in accordance with some embodiments. The user interfaces in FIGS. 8A-8H are used to illustrate the processes described below, including the processes in FIG. 9. FIGS. 10A-10J illustrate exemplary user interfaces for managing digital identification credentials. FIGS. 11A-11B are a flow diagram illustrating methods of managing digital identification credentials in accordance with some embodiments. The user interfaces in FIGS. 10A-10J are used to illustrate the processes described below, including the processes in FIGS. 11A-11B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, providing improved and/or enhanced security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio.

The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
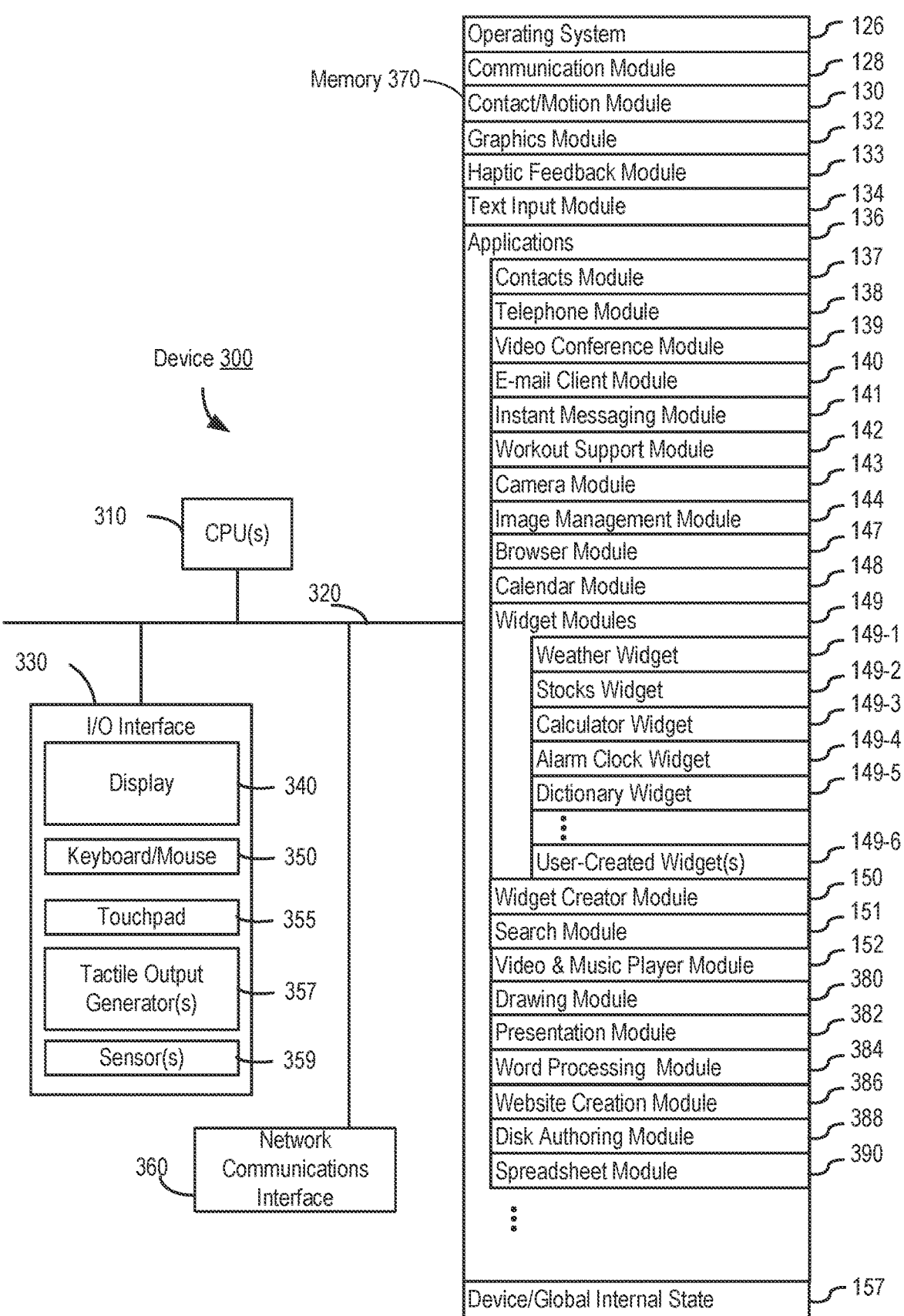
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
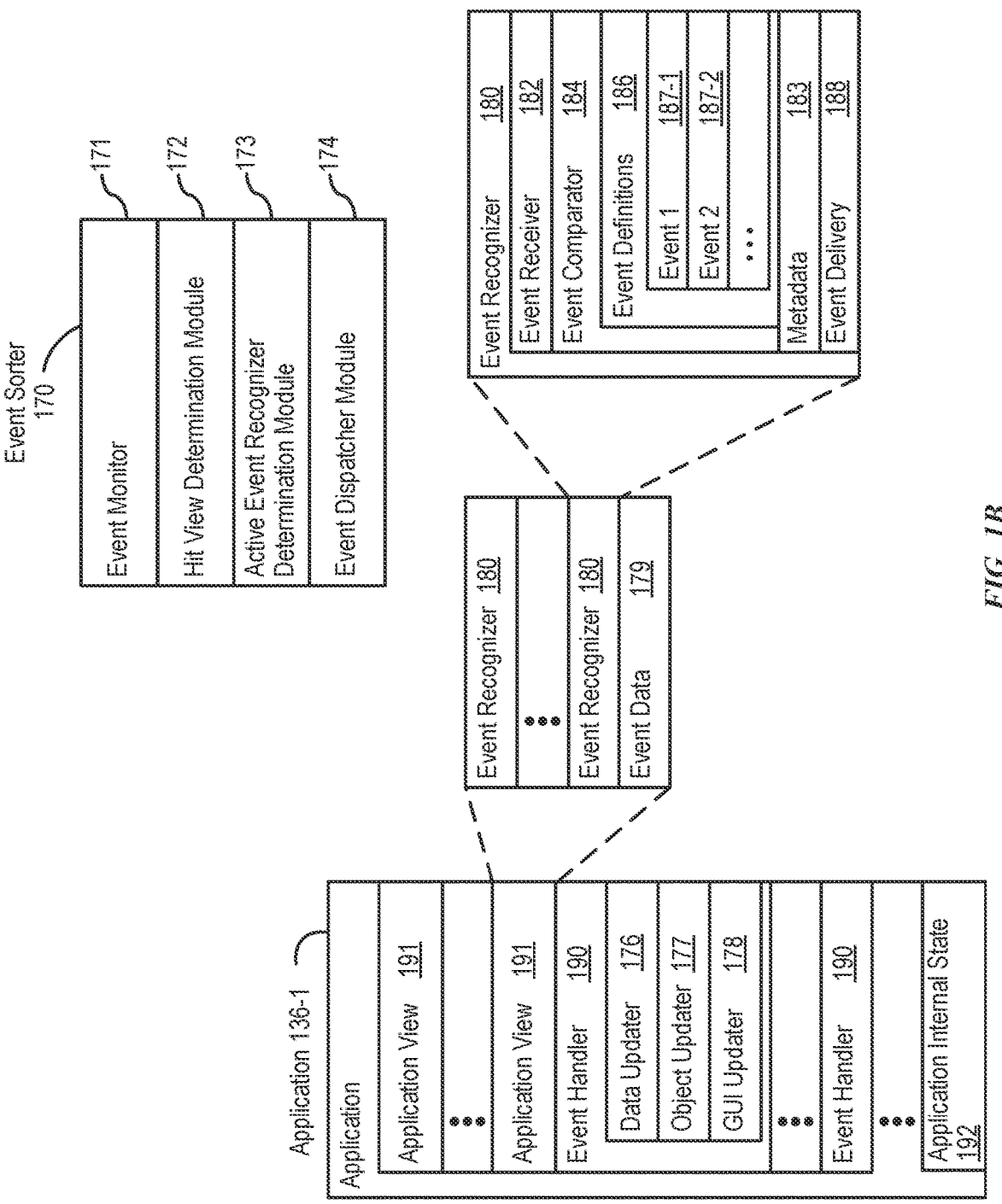
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
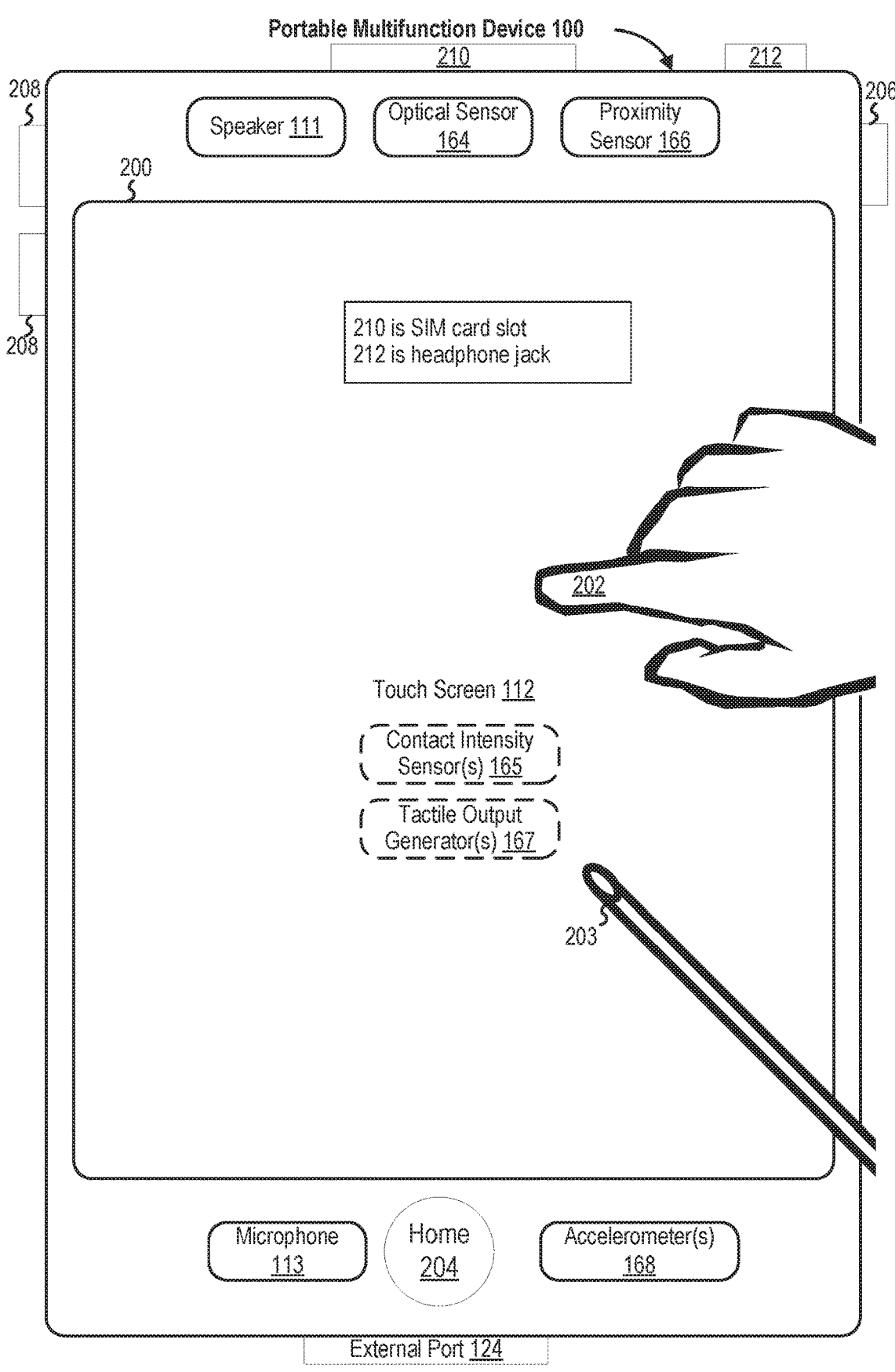
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
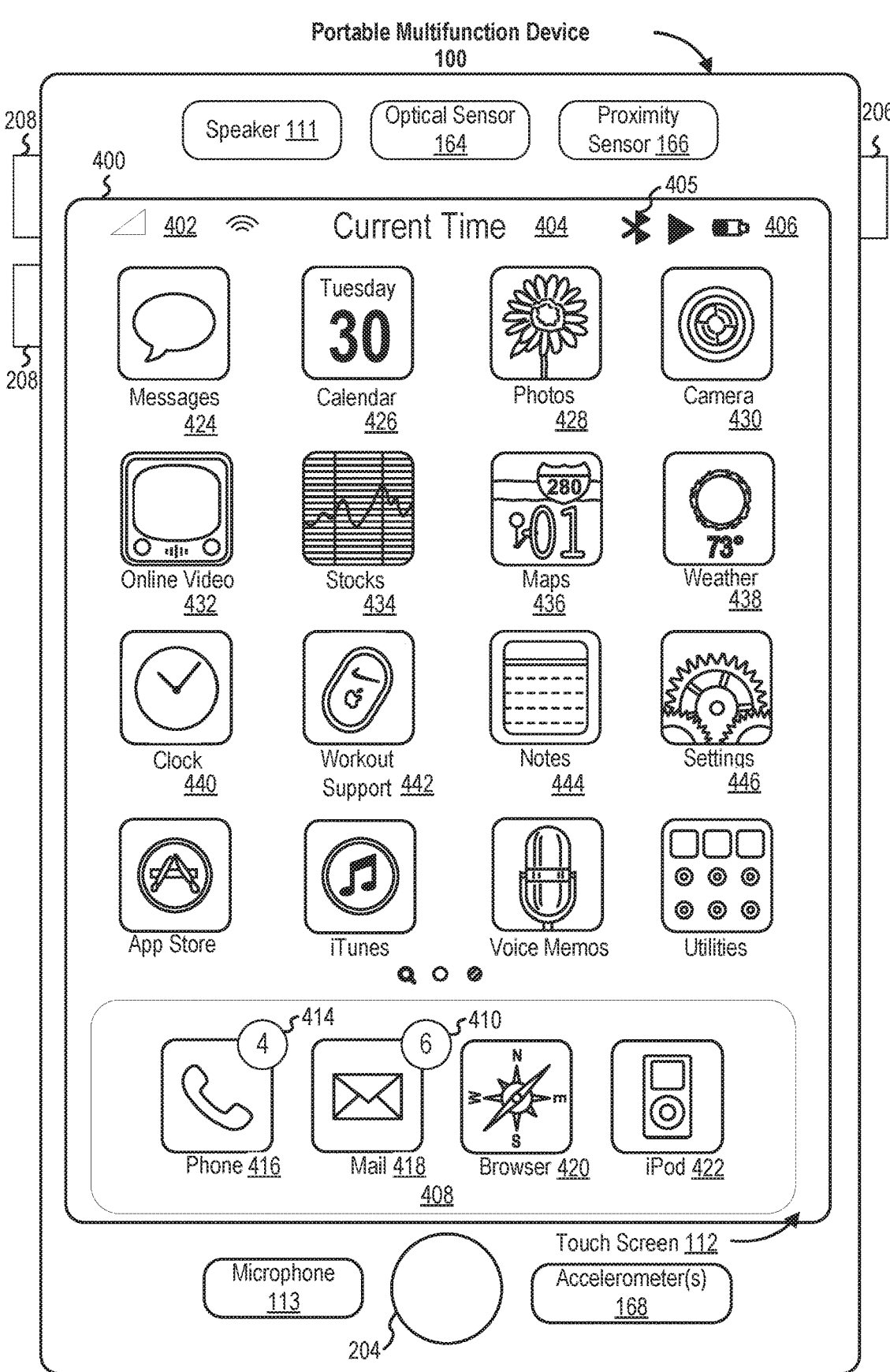
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
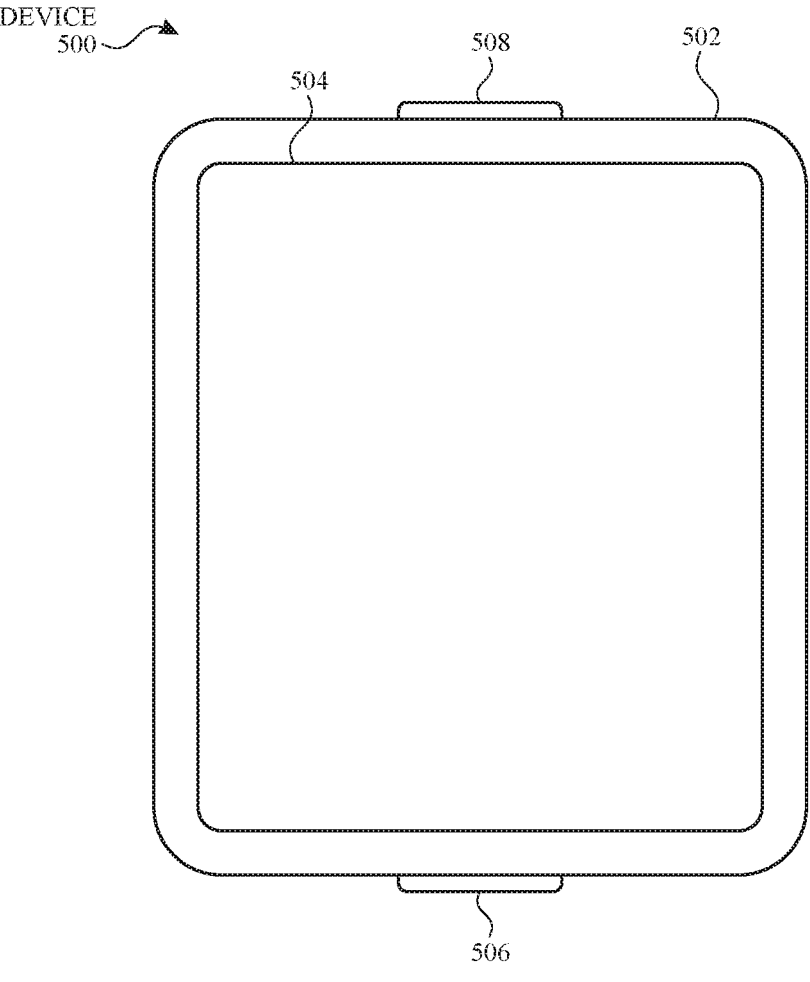
FIG. 5A illustrates a personal electronic device in accordance with some embodiments.
Figures 6A, 6B:
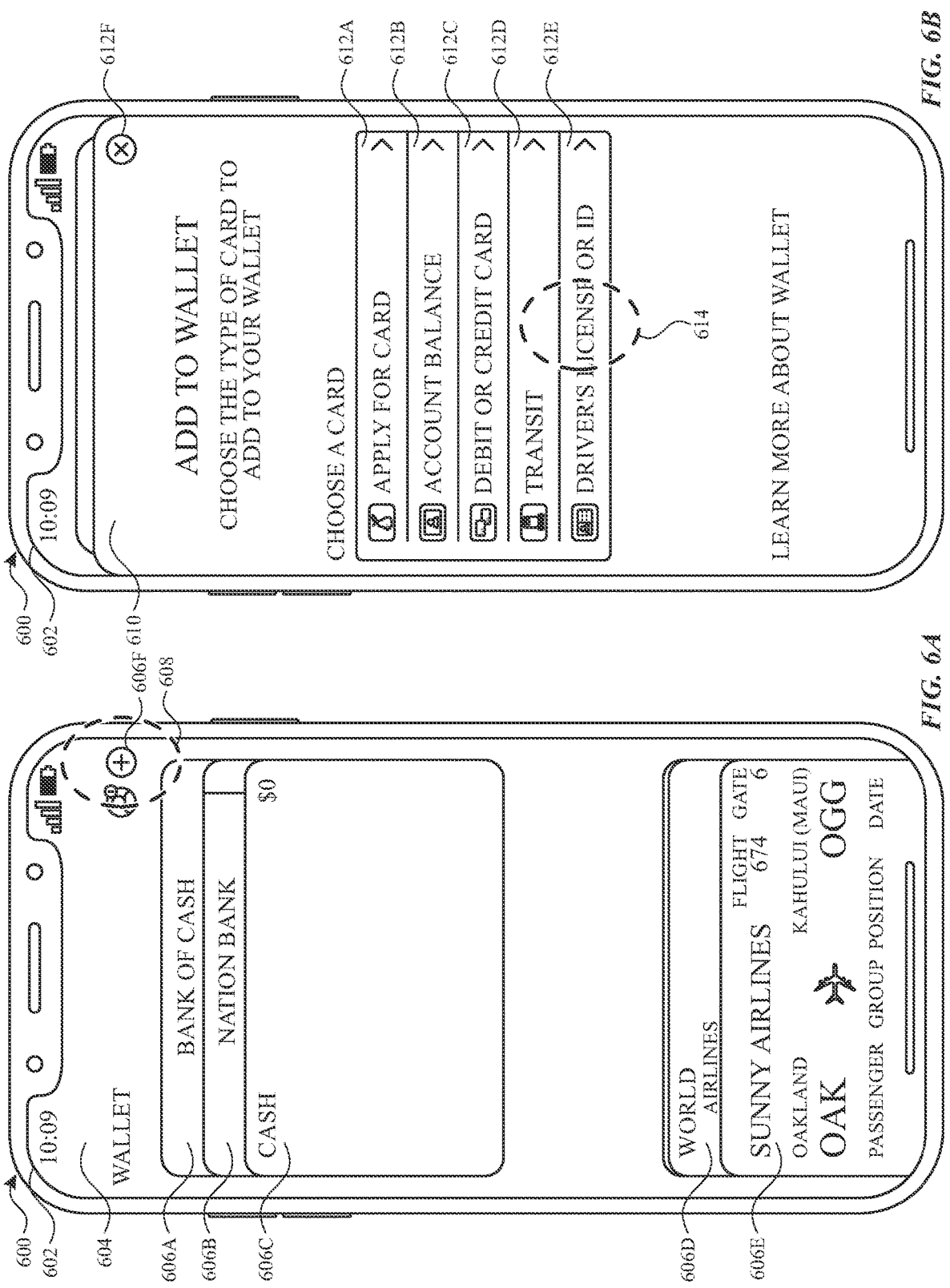
FIGS. 6A-6AF illustrate exemplary user interfaces for enrolling a digital identification credential in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
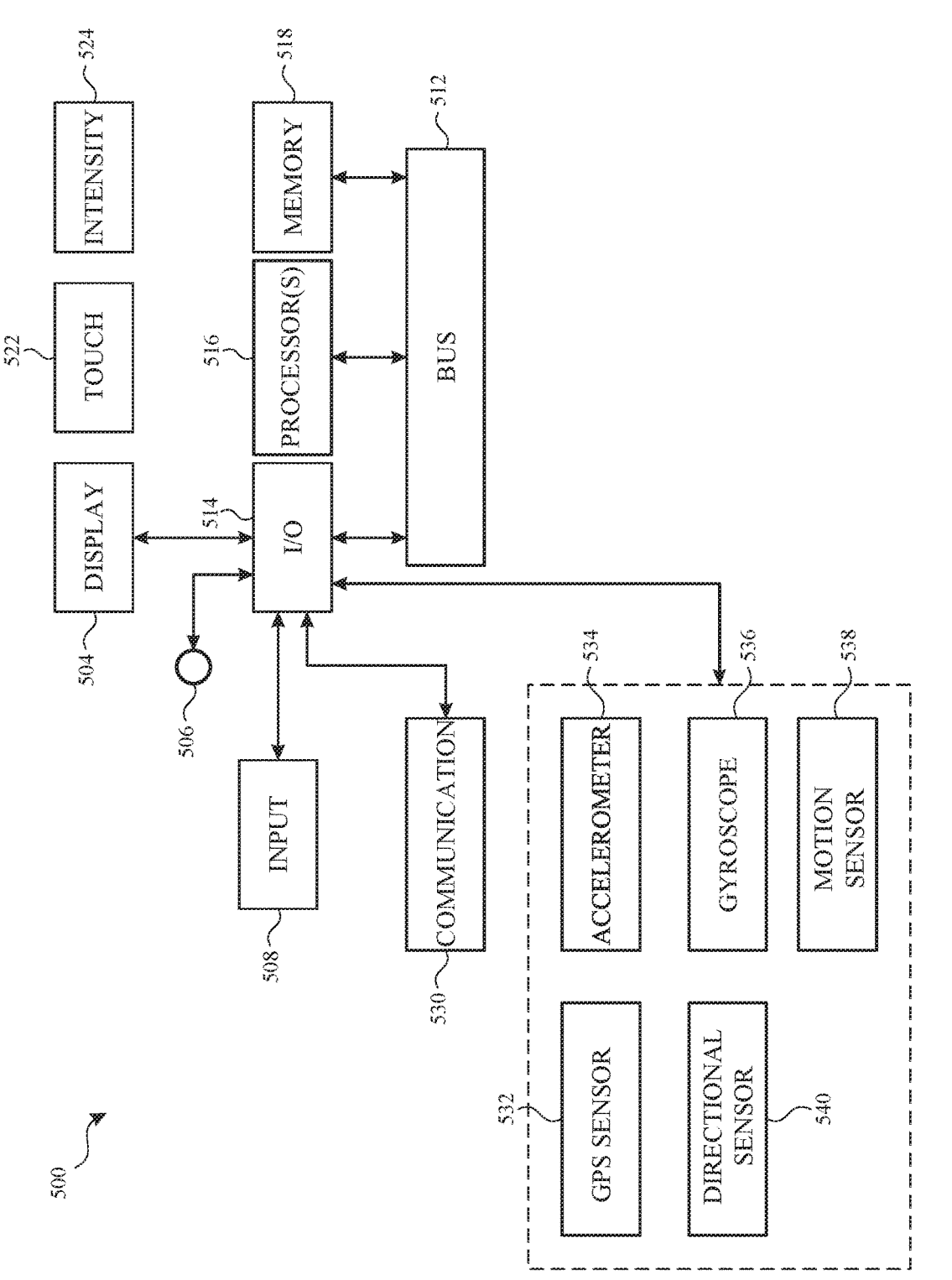
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11A-11B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AF illustrate exemplary user interfaces for enrolling a digital credential, in accordance with some embodiments. The user interfaces in these figures are used to illustrate the processes described below, including the processes in FIG. 7.

FIG. 6A depicts electronic device 600, which is a smartphone with touch-sensitive display 602. In some embodiments, electronic device 600 includes one or more features of devices 100, 300, and/or 500. Electronic device 600 depicts wallet user interface 604. Wallet user interface 604 includes representations of digital credentials 606A-606E that are stored on electronic device 600 (e.g., in a secure element of electronic device 600). Digital credential representations 606A-606E include digital payment credential representations 606A-606C (e.g., digital credentials that can be used to make payments for goods and services), and digital access credential representations 606D-606E (e.g., digital credentials that can be used for a user to gain access to goods and services, such as airline flights, events, and the like). Wallet user interface 604 also includes option 606F that is selectable to initiate a process for adding a new digital credential to electronic device 600 (e.g., for enrolling a new digital credential on electronic device 600). At FIG. 6A, electronic device detects user input 608 corresponding to selection of option 606F.

At FIG. 6B, in response to user input 608, electronic device 600 displays user interface 610. User interface 610 includes a plurality of options 612A-612E for adding different types of digital credentials to electronic device 600

(e.g., enrolling different types of digital credentials on electronic device 600). Option 612A is selectable to apply for a new digital payment credential (e.g., apply for a new payment card that will be added as a digital payment credential). Option 612B is selectable to add a digital account balance credential to electronic device 600. Option 612C is selectable to add a digital payment credential to electronic device 600. Option 612D is selectable to add a digital transit credential to electronic device 600. Option 612E is selectable to add a digital identification credential to electronic device 600. User interface 610 also includes option 612F that is selectable to close user interface 610, and return to wallet user interface 604. At FIG. 6B, electronic device 600 detects user input 614 corresponding to selection of option 612E.

Figures 6C, 6D:
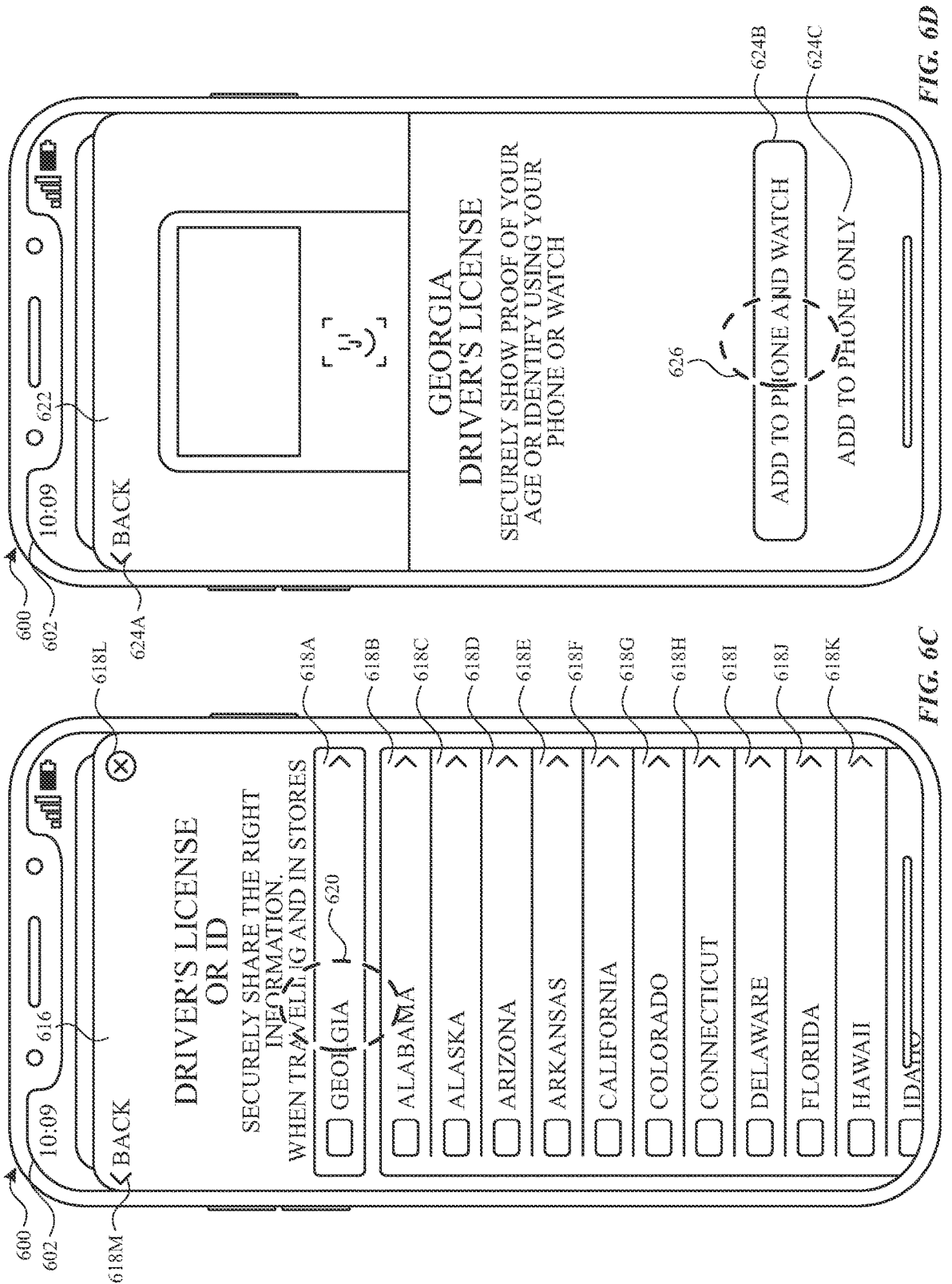

At FIG. 6C, in response to user input 614, electronic device 600 displays user interface 616. User interface 616 includes option 618L that is selectable to close user interface 616 and return to wallet user interface 604, and option 618M that is selectable to return to user interface 610. User interface 616 also includes geographic region options 618A-618K that are selectable by a user to indicate a geographic region for the digital identification credential the user wishes to add to electronic device 600. In the depicted embodiment, geographic region options 618A-618K correspond to respective different states. In FIG. 6C, electronic device 600 detects user input 620 corresponding to selection of geographic option 618A, which corresponds to the geographic region (e.g., state) of Georgia.

At FIG. 6D, in response to user input 620, electronic device 600 displays user interface 622. User interface 622 includes option 624A that is selectable to cease displaying user interface 622 and return to user interface 616. User interface 622 also includes options 624B-624C. Option 624B is selectable to enroll the new digital identification credential on electronic device 600 and an additional electronic device (in this case, a smartwatch (e.g., a smartwatch corresponding to and/or associated with electronic device 600). Option 624C is selectable to enroll the new digital identification credential on only electronic device 600, without enrolling the new digital identification credential on any other electronic devices. At FIG. 6D, electronic device 600 detects user input 626 corresponding to selection of option 624B.

Figure 6E:
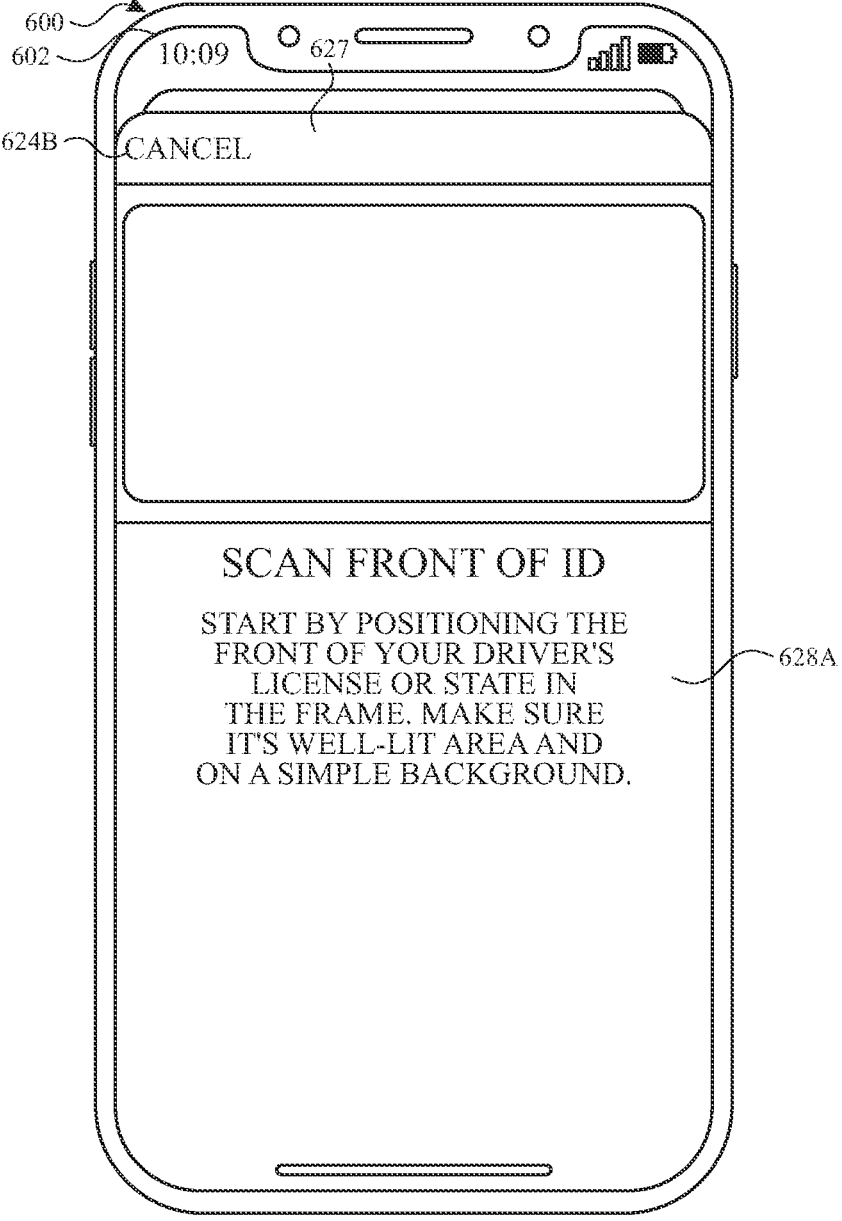

At FIG. 6E, in response to user input 626, electronic device 600 displays physical identification capture user interface 627. Physical identification capture user interface 627 includes cancel option 628B that is selectable to close physical identification capture user interface 627 and return to wallet user interface 604 (e.g., selectable to cancel enrollment of the new digital identification credential). Physical identification capture user interface 627 also includes instructions 628A instructing a user to use a camera on electronic device 600 to capture an image of the front of a physical identification credential (e.g., a physical identification card) corresponding to the digital identification credential the user wishes to add to electronic device 600. In some embodiments, identification capture user interface 627 automatically includes a viewfinder of a camera of electronic device 600.

Figure 6F:
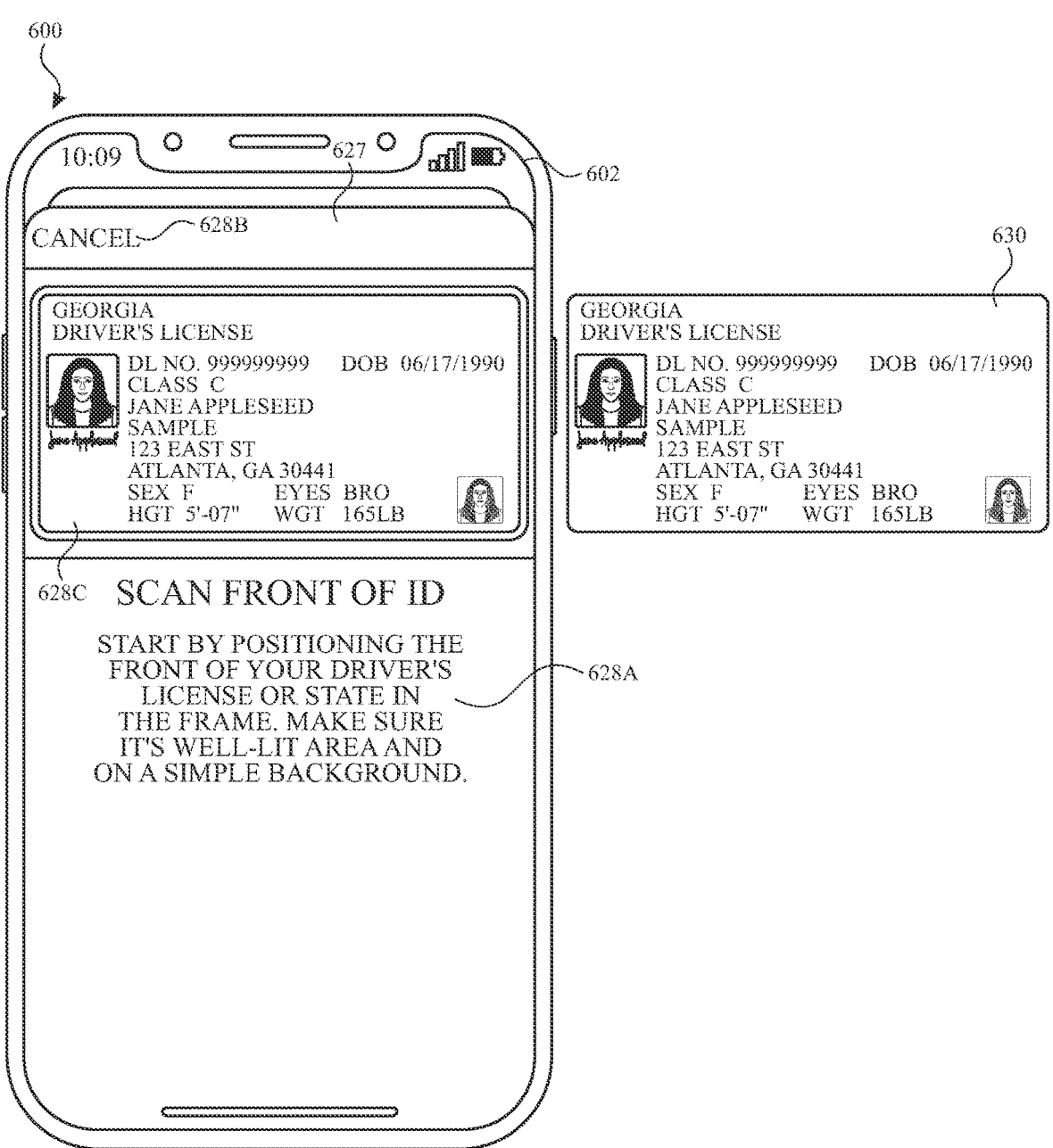

At FIG. 6F, the user has placed physical identification credential 630 in front of the camera of electronic device 600, and physical identification capture user interface 627 displays camera capture region 628C, which depicts image data being captured and/or received (e.g., a viewfinder) via the camera of electronic device 600. In FIG. 6F, electronic device 600 detects that the front of physical identification credential 630 is in a field-of-view of the camera (e.g., detects that camera capture region 628C depicts an object that has a shape that is recognized as potentially being a physical identification credential), and automatically captures an image of the front of physical identification credential 630. In some embodiments, physical identification capture user interface 627 includes a shutter button so that the user can provide a user input for electronic device 600 to capture the image of the front of physical identification credential 630.

Figures 6G, 6H:
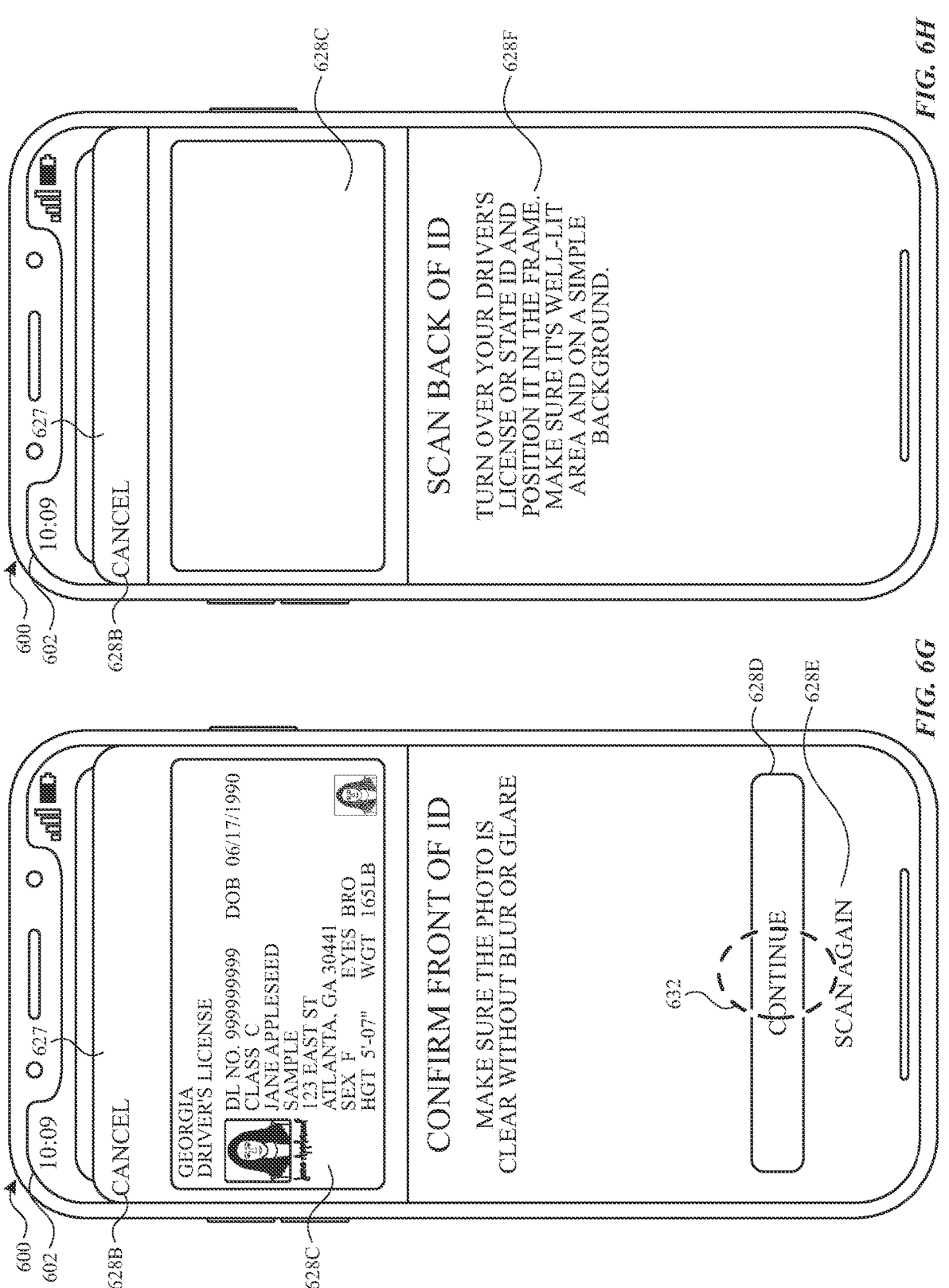

At FIG. 6G, in response to electronic device 600 capturing the image of the front of physical identification credential 630, user interface 627 displays the captured image in camera capture region 628C. User interface 627 also displays option 628D that is selectable to indicate that the captured image is acceptable (e.g., is sufficiently clear and captures the front of physical identification credential 630), and option 628E that is selectable to return to user interface 627 of FIG. 6F in order to capture a new image of the front of physical identification credential 630. At FIG. 6G, electronic device 600 detects user input 632 corresponding to selection of option 628D.

Figure 6I:
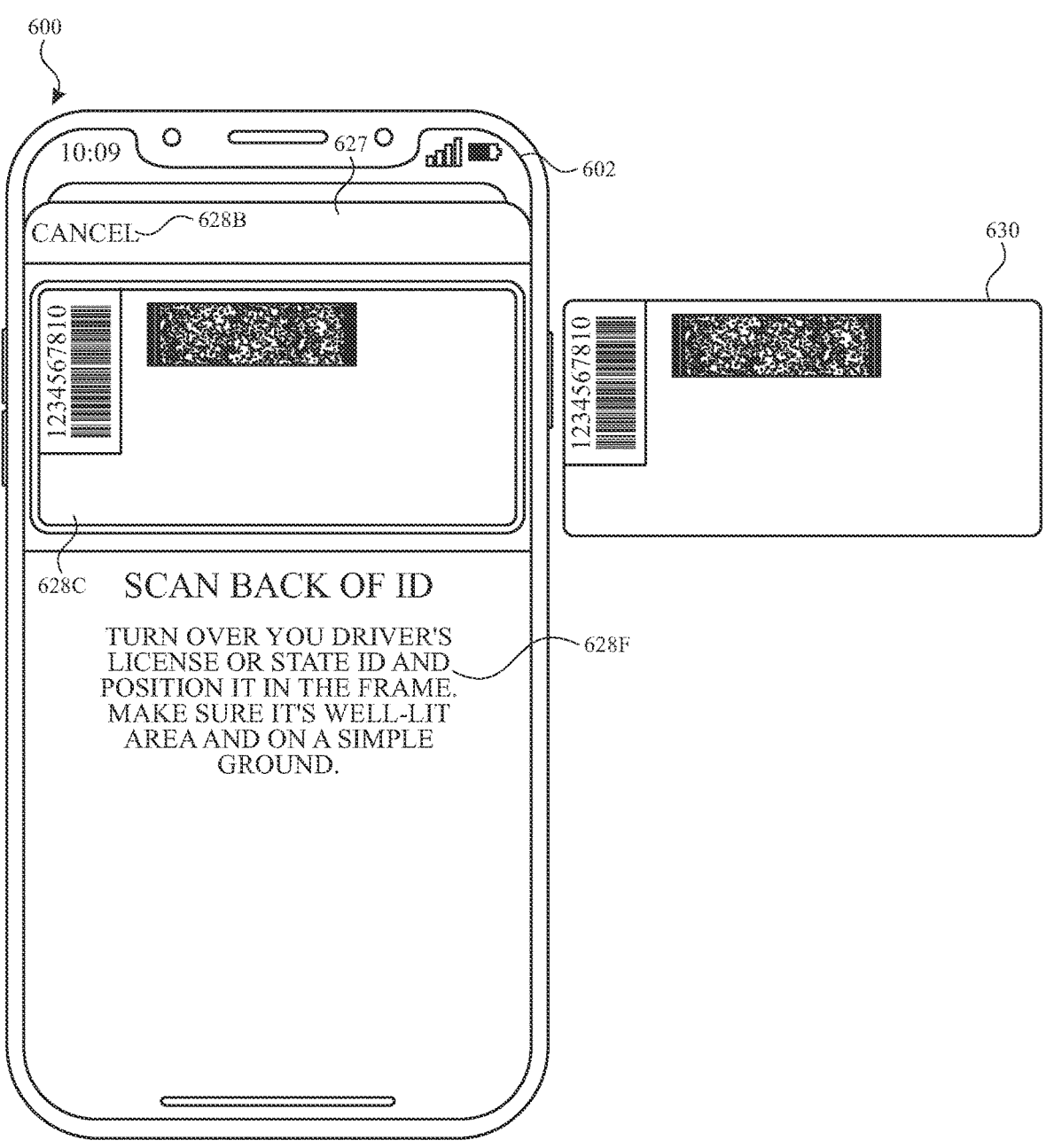

At FIG. 6H, in response to user input 632, electronic device 600 updates user interface 627 with updated instructions 628F, which instruct a user to take a picture of a back side of physical identification credential 630. At FIG. 6I, the user has flipped over physical identification credential 630, and camera capture region 628C again depicts image data being captured and/or received via the camera of electronic device 600. In FIG. 6I, electronic device 600 detects that the back of physical identification credential 630 is in the field-of-view of the camera (e.g., detects that camera capture region 628C depicts an object that has a shape that is recognized as potentially being a physical identification credential), and automatically captures an image of the back of physical identification credential 630. In some embodiments, user interface 627 includes a shutter button so that the user can provide a user input for electronic device 600 to capture the image of the back of physical identification credential 630.

At FIG. 6I, in response to electronic device 600 capturing the image of the back of physical identification credential 630, user interface 627 displays the captured image in camera capture region 628C. User interface 627 also displays option 628G that is selectable to indicate that the captured image is acceptable (e.g., is sufficiently clear and captures the back of physical identification credential 630), and option 628H that is selectable to return to user interface 627 of FIG. 6H in order to capture a new image of the back of physical identification credential 630. At FIG. 6J, electronic device 600 detects user input 634 corresponding to selection of option 628G.

Figures 6J, 6K:
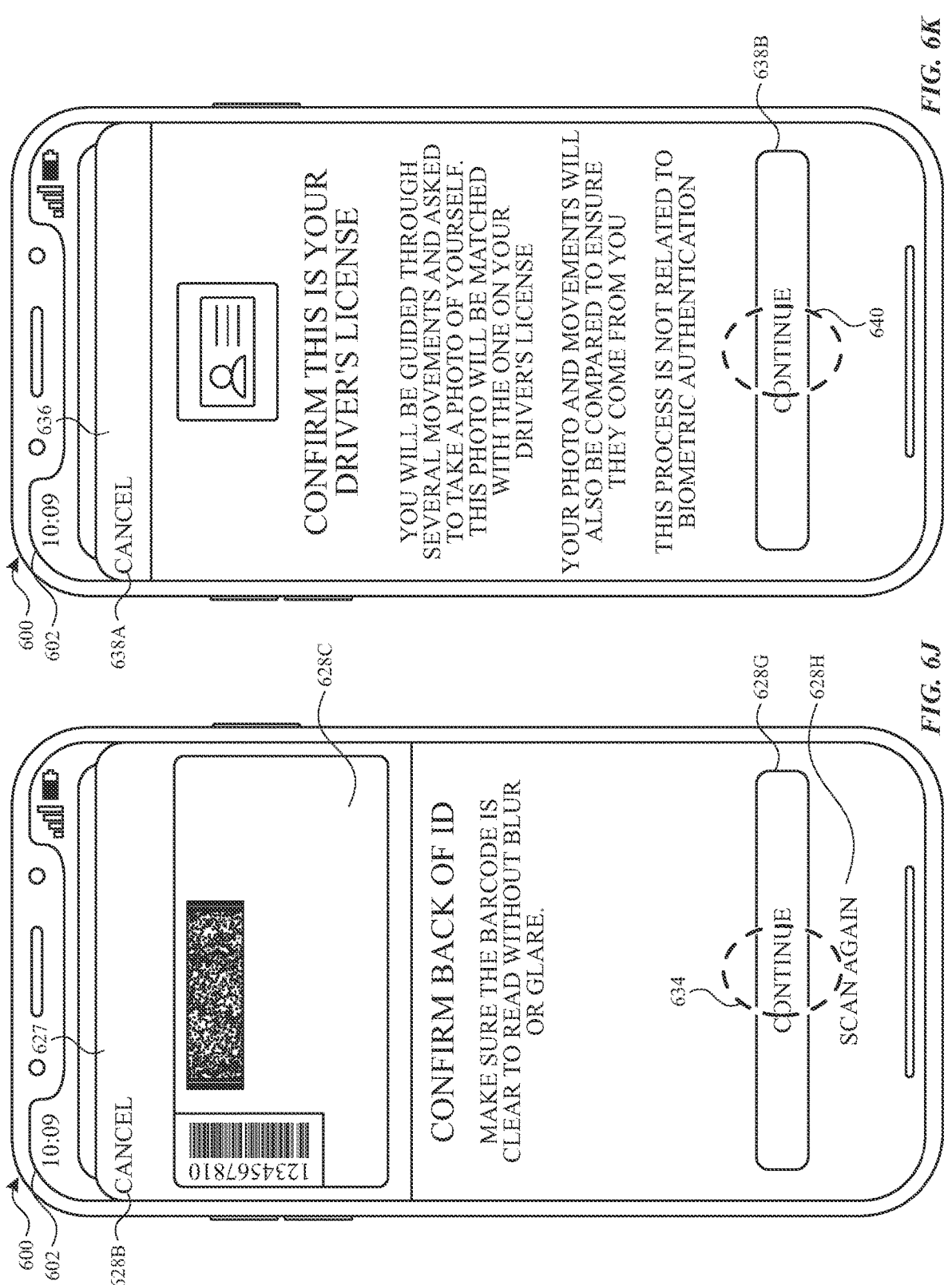

At FIG. 6K, in response to user input 634, electronic device 600 displays liveness check user interface 636. In FIG. 6K, liveness check user interface 636 includes option 638A that is selectable to close liveness check user interface 636 and return to wallet user interface 604 (e.g., selectable to cancel enrollment of the new digital identification credential). Liveness check user interface 636 also includes option 638B that is selectable to proceed with providing liveness check information, and proceed with enrolling the new digital identification credential on electronic device 600. At FIG. 6K, electronic device 600 detects user input 640 corresponding to selection of option 638B.

Figures 6L, 6M:
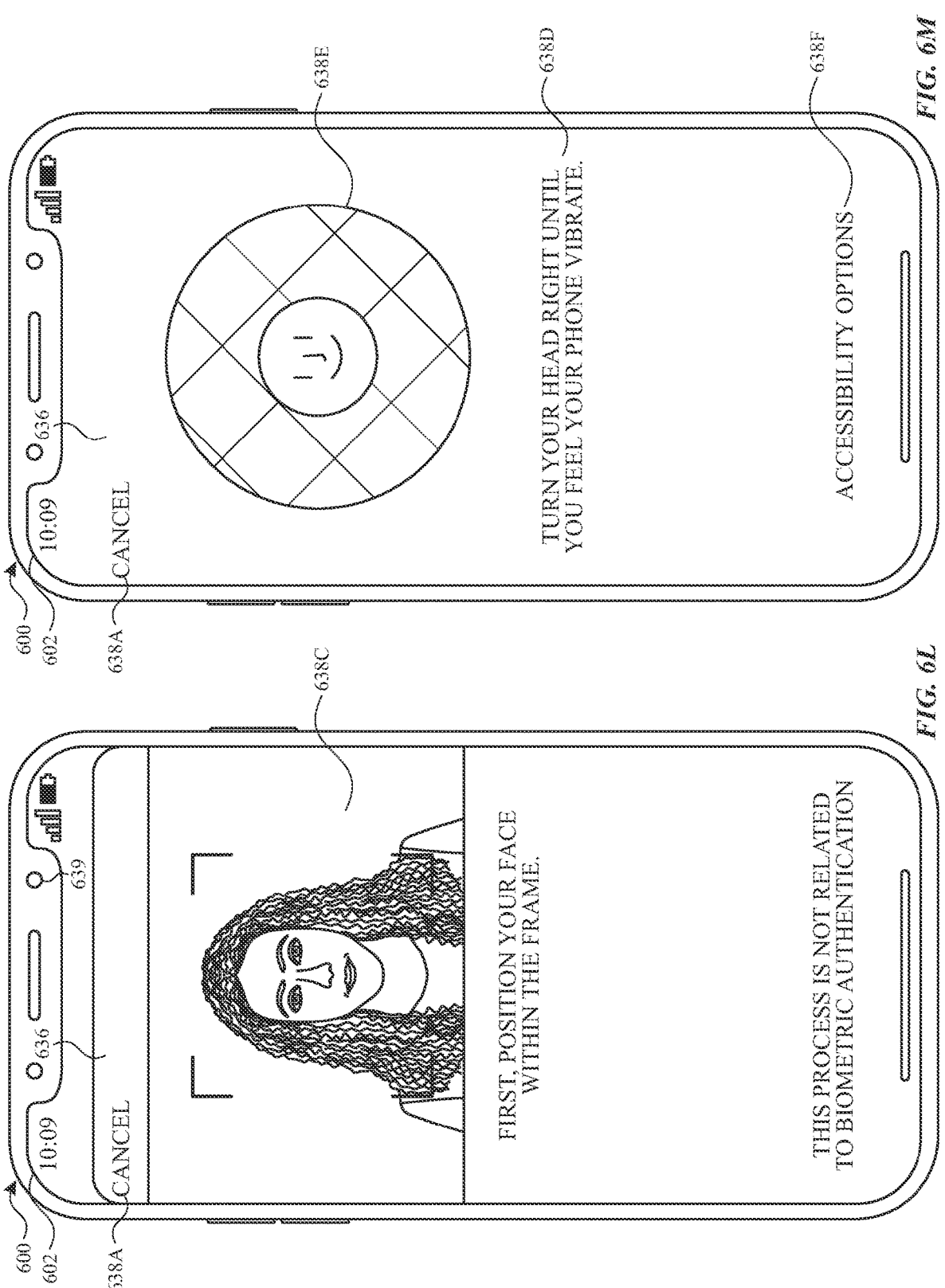

At FIG. 6L, in response to user input 640, electronic device 600 updates liveness check user interface 636 to display camera capture region 638C depicting image data being captured and/or received via a camera of electronic device 600 (e.g., camera 639, a front/user facing camera), along with an instruction for the user to position his or her face within the frame of the camera. In FIG. 6L, camera capture region 638C depicts an image of the user's face as it is being captured by camera 639.

At FIG. 6M, in response to detecting that camera capture region 638C depicts the user's face and/or after a threshold period of time has passed, electronic device 600 updates liveness check user interface 636 to include instructions 638D, which instruct a user to provide liveness check information by performing one or more gestures. The one or more gestures are selected (e.g., randomly or pseudo-randomly selected) from a plurality of possible gestures. In FIG. 6M, instructions 638D instruct the user to turn his or her head to the right until the user feels electronic device 600 vibrate. User interface 636 also includes demonstration 638E, which depicts an animated (e.g., moving) demonstration of the gesture instructed by instructions 638D. User interface 636 also includes option 638F that is selectable to reveal various accessibility options. In some embodiments, the accessibility options include, for example, an option to change the gesture (e.g., in case the user is not physically able to perform the requested gesture), and/or an option that allows a user to dictate when electronic device 600 begins detecting the instructed gesture.

Figures 6N, 6O:
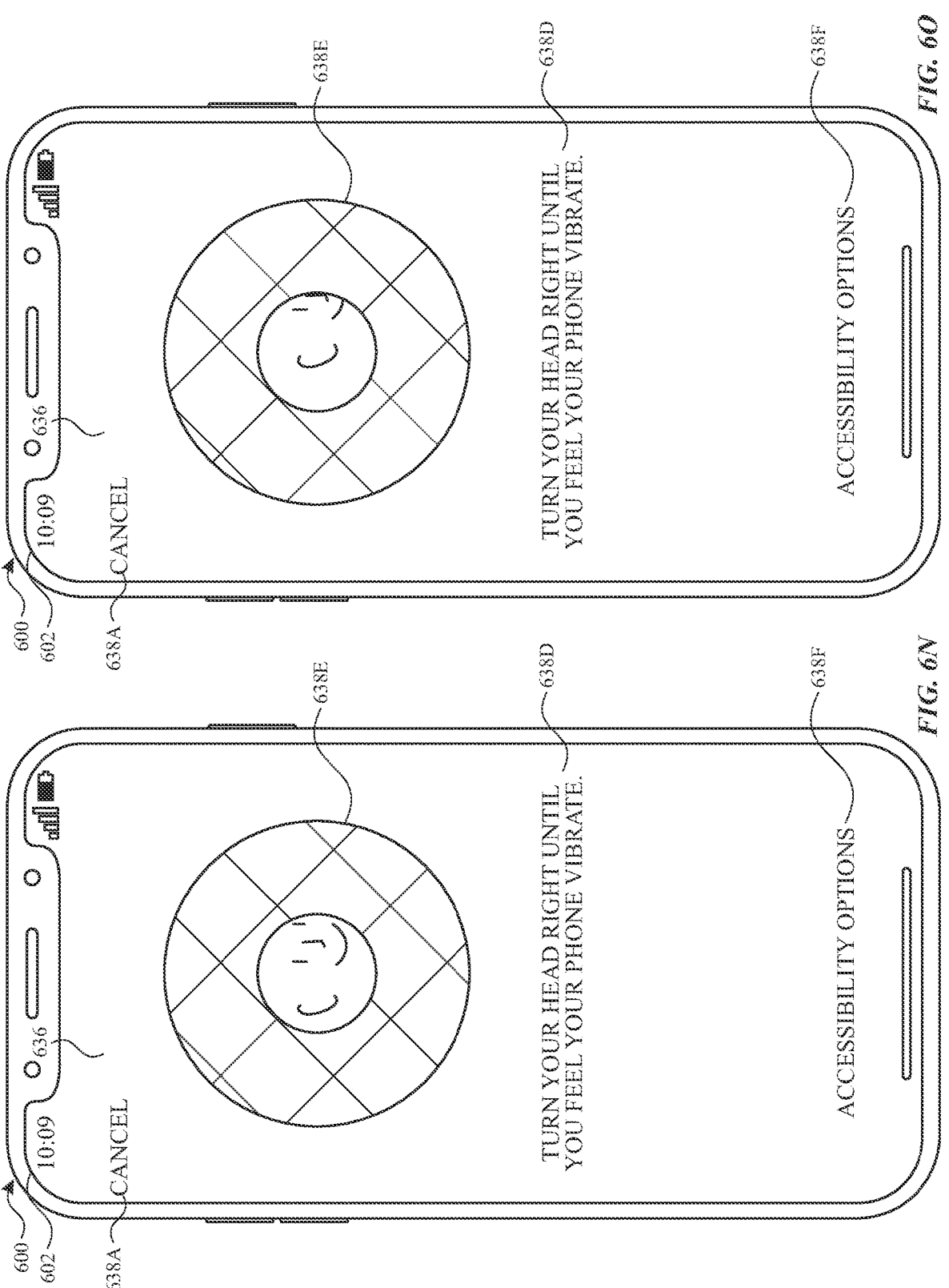

At FIG. 6N, demonstration 638E progresses to show a demonstration avatar turning its head to the right. At FIG. 6O, demonstration 638E further progresses to show the demonstration avatar turning its head to the right.

Figures 6P, 6Q:
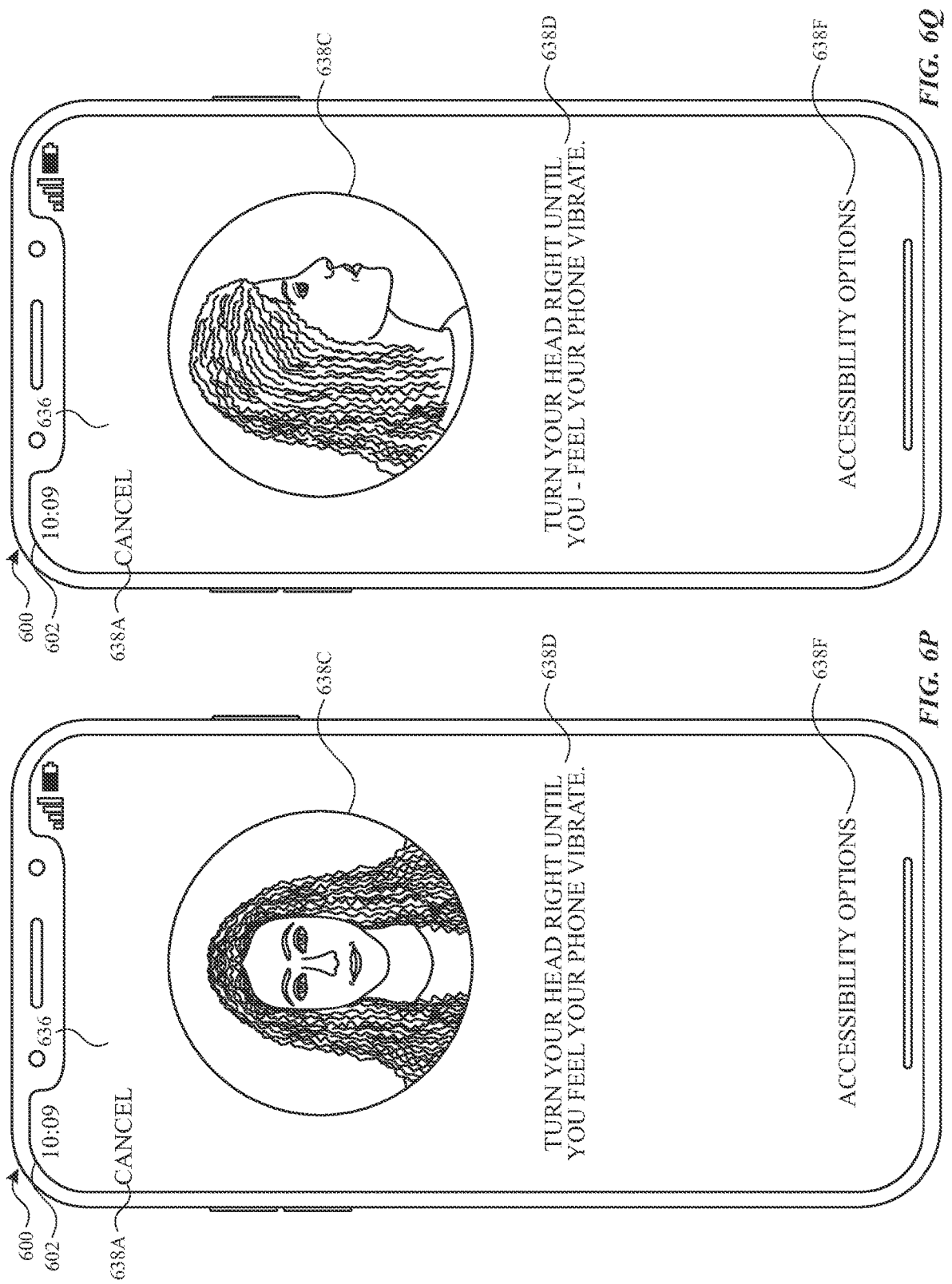

At FIG. 6P, electronic device 600 replaces demonstration 638E with camera capture region 638C. In some embodiments, electronic device 600 replaces demonstration 638E with camera capture region 638C after demonstration 638E has been displayed for a threshold period of time, and/or after demonstration 638E has demonstrated the instructed gesture a predefined number of times, and/or in response to a user input (e.g., a user input indicating that the user is ready to perform the instructed gesture).

Figures 6R, 6S:
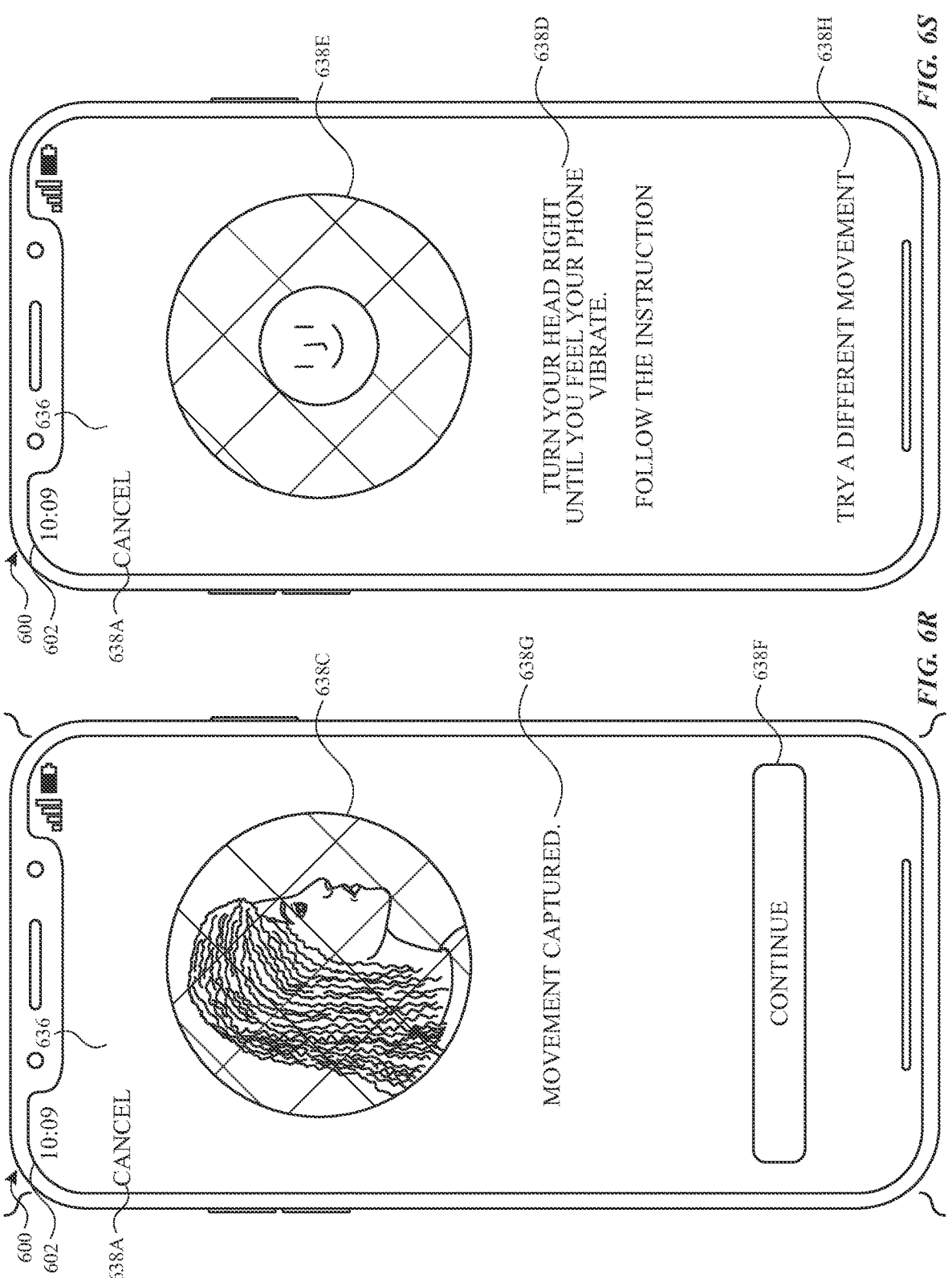

FIGS. 6P-6R illustrate a first example scenario in which the user successfully performs the instructed gesture of turning his or head to the run until electronic device 600 vibrates. In FIG. 6Q, camera capture region 638C depicts the user turning his or her head to the right, and in FIG. 6R, in response to a determination that the user has performed the requested gesture, user interface 636 depicts confirmation 638G indicating that the requested gesture has been detected, and electronic device 600 outputs a tactile output (e.g., a haptic output, a vibration) indicating that the requested gesture has been detected. In some embodiments, the determination of whether or not the user has performed the instructed gesture (e.g., whether or not the instructed gesture has been detected) is made based on a machine learning model (e.g., a machine learning model stored on electronic device 600).

FIG. 6S illustrates a second example scenario in which the user does not perform the instructed gesture. In FIG. 6S, in accordance with a determination that the instructed gesture has not been detected after a threshold duration of time (e.g., after camera capture region 638C has been displayed for a threshold duration of time and/or instruction 638D has been displayed for a threshold duration of time), electronic device 600 replaces display of camera capture region 638C with demonstration 638E. Electronic device 600 also displays option 638H, which is selectable by a user to request a different gesture.

At FIG. 6T, in accordance with a determination that the instructed gesture has not been detected after a second threshold duration of time, electronic device 600 displays indication 638I indicating that the instructed gesture was not detected. Electronic device 600 also displays option 638J, which is selectable to re-try the previously instructed gesture, and option 638K, which is selectable to request a different gesture. At FIG. 6T, electronic device 600 detects user input 642 corresponding to selection of option 638K.

At FIG. 6U, in response to user input 642, electronic device 600 updates liveness check user interface 636 by updating instructions 638D to instruct the user to perform a different gesture. In FIG. 6U, instructions 638D now instruct the user to smile until the user feels electronic device 600 vibrate. Demonstration 638E is also updated with a demonstration of the new gesture. In FIG. 6U, liveness check user interface 636 also includes a new option 638L that is selectable by a user to indicate that the user is ready to perform the requested gesture. At FIG. 6U, electronic device 600 detects user input 644 corresponding to selection of option 638L.

At FIG. 6V, in response to user input 644, electronic device 600 replaces demonstration 638E with camera capture region 638C, which shows image data being captured by camera 639. In FIG. 6W, electronic device 600 determines that the instructed gesture (in this case, a smile gesture), has been detected, and electronic device 600 displays gesture confirmation indication 638M, and outputs a tactile output (e.g., vibration).

Figures 6X, 6Y:
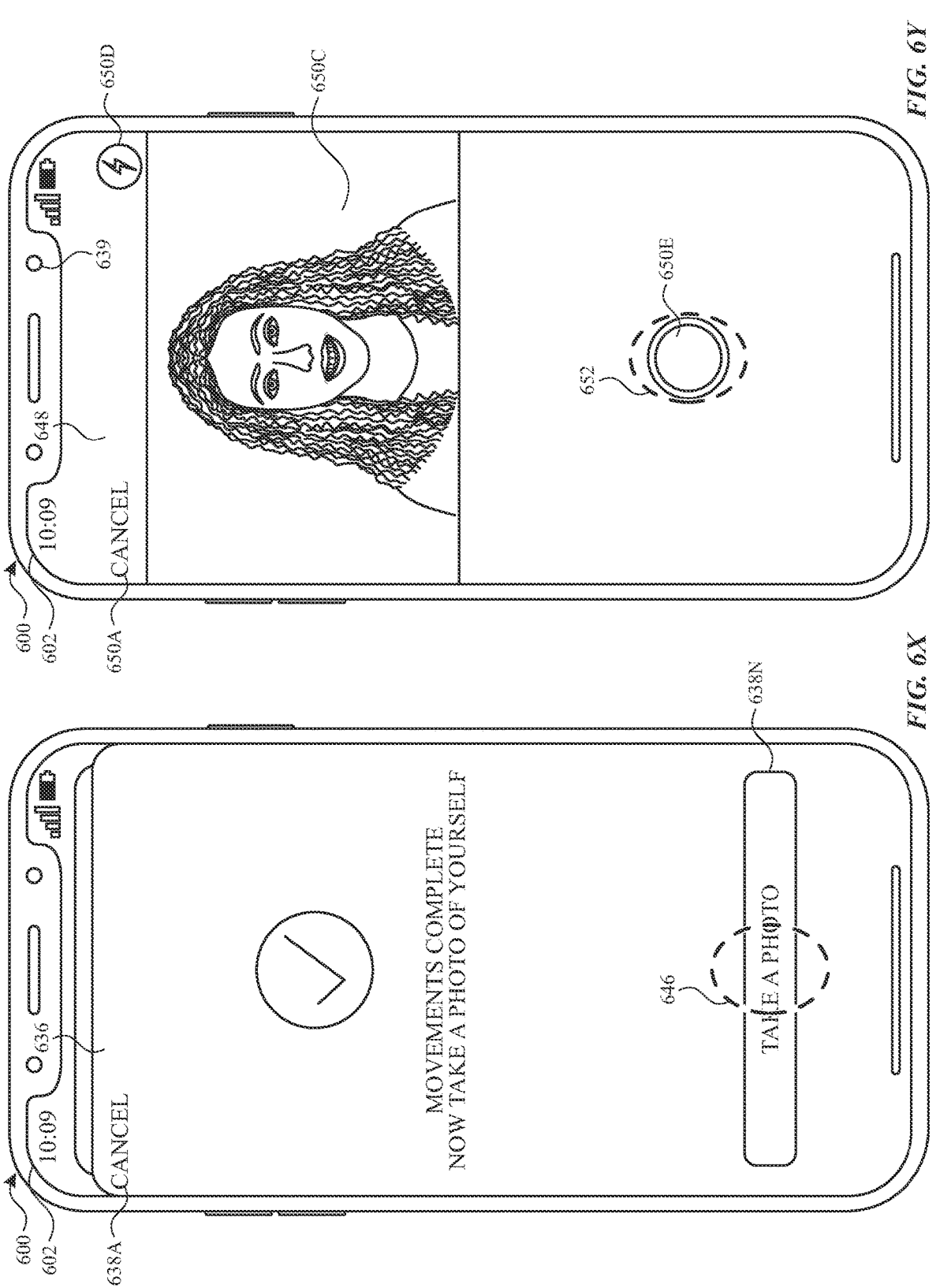

At FIG. 6X, in response to electronic device 600 determining that the instructed gesture has been detected, electronic device completes a liveness check portion of the enrollment process, and displays identity check user interface 648, including option 638N that is selectable to proceed with an identity check portion of enrollment. In FIG. 6X, electronic device detects user input 646 corresponding to selection of option 638N.

At FIG. 6Y, in response to user input 646, electronic device 600 updates identity check user interface 648. Identity check user interface 648 includes option 650A that is selectable to close identity check user interface 648 and return to wallet user interface 604 (e.g., selectable to cancel enrollment of the new digital identification credential). Identity check user interface 648 also includes camera capture region 650C, which depicts image data being received and/or captured via camera 639 of electronic device 600, flash option 650D that is selectable to turn a flash on or off, and shutter button 650E that is selectable to capture an image. In FIG. 6Y, electronic device 600 detects user input 652 corresponding to selection of shutter button 650E.

In some embodiments, the identity check portion of the enrollment process includes comparing the self-image of the user taken in FIG. 6Y with one or more frames of the video captured as part of the liveness check portion of the enrollment process (e.g., FIGS. 6M-6W) to ensure and/or determine that the user performing the gesture(s) in the liveness check portion is the same user that is depicted in the self-image of the identity check portion. In some embodiments, the identity check portion of the enrollment process includes (e.g., also includes) comparing the self-image of the user taken in FIG. 6Y with an image of the user depicted on the physical identification credential corresponding to the digital identification credential (e.g., physical identification credential 630). In some embodiments, a third party (e.g., a state and/or government agency) confirms that the user depicted in the self-photo matches a user depicted on the physical identification credential. By performing these identity checks, it can be confirmed that the person performing the gestures in the liveness check is the same person that is depicted on the physical identification credential (e.g., in some embodiments, without transmitting any portion of the liveness check video to any external computer system and/or third party).

Figure 6Z:
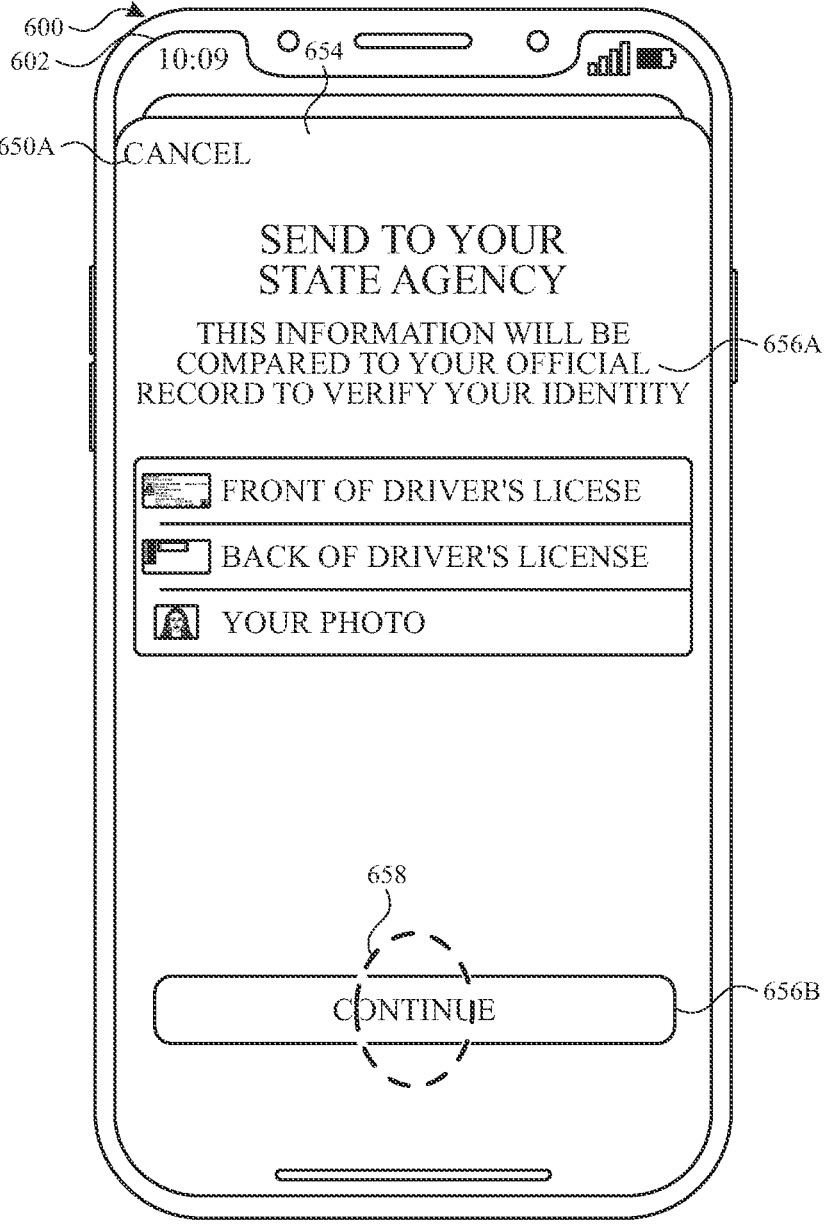
Figure 6A:
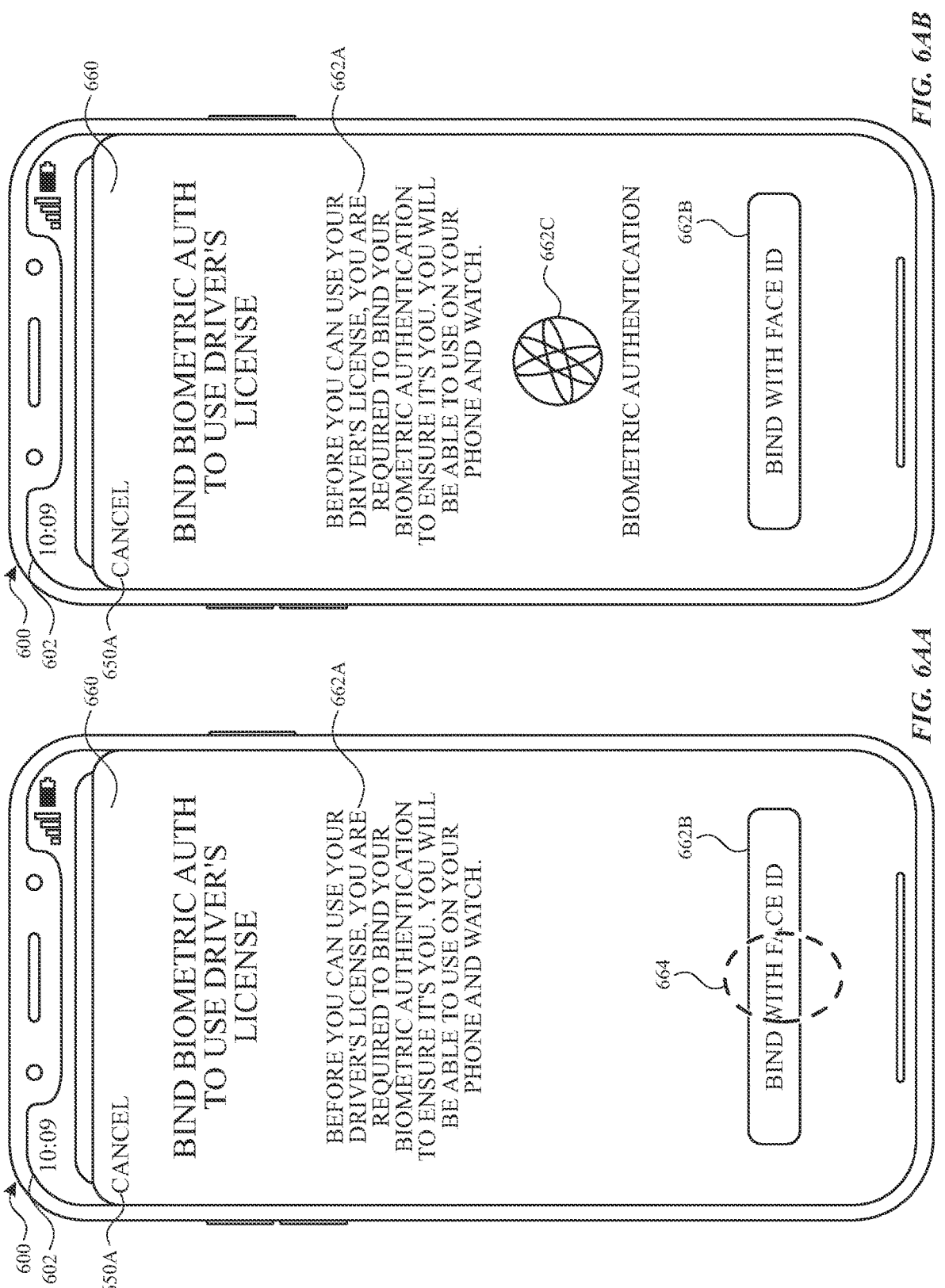
Figure 6A:
Figure 6A:
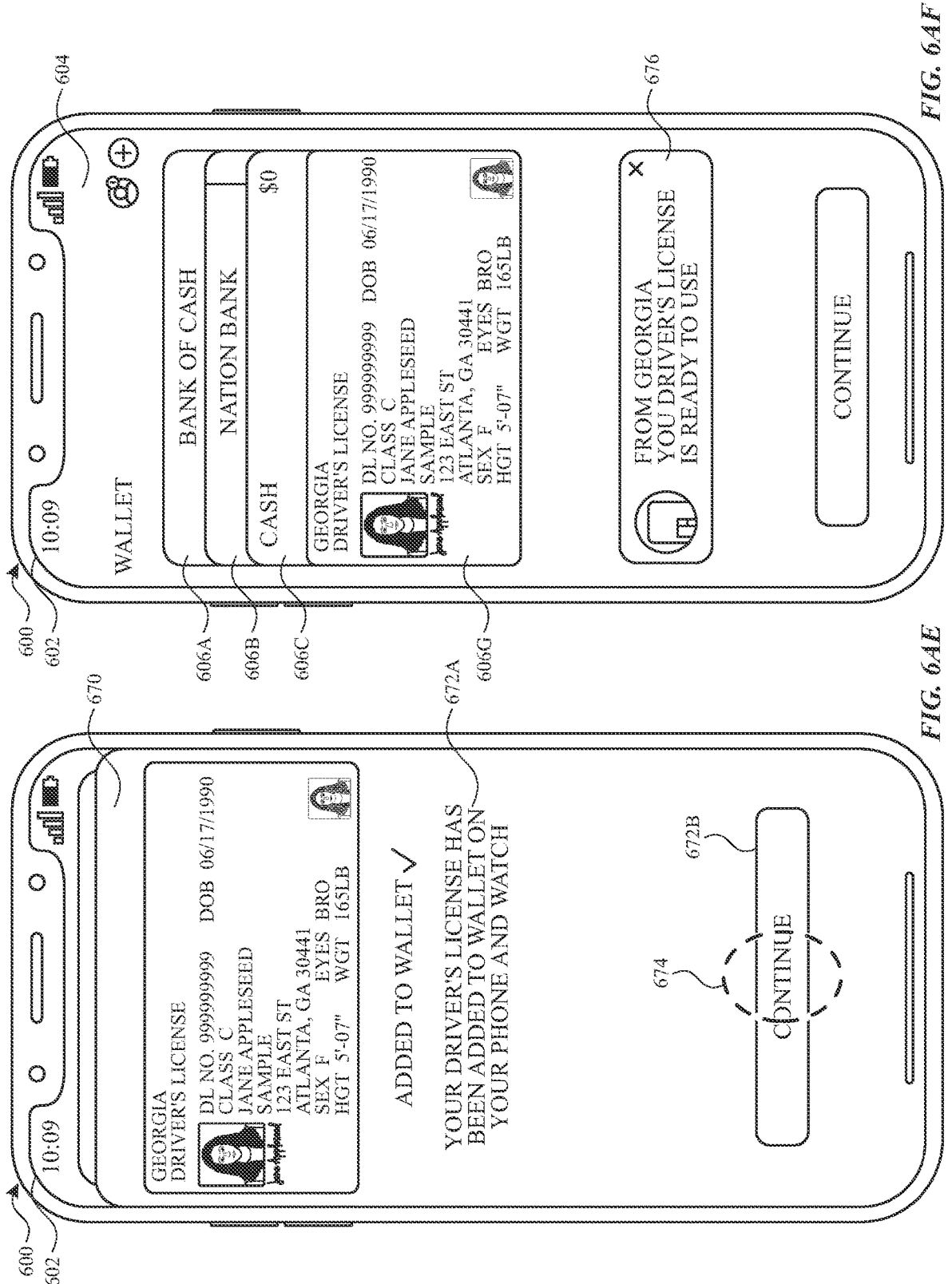

At FIG. 6Z, in response to user input 652, electronic device 600 displays user interface 654. User interface 654 includes notification 656A that informs a user that some of the information that was received during the enrollment process will be transmitted a third party. Notification 656A identifies what pieces of information will be transmitted to the third party (e.g., front of driver's license, back of driver's license, and the self-photo captured during the identity check portion of enrollment). User interface 654 includes cancel option 650A that is selectable to cancel enrollment of the new digital identification credential, and option 656B that is selectable to proceed with enrollment of the new digital identification credential, including transmitting the identified information to the third party. In FIG. 6Z, electronic device 600 detects user input 658 corresponding to selection of option 656B.

At FIG. 6AA, in response to user input 658, electronic device 600 displays user interface 660. User interface 660 includes notification 662A that informs a user that the digital identification credential will be bound to a biometric profile (e.g., a facial scan profile, a fingerprint scan profile, and/or an eye scan profile) and that biometric authentication will be required to use the digital identification credential after it is enrolled on electronic device 600. User interface 660 includes cancel option 650A that is selectable to cancel enrollment of the new digital identification credential, and option 662B that is selectable to proceed with enrollment of the new digital identification credential, including binding the new digital identification credential to a biometric profile. At FIG. 6AA, electronic device 600 detects user input 664 corresponding to selection of option 662B.

In the example scenario shown in FIG. 6AA, the new digital identification credential will be bound to (e.g., associated with) a facial scan profile. At FIG. 6AB, in response to user input 664, electronic device 600 captures facial scan information (e.g., via camera 639 and/or other input devices in communication with electronic device 600). Electronic device 600 then determines whether the captured facial scan information matches a biometric profile (e.g., a facial scan profile) stored on electronic device 600. In some embodiments, if the captured facial scan information does not match a biometric profile on electronic device 600, enrollment of the new digital identification credential fails and/or electronic device 600 requests that the user provide facial scan information again. If the captured facial scan information does match a biometric profile stored on electronic device 600, the new digital identification credential is bound to that biometric profile (without being bound to any other biometric profile stored on electronic device 600). In some embodiments, if a digital identification credential is bound to a particular biometric profile, biometric information corresponding to the particular biometric profile must be provided each time a user wishes to use the digital identification credential. In FIG. 6AB, electronic device 600 displays indication 662C to indicate that biometric information has been received, and is being compared to and/or matched with biometric profiles stored on electronic device 600.

At FIG. 6AC, in accordance with a determination that the received biometric information matches a biometric profile stored on electronic device 600, electronic device 600 displays user interface 666 indicating that information is being transmitted to a third party. At FIG. 6AD, electronic device 600 displays user interface 668 indicating that the user's identity has been verified by the third party. For example, in some embodiments, the third party verifies the user's identity by comparing an image depicted on physical identification credential 630 with the self-image taken of the user during the identity check process (e.g., FIG. 6Y).

At FIG. 6AE, in accordance with a determination that the user's identity has been verified (e.g., by electronic device 600 and/or by the third party) electronic device 600 displays user interface 670 which displays indication 672A that the digital identification credential has been successfully added to electronic device 600, and a corresponding smartwatch. User interface 670 also includes option 672B that is selectable to close user interface 670. At FIG. 6AE, electronic device 600 detects user input 674 corresponding to selection of option 672B.

At FIG. 6AF, in response to user input 674, electronic device 600 displays wallet user interface 604, which now includes a representation of digital identification credential 606G, as well as confirmation indication 676 indicating that the new digital identification credential has been successfully added to electronic device 600. In some embodiments, the digital identification credential stored on electronic device 600 includes all information that is associated with physical identification credential 300 (e.g., all information that is verifiable using and/or provided by physical identification credential 300).

FIG. 7 is a flow diagram illustrating a method for enrolling a digital identification credential using a computer system in accordance with some embodiments. Method 700 is performed at a computer system (e.g., 100, 300, 500, 600) (e.g., a smart phone, a smart watch, and/or a tablet) that is in communication with a display generation component (e.g., a display controller; a touch-sensitive display system; and/or a display (e.g., integrated and/or connected)) and one or more input devices (e.g., a touch-sensitive surface (e.g., a touch-sensitive display); a mouse; a keyboard; a camera; and/or a remote control). Some operations in method 700 are, optionally, combined, the orders of some operations are, optionally, changed, and some operations are, optionally, omitted.

As described below, method 700 provides an intuitive way for enrolling a digital identification credential. The method reduces the cognitive burden on a user for enrolling a digital identification credential, thereby creating a more efficient human-machine interface. For battery-operated computing devices, enabling a user to enroll a digital identification credential faster and more efficiently conserves power and increases the time between battery charges.

The computer system (e.g., 600) detects (702), via the one or more input devices, one or more user inputs (e.g., one or more tap user inputs and/or one or more non-tap user inputs) (e.g., 608, 614) corresponding to a request to add a digital identification credential to the computer system.

Subsequent to detecting the one or more user inputs (704) (e.g., in response to detecting the one or more user inputs), the computer system (e.g., 600) displays (706), via the display generation component, a liveness check user interface (e.g., 636) including one or more (e.g., textual, graphical, and/or audio) directions for a user to provide liveness check information (e.g., 638D, 638E). In some embodiments, the one or more directions include one or more directions for the user to perform a gesture (e.g., one or more directions to perform a gesture in front of a camera and/or capture the gesture using the camera).

Subsequent to detecting the one or more user inputs (704) (e.g., in response to detecting the one or more user inputs), the computer system (e.g., 600) receives (708), via the one or more input devices, liveness check information (e.g., 638C) (e.g., image and/or video information captured by a camera). In some embodiments, the liveness check information is received while displaying the liveness check user interface.

Subsequent to detecting the one or more user inputs (704) (e.g., in response to detecting the one or more user inputs), the computer system (e.g., 600) displays (710), via the display generation component, an identity check user interface (e.g., 648) including one or more directions for a user to provide identity check information (e.g., 648 in FIG. 6X instructing the user to take a photo of themselves). In some embodiments, the one or more directions include one or more directions for the user to capture an image of a physical identification credential (e.g., a physical identification credential corresponding to the digital identification credential the user has requested to add to the computer system) (e.g., using a camera). In some embodiments, the one or more directions include one or more directions for the user to capture a self-photograph (e.g., capture an image of the user).

Subsequent to detecting the one or more user inputs (704) (e.g., in response to detecting the one or more user inputs), the computer system (e.g., 600) receives (712), via the one or more input devices, identity check information (e.g., 628C (e.g., photos of front and/or back of physical identification credential), 650C (e.g., photo of user)) (e.g., image information captured by a camera). In some embodiments, identity check information is received while displaying the identity check user interface.

Subsequent to receiving the liveness check information and the identity check information (714), and in accordance with a determination that the liveness check information satisfies a set of liveness check criteria (e.g., image and/or video information captured by the camera (e.g., the liveness check information) matches one or more gestures that were instructed in the liveness check user interface) and that the identity check information satisfies a set of identity check criteria (716) (e.g., in accordance with a determination that image and/or video information captured by the camera (e.g., as part of the liveness check information and/or identity check information) matches and/or corresponds to an image depicted on the physical identification credential) (e.g., in accordance with a determination that a third party has provided verification that image information captured by the camera (e.g., as part of the liveness check information and/or identity check information) matches and/or corresponds to the image depicted on the physical identification credential) (e.g., in accordance with a determination that one or more self-photographs that are part of the identity check information depict the same user as visual content (e.g., image content and/or video content) that is part of the liveness check information), the computer system (e.g., 600) adds (718) the digital identification credential to the computer system (e.g., FIGS. 6AE-6AF).

Subsequent to receiving the liveness check information and the identity check information (714), and in accordance with a determination that the liveness check information does not satisfy the set of liveness check criteria (e.g., image and/or video information captured by the camera (e.g., the liveness check information) does not match one or more gestures that were instructed in the liveness check user interface) and/or that the identity check information does not satisfy the set of identity check criteria (720) (e.g., in accordance with a determination that image and/or video information captured by the camera (e.g., as part of the liveness check information) does not match and/or correspond to an image depicted on the physical identification credential) (e.g., in accordance with a determination that a third party has not provided verification that image information captured by the camera (e.g., as part of the liveness check information) matches and/or corresponds to the image depicted on the physical identification credential) (e.g., in accordance with a determination that one or more self-photographs that are part of the identity check information do not depict the same user as visual content (e.g., image content and/or video content) that is part of the liveness check information), the computer system (e.g., 600) forgoes adding (722) the digital identification credential to the computer system. In some embodiments, in accordance with the determination that the liveness check information does not satisfy the set of liveness check criteria and/or that the identity check information does not satisfy the set of identity check criteria, the computer system displays a visual indication that the liveness check information does not satisfy the set of liveness check criteria and/or that the identify check information does not satisfy the set of identity check criteria. Forgoing adding the digital identification credential to the computer system if the liveness check information does not satisfy the set of liveness check criteria and/or the identity check information does not satisfy the identity check criteria provides enhanced security and can prevent unauthorized users from initiating sensitive operations.

In some embodiments, the computer system (e.g., 600) displays (e.g., concurrently displays), via the display generation component: a first option (e.g., 624B) that corresponds to a user request to add the digital identification credential to the computer system and a first external electronic device (e.g., an external electronic device different and/or separate from the computer system) (e.g., a smart phone, a smart watch, and/or a tablet) (e.g., a first option that is selectable to initiate a process for adding the digital identification credential to the computer system and the first external electronic device); and a second option (e.g., 624C) that corresponds to a user request to add the digital identification credential to the computer system without adding the digital identification credential to the first external electronic device (e.g., corresponds to a user request to add the digital identification credential to only the computer system) (e.g., a second option that is selectable to initiate a process for adding the digital identification credential to the computer system without adding the digital identification credential to the first external electronic device). Displaying a first option that corresponds to a user request to add the digital identification credential to the computer system and the first external electronic device, and a second option that corresponds to a user request to add the digital identification credential to the computer system without adding the digital identification credential to the first external electronic device, allows a user to specify which devices should store the digital identification credential without the need for the user to perform the various security procedures to again to add the digital identification credential to both devices, thereby reducing the number of required user inputs.

In some embodiments, the computer system receives a first selection input (e.g., 626) (e.g., one or more tap user inputs and/or one or more non-tap user inputs).

In some embodiments, subsequent to receiving the liveness check information (e.g., 638C) and the identity check information (e.g., 628C and/or 650C), and in accordance with a determination that the first selection input corresponds to selection of the first option, that the liveness check information satisfies a set of liveness check criteria, and that the identity check information satisfies a set of identity check criteria, the computer system (e.g., 600) adds the digital identification credential to the first external electronic device (e.g., FIGS. 6AE-6AF, adding the digital identification credential to the smartwatch in addition to electronic device 600).

In some embodiments, subsequent to receiving the liveness check information (e.g., 638C) and the identity check information (e.g., 628C and/or 650C), and in accordance with a determination that the first selection input corresponds to selection of the second option (e.g., even if the liveness check and identity check are satisfied; and/or regardless of whether liveness check and identity check are satisfied), the computer system (e.g., 600) forgoes adding the digital identification credential to the first external electronic device. In some embodiments, the computer system forgoes adding the digital identification credential to any electronic device other than the computer system.

In some embodiments, subsequent to detecting the one or more user inputs (in some embodiments, and prior to adding the digital identification credential to the computer system and/or forgoing adding the digital identification credential to the computer system) (in some embodiments, prior to the determination of whether the liveness check information satisfies the liveness check criteria and/or the identity check information satisfies the set of identity check criteria), the computer system (e.g., 600) receives, via the one or more input devices, information (e.g., 628C) about (e.g., taking an image and/or a photograph of and/or reading information from the physical identification credential via NFC) (e.g., via a camera of the computer system and/or via an NFC reader of the computer system) a physical identification credential (e.g., 630) (e.g., a physical driver's license, state identification card, employee identification card, benefits identification card, rewards card, and/or passport) corresponding to the digital identification credential. In some embodiments, the computer system receives first information about (e.g., a first scan of) the physical identification credential (e.g., a scan of the front of the physical identification credential) and receives second information about (e.g., a second scan of) the physical identification credential (e.g., a scan of the back of the physical identification credential). Receiving information about the physical identification credential corresponding to the digital identification credential enables the computer system to have access to information about the user, thereby providing enhanced security and helping to prevent unauthorized users from initiating sensitive operations.

In some embodiments, the one or more directions for a user to provide liveness check information (e.g., 638D, 638E) includes one or more directions instructing a user to perform a predefined gesture (e.g., a first predefined gesture selected from a plurality of predefined gestures and/or performed within a field of view of a camera of the computer system). In some embodiments, receiving liveness check information includes receiving video content (e.g., 638C) (e.g., recording video content and/or receiving video content recorded by (e.g., using a camera of) the computer system) (e.g., video content captured by a camera subsequent to (e.g., while) displaying the one or more directions for the user to provide liveness check information). In some embodiments, the determination that the liveness check information satisfies the set of liveness check criteria includes a determination that the video content depicts a user performing the predefined gesture. In some embodiments, the determination that the video content depicts a user performing the predefined gesture is performed based on a machine learning model. In some embodiments, the set of liveness check criteria includes a first criterion that is not satisfied if the video does not depict a user performing the predefined gesture. In some embodiments, the one or more directions for the user to provide liveness check information includes a demonstration (e.g., a video demonstration and/or an animated demonstration) of the predefined gesture. Determining whether the video content depicts a user performing the predefined gesture provides enhanced security and can prevent unauthorized users from initiating sensitive operations.

In some embodiments, the predefined gesture includes one or more head movements (e.g., turn head up, down, left, and/or right; and/or tilt head left and/or right) (e.g., FIGS. 6M-6W). Determining whether the video content depicts a user performing the predefined gesture, including one or more head movements, provides enhanced security and can prevent unauthorized users from initiating sensitive operations.

In some embodiments, the predefined gesture includes one or more facial movements (e.g., smile, frown, open mouth, open eyes, close eyes, and/or raise eyebrows) (e.g., FIGS. 6U-6W). Determining whether the video content depicts a user performing the predefined gesture, including one or more facial movements, provides enhanced security and can prevent unauthorized users from initiating sensitive operations.

In some embodiments, displaying the one or more directions for the user to provide liveness check information includes displaying, via the display generation component, a demonstration (e.g., 638E) (e.g., a video demonstration and/or an animated demonstration) of the predefined gesture. Displaying a demonstration of the predefined gesture provides the user with feedback about the current state of the device (e.g., the device is detecting the predefined gesture that is displayed in the demonstration).

In some embodiments, after displaying the demonstration of the predefined gesture (e.g., 638E) for a threshold period of time (e.g., 3 seconds, 5 seconds, or 7 seconds; sufficient time to display the demonstration of the predefined gesture a threshold number of times), the computer system (e.g., 600) displays, via the display generation component, a video capture user interface (e.g., 638C in FIG. 6P) that depicts video content being captured (e.g., a viewfinder) by a camera (e.g., a camera that is in communication with the computer system and/or a camera of the computer system). In some embodiments, while displaying the demonstration of the predefined gesture, the computer system detects and/or determines that the demonstration of the predefined gesture has been displayed for a threshold period of time; and in response to detecting and/or determining that the demonstration of the predefined gesture has been displayed for the threshold period of time, the computer system displays the video capture user interface (e.g., replaces display of the demonstration of the predefined gesture with the video capture user interface). Displaying a video capture user interface that depicts video content being captured by the camera provides the user with feedback about the current state of the device (e.g., the device is capturing video content).

In some embodiments, after (e.g., while) displaying the video capture user interface (e.g., 638C), in accordance with a determination to that the video capture user interface has been displayed for a second threshold period of time (e.g., 5 seconds or 10 seconds) without the predefined gesture being detected, the computer system (e.g., 600) re-displays, via the display generation component, the demonstration of the predefined gesture (e.g., 638E in FIG. 6S). In some embodiments, in accordance with a determination that the predefined gesture has been detected (e.g., has been detected as being depicted in the video content captured by the camera) prior to the video capture user interface being displayed for the second threshold period of time, the computer system outputs an indication that the predefined gesture has been detected (e.g., a visual output, an audio output, and/or a haptic output). Re-displaying the demonstration of the predefined gesture if the predefined gesture has not been detected for a threshold period of time provides the user with feedback about the current state of the device (e.g., the device has not detected the predefined gesture).

In some embodiments, subsequent to receiving the video content (e.g., 638E), and in response to determining that the video content depicts the user successfully performing the predefined gesture, the computer system (e.g., 600) outputs a haptic output (e.g., FIG. 6R, electronic device 600 outputs a haptic output) (e.g., a haptic output indicating that the computer system has determined that a user has successfully performed the predefined gesture). In some embodiments, the computer system outputs the haptic output while displaying the video content being captured (e.g., a viewfinder) by a camera. Providing a haptic output when the computer system determines that the video content depicts the user performing the predefined gesture provides the user with feedback about the current state of the device (e.g., the device has detected the predefined gesture).

In some embodiments, the liveness check information (e.g., 638C) is captured by the computer system (e.g., 600) (e.g., a camera in communication with the computer system and/or a camera of the computer system) and is stored on the computer system (e.g., and is not transmitted to any external device by the computer system); and the determination that the liveness check information satisfies the set of liveness check criteria or does not satisfy the set of liveness check criteria is performed on the computer system without the computer system transmitting the liveness check information to an external device. In some embodiments, the liveness check information (e.g., captured video content) and a machine learning model trained to determine whether or not the liveness check information satisfies the set of liveness check criteria (e.g., trained to determine whether captured video content depicts a user performing one or more predefined gestures) are stored locally on the computer system so that the liveness check determination can be performed locally on the computer system without transmitting the liveness check information to an external device. Performing the liveness check locally on the computer system without transmitting liveness check information to any external device provides enhanced security and can prevent unauthorized users from initiating sensitive operations and/or accessing sensitive data.

In some embodiments, subsequent to (e.g., while) displaying the liveness check user interface (e.g., 636), the computer system (e.g., 600) detects a first set of user inputs (e.g., 644) (e.g., one or more tap inputs and/or one or more non-tap inputs) corresponding to a request to initiate capture of video content, wherein receiving the video content comprises capturing video content in response to detecting the first set of user inputs (e.g., displaying camera capture region 638C in response to user input 644 in FIG. 6V). In some embodiments, capturing video content includes initiating capture of video content by a camera (e.g., a camera in communication with the computer system). In some embodiments, in response to detecting the first set of user inputs, the computer system displays a video capture user interface that depicts video content being captured by the camera. In some embodiments, displaying the liveness check user interface includes displaying a demonstration (e.g., a video demonstration and/or an animated demonstration) of the predefined gesture. In some embodiments, displaying the liveness check user interface includes displaying (e.g., repeatedly displaying) the demonstration of the predefined gesture until the first set of user inputs corresponding to the request to initiate video capture is detected. In some embodiments, in response to detecting the first set of user inputs, the computer system ceases displaying the demonstration of the predefined gesture. In some embodiments, capture of video content is not initiated (e.g., video content is not recorded and/or stored and/or the camera is not activated) until a set of user inputs corresponding to a request to initiate video capture is detected. Initiating capture of video content by a camera in response to a set of user inputs corresponding to a request to initiate video capture allows a user to control when video capture is initiated, thereby providing additional control of the device. Providing additional control of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system detects, via the one or more input devices, a second set of inputs (e.g., 642) (e.g., one or more tap inputs and/or one or more non-tap inputs) corresponding to a request to select a different predefined gesture. In some embodiments, the second set of inputs is detected subsequent to (e.g., while) displaying the one or more directions instructions a user to perform the predefined gesture. In response to detecting the second set of inputs, the computer system (e.g., 600) displays one or more directions (e.g., 638D in FIG. 6U) instructing a user to perform a second predefined gesture different from the predefined gesture (e.g., a second predefined gesture selected from the plurality of predefined gestures). In some embodiments, in response to detecting the second set of inputs, the computer system ceases displaying the one or more directions instructing a user to perform the predefined gesture. In some embodiments, displaying the one or more directions instructing a user to perform the second predefined gesture includes a demonstration (e.g., a video demonstration and/or an animated demonstration) of the second predefined gesture. Displaying one or more directions instructing a user to perform a second predefined gesture different from the predefined gesture provides the user with feedback about the current state of the device (e.g., the device is now detecting (or preparing to detect) the second predefined gesture).

In some embodiments, subsequent to (e.g., while) displaying the one or more directions instructing a user to performed the predefined gesture (e.g., 638D, 638E), the computer system (e.g., 600) determines that the predefined gesture has not been detected for a third threshold period of time (e.g., 20 seconds or 30 seconds) (e.g., a threshold period of time since displaying the one or more directions instructing the user to perform the predefined gesture and/or a threshold period of time after initiating video capture (e.g., after activating a camera and/or displaying a video capture user interface)) (e.g., determining that video content captured by a camera does not depict a user performing the predefined gesture). In some embodiments, the third threshold period of time is the same as the second threshold period of time.

In some embodiments, in response to determining that the predefined gesture has not been detected for the third threshold period of time, the computer system (e.g., 600) displays a third option (e.g., 638H) that is selectable to initiate a process to request a different predefined gesture (e.g., a different predefined gesture of the plurality of predefined gestures). In some embodiments, the user selects the third option to cause the computer system to provide the different predefined gesture for use in the liveness check. In some embodiments, while displaying the third option, the computer system detects, via the one or more input devices, a selection input corresponding to selection of the third option; and in response to detecting the selection input corresponding to selection of the third option, the computer system displays, via the display generation component, one or more directions instructing a user to performed a third predefined gesture different from the predefined gesture, and, optionally, ceases displaying the one or more directions instructing the user to perform the predefined gesture and/or ceases displaying a video capture user interface. Displaying a third option that is selectable to initiate a process for requesting a different predefined gesture in response to determining that the predefined gesture has not been detected for the third threshold period of time provides the user with feedback about the current state of the device (e.g., the device has not yet detected the predefined gesture).

In some embodiments, receiving the identity check information includes receiving one or more photographs (e.g., 650C) captured by a camera (e.g., a camera in communication with the computer system) (e.g., the same camera used to capture video content for the liveness check information) (e.g., one or more photographs captured by a camera subsequent to (e.g., while) displaying the one or more directions for the user to provide identity check information). In some embodiments, the one or more directions for the user to provide identity check information includes one or more directions for the user to capture a self-photograph (e.g., capture an image of the user) (e.g., using a camera (e.g., a camera in communication with the computer system) (e.g., the same camera used to capture video content for the liveness check information)).

In some embodiments, the determination that the identity check information satisfies the set of identity check criteria includes a determination that the video content (e.g., 638C) of the liveness check information depicts the same user as the one or more photographs (e.g., 650C) of the identity check information (e.g., the determination that the identity check satisfies the set of identity check criteria includes a determination that one or more frames of the video content that is part of the liveness check information depict the same user as the one or more photographs that are part of the identity check information) (e.g., based on a machine learning model). In some embodiments, the determination that the identity check information does not satisfy the set of identity check criteria includes a determination that the video content that is part of the liveness check information does not depict the same user as the one or more photographs that are part of the identity check information (e.g., the determination that the identity check does not satisfy the set of identity check criteria includes a determination that one or more frames of the video content that is part of the liveness check information do not depict the same user as the one or more photographs that are part of the identity check information). Determining whether the video content that is part of the liveness check information depicts the same user as the one or more photographs that are part of the identity check information provides enhanced security and can prevent unauthorized users from initiating sensitive operations and/or accessing sensitive data (e.g., by preventing an unauthorized user from adding the digital identification credential to his or her device).

In some embodiments, in accordance with the determination that the liveness check information satisfies the set of liveness check criteria, and that the identity check information satisfies the set of identity check criteria, the computer system (e.g., 600) initiates a process for transmitting credential authentication information corresponding to the digital identification credential (e.g., a subset of the identity check information, one or more self-photographs captured as part of the identity check information, and/or one or more scans of a physical identification credential corresponding to the digital identification credential (e.g., a physical driver's license, state identification card, employee identification card, benefits identification card, rewards card, and/or passport)) to an external electronic device (e.g., an external electronic device associated with a third party (e.g., a third party associated with and/or corresponding to the digital identification credential (e.g., a third party that issued and/or authorized a physical identification credential corresponding to the digital identification credential))) (e.g., FIGS. 6Z, 6AC, 6AD). Transmitting credential authentication information corresponding to the digital identification credential to an external electronic device (e.g., for further confirmation of user identity) provides enhanced security and can prevent unauthorized users from initiating sensitive operations and/or accessing sensitive data (e.g., by preventing an unauthorized user from adding the digital identification credential to his or her device).

In some embodiments, initiating the process for transmitting credential authentication information to the external electronic device includes, prior to transmitting the credential authentication information to the external electronic device, displaying, via the display generation component, a notification (e.g., 654, 656A) that credential authentication information will be transmitted to a third party. In some embodiments, displaying the notification that credential authentication information will be transmitted to a third party includes displaying a notification identifying the information that will be transmitted to the third party (e.g., one or more self-photographs captured as part of the identity check information and/or one or more scans of a physical identification credential corresponding to the digital identification credential). In some embodiments, displaying the notification that credential authentication information will be transmitted to a third party includes displaying a notification identifying the third party. Displaying a notification that credential authentication information will be transmitted to a third party provides the user with feedback about the current state of the device (e.g., the device will imminently transmit credential authentication information to a third party).

In some embodiments, in accordance with the determination that the liveness check information satisfies the set of liveness check criteria and that the identity check information satisfies the set of identity check criteria, the computer system (e.g., 600) binds the digital identification credential to a biometric profile stored on the computer system (e.g., FIGS. 6AA-6AB) (e.g., a facial scan, a fingerprint scan, and/or a periocular and/or eye scan). In some embodiments, binding the digital identification credential to a biometric profile stored on the computer system includes binding the digital identification credential to a single biometric profile stored on the computer system without binding the digital identification credential to any other biometric profiles stored on the computer system. In some embodiments, the computer system stores multiple biometric profiles that have access to unlock the computer system and have access to one or more of the same credentials (e.g., of payment accounts) of the computer system. In some embodiments, binding the digital identification credential to a particular biometric profile limits access to the digital identification credential to just that particular biometric profile. Binding the digital identification credential to a biometric profile stored on the computer system provides enhanced security and can prevent unauthorized users from initiating sensitive operations and/or accessing sensitive data (e.g., by preventing an unauthorized user from utilizing the digital identification credential).

In some embodiments, binding the digital identification credential to the biometric profile stored on the computer system includes: receiving, via the one or more input devices, biometric information (e.g., FIGS. 6AA-6AB) (e.g., a facial scan, a fingerprint scan, and/or a periocular and/or eye scan) (e.g., biometric information captured after the determination that the liveness check information satisfies the set of liveness check information and that the identity check information satisfies the set of identity check information); determining that the received biometric information corresponds to (e.g., matches) a first biometric profile stored on the computer system (e.g., a first biometric profile of a plurality of biometric profiles stored on the computer system); and in response to determining that the received biometric information corresponds to the first biometric profile, binding the digital identification credential to the first biometric profile (e.g., binding the digital identification credential to only the first biometric profile and/or without binding the digital identification credential to any other biometric profile (e.g., any other biometric profile stored on the computer system)). In some embodiments, binding the digital identification credential to the biometric profile stored on the computer system includes: receiving, via the one or more input devices, biometric information (e.g., a facial scan, a fingerprint scan, and/or a periocular and/or eye scan) (e.g., biometric information captured after the determination that the liveness check information satisfies the set of liveness check information and that the identity check information satisfies the set of identity check information); and in response to receiving the biometric information: in accordance with a determination that the biometric information corresponds to (e.g., matches) a first biometric profile stored on the computer system (e.g., a first biometric profile of a plurality of biometric profiles stored on the computer system), binding the digital identification credential to the first biometric profile (without binding the digital identification credential to the second biometric profile); and in accordance with a determination that the biometric information corresponds to (e.g., matches) a second biometric profile stored on the computer system (e.g., different from the first biometric profile) (e.g., a second biometric profile of the plurality of biometric profiles stored on the computer system), binding the digital identification credential to the second biometric profile (e.g., without binding the digital identification credential to the first biometric profile). Binding the digital identification credential to a biometric profile stored on the computer system provides enhanced security and can prevent unauthorized users from initiating sensitive operations and/or accessing sensitive data (e.g., by preventing an unauthorized user from utilizing the digital identification credential).

In some embodiments, binding the digital identification credential to the biometric profile stored on the computer system includes binding the digital identification credential to a first facial scan profile of a plurality of facial scan profiles stored on the computer system (e.g., FIGS. 6AA-6AB) (in some embodiments, without binding the digital identification credential to any other facial scan profiles of the plurality of facial scan profiles stored on the computer system). Binding the digital identification credential to a facial scan biometric profile stored on the computer system provides enhanced security and can prevent unauthorized users from initiating sensitive operations and/or accessing sensitive data (e.g., by preventing an unauthorized user from utilizing the digital identification credential).

In some embodiments, binding the digital identification credential to the biometric profile stored on the computer system includes binding the digital identification credential to a first fingerprint scan profile of a plurality of fingerprint scan profiles stored on the computer system (in some embodiments, without binding the digital identification credential to any other fingerprint scan profiles of the plurality of fingerprint scan profiles stored on the computer system). Binding the digital identification credential to a fingerprint scan biometric profile stored on the computer system provides enhanced security and can prevent unauthorized users from initiating sensitive operations and/or accessing sensitive data (e.g., by preventing an unauthorized user from utilizing the digital identification credential).

In some embodiments, subsequent to detecting the one or more user inputs: the computer system (e.g., 600) detects, via the one or more input devices, a second set of user inputs (e.g., 620) (e.g., entry on a displayed keyboard, and/or selection from a list) identifying (e.g., selecting) a geographic region (e.g., a state, a county, a country, a continent and/or a city) associated with the digital identification credential (e.g., FIG. 6C). Receiving a set of inputs identifying a geographic region associated with the digital identification credential provides a means for selection by the user. Otherwise, additional inputs would be required for the user to specify a digital identification credential that the user wishes to add to the computer system.

Note that details of the processes described above with respect to method 700 (e.g., FIG. 7) are also applicable in an analogous manner to the methods described below. For example, methods 900 and 1100 optionally includes one or more of the characteristics of the various methods described above with reference to method 700. For example, the digital identification credential that is enrolled in method 700 may be the digital identification credential that is used in method 900 and/or that is managed in method 1100. For brevity, these details are not repeated below.

FIGS. 8A-8H illustrate exemplary user interfaces for using a digital credential, in accordance with some embodiments. The user interfaces in these figures are used to illustrate the processes described below, including the processes in FIG. 9.

Figure 8A:
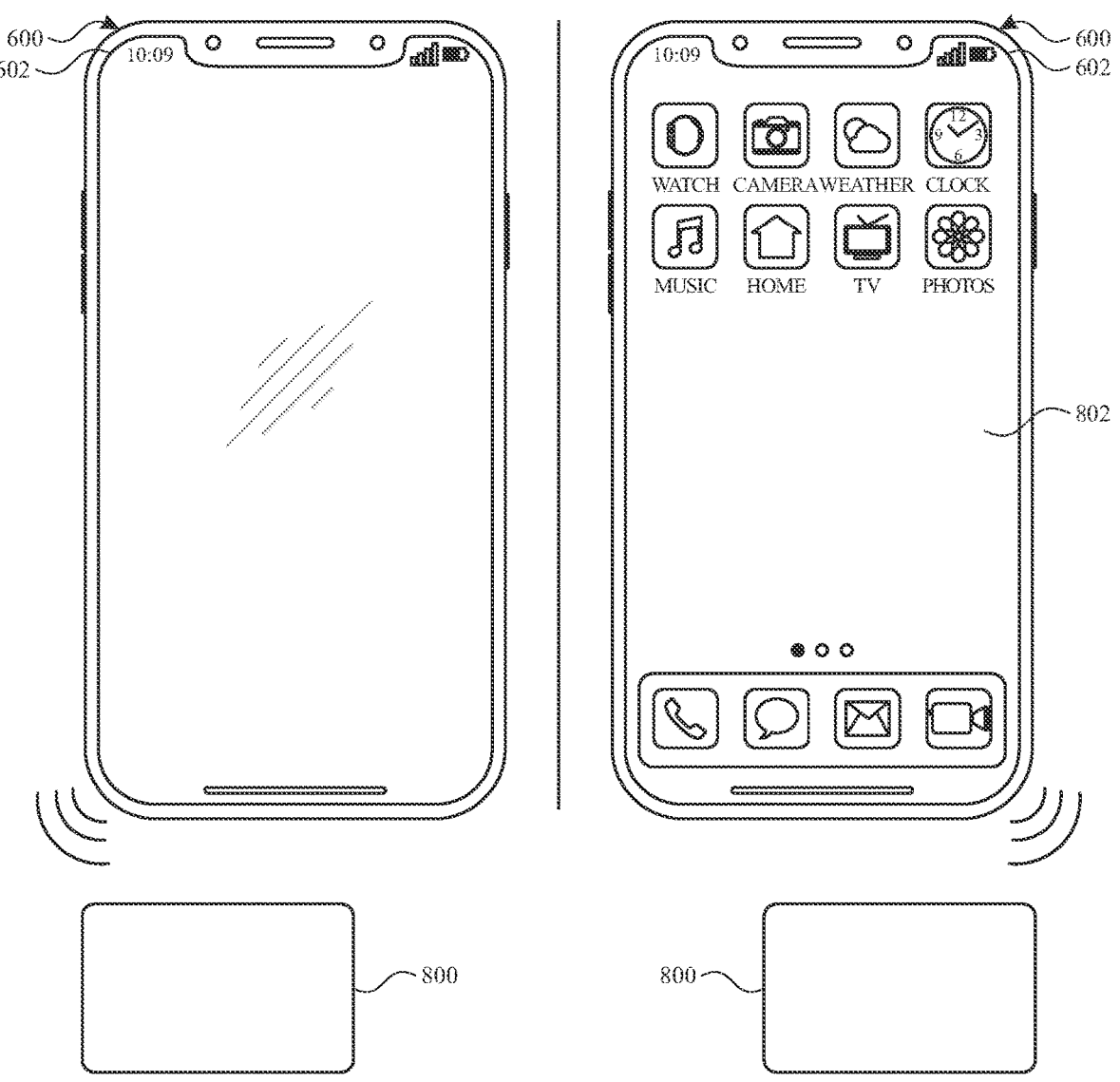

FIG. 8A depicts electronic device 600, which is a smartphone with touch-sensitive display 602. In some embodiments, electronic device 600 includes one or more features of devices 100, 300, and/or 500. FIG. 8A depicts electronic device 600 in a sleep state (left) in which it is not displaying any content, and in an awake state (right) in which it is displaying user interface 802. In both scenarios, electronic device 600 detects external reader device 800 (e.g., detects external reader device 800 within a threshold proximity and/or at a threshold signal strength). External reader device 800 is a device that is requesting digital credential information corresponding to a digital identification credential stored on electronic device 600.

In FIG. 8B, in response to detecting external reader device 800, electronic device 600 displays user interface 804 indicating that electronic device 600 is establishing a secure connection with external reader device 800. In the scenario on the left, electronic device 600 goes from the sleep state to a wake state to display user interface 804. In the scenario on the right, electronic device 600 displays user interface 804 overlaid on user interface 802. In some embodiments, user interface 802 is visually deemphasized (e.g., shown at a darker brightness and/or blurred). In FIG. 8B, user interface 804 also displays representation 808D of a digital identification credential corresponding to the digital credential information being requested by the external reader device 800.

Figures 8C, 8D:
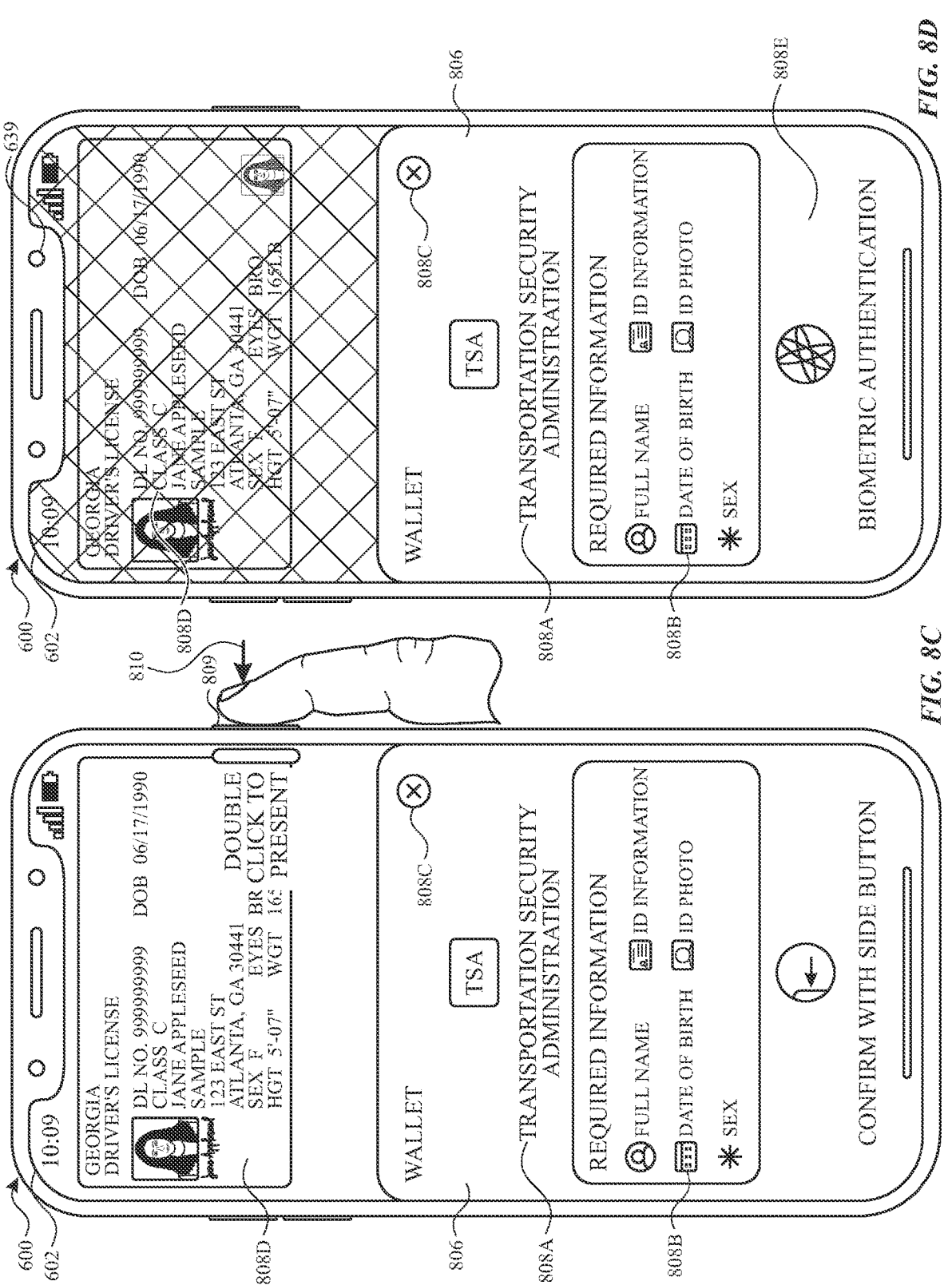

In FIG. 8C, after establishing a secure connection with external reader device 800 (e.g., in response to establishing the secure connection with external reader device 800), electronic device 600 displays user interface 806. User interface 806 includes entity indication 808A which indicates the entity that is requesting the digital credential information (in this case, the Transportation Security Administration). User interface 806 also includes requested information indication 808B, which identifies all information that is being requested by external reader device 800. In the depicted scenario, external reader device 800 is requesting the user's full name, date of birth, ID photo, sex, and ID information (e.g., a driver's license number). All of the requested information corresponds to, is part of, and/or is stored as part of the digital identification credential. User interface 806 includes close option 808C that is selectable to close user interface 806 (and forgo transmitting digital credential information to external reader device 800). User interface 806 instructs a user to provide an input via side button 809 to approve transmission of the requested digital credential information to external reader device 800. In FIG. 8C, electronic device 600 detects user input 810 via side button 809.

In FIG. 8D, in response to user input 810, electronic device 600 collects biometric information from the user, as indicated by indication 808E. For example, in some embodiments, electronic device 600 collects facial scan information (e.g., via camera 639 and/or a depth sensor of electronic device 600), fingerprint scan information, and/or eye scan information. As discussed above with reference to FIGS. 6A-6AF, the digital identification credential is bound to a biometric profile on electronic device 600 (e.g., a facial scan profile, a fingerprint scan profile, and/or an eye scan profile). In FIG. 8D, electronic device 600 confirms that the biometric information collected from the user matches the biometric profile that corresponds to the digital identification credential.

Figures 8E, 8F:
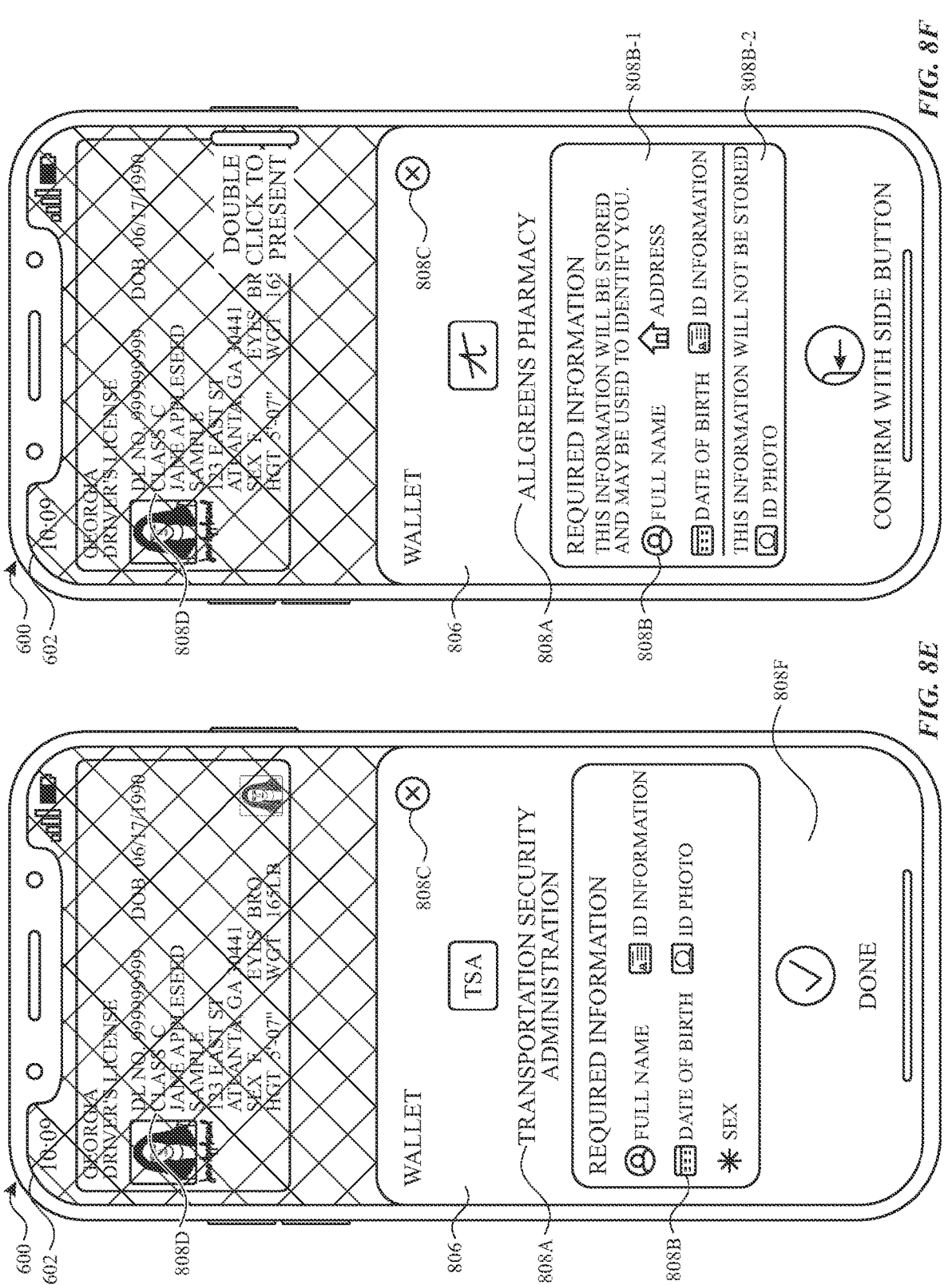

In FIG. 8E, in accordance with a determination that the biometric information collected from the user matches the biometric profile that corresponds to the digital identification credential, electronic device 600 transmits the requested digital credential information to external reader device 800 (e.g., without transmitting any other digital credential information that is not requested by external reader device 800), as indicated by indication 808F. In some embodiments, if digital credential information is transmitted to an external reader device, information pertaining to that transmission instance is recorded and/or stored on electronic device 600, as will be described in greater detail below with reference to FIGS. 10A-10J. In some embodiments, if the biometric information collected from the user does not match the biometric profile that corresponds to the digital identification credential, electronic device 600 does not transmit digital credential information to external reader device 800. In some embodiments, electronic device 600 establishes a first connection with external reader device 800 to receive information from external reader device 800 (e.g., entity information and what types of digital credential information are being requested by external reader device 800), and establishes a separate, second connection with external reader device 800 to transmit digital credential information to external reader device 800.

As discussed above, a user provides one or more inputs (e.g., input 810 via side button 809) and also provides biometric information in order to authorize electronic device 600 to transmit digital credential information to external reader device 800. Authorizing the device to transmit information to an external reader device can also be referred to as "arming" the device. In some embodiments, some types of digital credentials, such as digital payment credentials, can be "pre-armed," such that a user can provide one or more inputs (e.g., one or more touch inputs and/or button inputs and/or biometric inputs) to authorize transmission of information to an external reader even before the external reader is detected. In such scenarios, when electronic device 600 detects the external reader, electronic device 600 is already authorized to transmit digital credential information (e.g., payment information) to the external reader without further user input. However, in some embodiments, some types of digital credentials, such as digital identification credentials, cannot be pre-armed, such that a user cannot provide (e.g., is not permitted to provide) authorization inputs (e.g., one or more touch inputs and/or button inputs and/or biometric inputs) authorizing transmission of digital credential information to an external reader until electronic device 600 has detected the external reader, has connected to the external reader, has received information from the external reader (e.g., entity information and information identifying the digital credential information that the external reader is requesting), and displayed user interface 806 which displays the entity information and the information identifying the digital credential information being requested by the external reader.

As discussed above with reference to FIG. 8C, once electronic device 600 establishes a connection with external reader device 800, and receives information from external reader device 800, electronic device 600 displays user interface 806 which informs the user of an entity associated with electronic reader device 800 (e.g., an entity requesting digital credential information using external reader device 800), as well the digital credential information that is being requested by external reader device 800 (and will be transmitted to external reader device 800 if the user authorizes such transmission). FIG. 8C illustrated a first example scenario in which the TSA requested certain types of information. FIG. 8F illustrates another example scenario, in which a pharmacy, Allgreens Pharmacy, is using external reader device 800 to request certain types of digital credential information. User interface 806 indicates that Allgreens Pharmacy is requesting the user's full name, address, date of birth, ID information (e.g., driver's license number), and ID photo. However, in FIG. 8F, user interface 806 also indicates a first set of information 808B-1 that will be stored by Allgreens Pharmacy (e.g., will be stored by Allgreens Pharmacy even after a transaction is completed and/or will be stored by Allgreens Pharmacy for a set number of days, weeks, months, and/or years and/or indefinitely), and also a second set of information 808B-2 that will be transmitted to Allgreens Pharmacy, but will not be stored by Allgreens Pharmacy (e.g., will not be stored by Allgreens Pharmacy other than being stored in temporary memory to display to Allgreens Pharmacy and/or will not be stored by Allgreens Pharmacy after completion of a transaction, and/or for more than 30 seconds and/or a minute) (e.g., will not be stored by Allgreens Pharmacy in persistent storage).

Figures 8G, 8H:
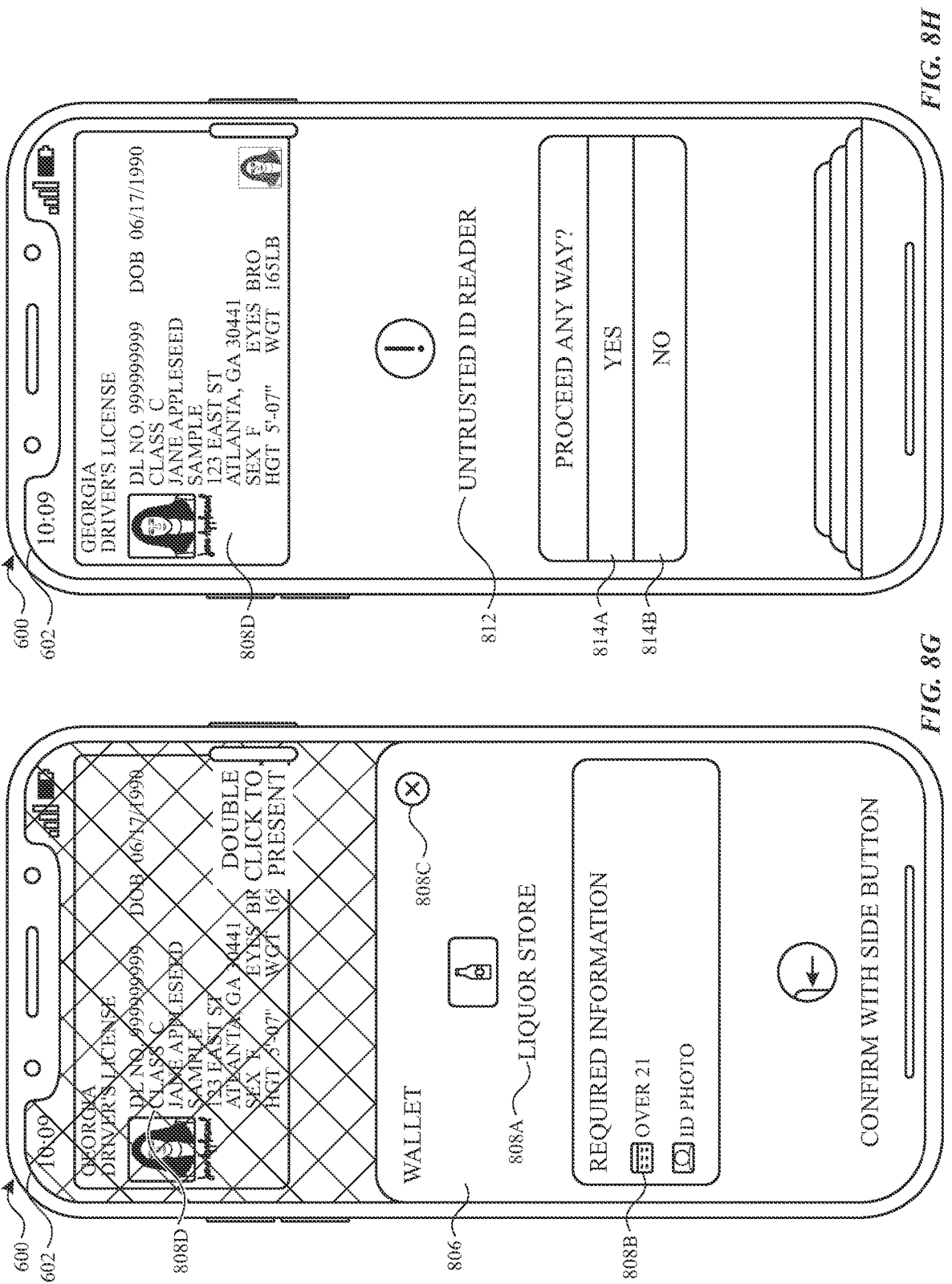

FIG. 8G illustrates an example scenario in which a store called Liquor Store is using external reader device 800 to request certain types of digital credential information. In FIG. 8G, Liquor Store is requesting an indication (e.g., a binary indication, yes vs. no) of whether or not the user is over 21 (e.g., without requesting the user's actual date of birth), as well as the user's ID Photo.

FIG. 8H illustrates an example scenario in which external reader device 800 is not a recognized and/or is not an authorized external reader (e.g., has not been authorized by one or more authorizing entities). In accordance with a determination that external reader device 800 is not a recognized and/or authorized external reader, electronic device 600 displays indication 812, and also displays options 814A and 814B. Option 814A is selectable to resume transmission of digital credential information to external reader device 800 (e.g., selectable to display user interface 806 identifying the types of digital credential information being requested by unauthorized external reader device 800), and option 814B is selectable to cancel (e.g., deny) transmission of digital credential information to unauthorized external reader device 800.

FIG. 9 is a flow diagram illustrating a method for using a digital identification credential using a computer system in accordance with some embodiments. Method 900 is performed at a computer system (e.g., 100, 300, 500, 600) (e.g., a smart phone, a smart watch, and/or a tablet) that is in communication with a display generation component (e.g., a display controller; a touch-sensitive display system; and/or a display (e.g., integrated and/or connected)) and one or more input devices (e.g., a touch-sensitive surface (e.g., a touch-sensitive display); a mouse; a keyboard; a remote control; a wireless communication input device (e.g., Bluetooth and/or NFC); a biometric input device (e.g., a fingerprint scanner, retina scanner, and/or a camera); and/or a camera). Some operations in method 900 are, optionally, combined, the orders of some operations are, optionally, changed, and some operations are, optionally, omitted.

As described below, method 900 provides an intuitive way for using a digital identification credential. The method reduces the cognitive burden on a user for using a digital identification credential, thereby creating a more efficient human-machine interface. For battery-operated computing devices, enabling a user to use a digital identification credential faster and more efficiently conserves power and increases the time between battery charges.

The computer system (e.g., 600) receives (902), via the one or more input devices, a request for digital identification from an external electronic device (e.g., 800) (e.g., a digital credential reader, and/or an NFC-enabled contactless reader) that is separate from the computer system. In some embodiments, the request is received from the external electronic device based on the computer system having been placed into an RF field (e.g., an NFC RF field) generated by the external electronic device.

In response to receiving the request for digital identification from the external electronic device (e.g., FIGS. 8A-8C)

(904), and in accordance with a determination that the external electronic device is authorized to receive digital identification credential information (906) (e.g., in accordance with a determination that the external electronic device is a recognized and/or authorized digital credential reader), the computer system (e.g., 600) displays (908), via the display generation component, a first user interface (e.g., 806) that identifies one or more pieces (e.g., a single piece or a plurality of pieces) of digital identification credential information (e.g., name, date of birth, age, above/below specified (non-zero) age threshold (e.g., older than or not older than 18 years old, without specifying an age), gender, ID photo, height, weight, eye color, hair color, organ donor status, veteran status, and/or address) being requested by the external electronic device (e.g., 808B) (e.g., one or more pieces of digital identification credential information associated with (e.g., corresponding to) a digital identification credential stored on the computer system). In some embodiments, the first user interface forgoes identifying one or more pieces of digital identification credential information that is not being requested by the external electronic device. In some embodiments, the digital identification credential stored on the computer system is associated with a first set of digital identification credential information, and the external electronic device requests some or all of the first set of digital identification credential information. In some embodiments, determining that the external electronic device is authorized to receive digital identification credential information includes receiving information from the external electronic device that identifies the external electronic device and performing, using the received information, a check (e.g., locally and/or via wireless/wired communication with a remote server) that the external electronic device is authorized to receive digital identification credential information (e.g., is a member of an authorized group). Displaying the first user interface that identifies one or more pieces of digital identification credential information being requested by the external electronic device provides the user with feedback about the current state of the device (e.g., that the device has received a request for one or more pieces of digital identification credential information from an external electronic device) and provides the user with feedback about what information will be transmitted if the user proceeds with the process.

Subsequent to (e.g., while) displaying the first user interface that identifies one or more pieces (e.g., a single piece or a plurality of pieces) of digital identification credential information being requested by the external electronic device (910), the computer system (e.g., 600) detects (912), via the one or more input devices, one or more user inputs (e.g., 810) (e.g., one or more tap inputs, one or more button inputs, one or more biometric inputs (e.g., photo, fingerprint scan, face scan, and/or eye scan)).

In response to detecting the one or more user inputs (914), and in accordance with a determination that the one or more user inputs satisfy one or more information transmission criteria (e.g., biometric authentication in FIGS. 8C-8D), the computer system (e.g., 600) transmits (918) the one or more pieces of digital identification credential information requested by the external electronic device to the external electronic device (e.g., 800), wherein the one or more pieces of digital identification credential information are associated with (e.g., correspond to) a digital identification credential stored on (e.g., in a secure element of) the computer system (e.g., without transmitting one or more other pieces of digital credential information associated with the digital identification credential stored on the computer system that is not being requested by the external electronic device). Transmitting the one or more pieces of digital identification credential information to the external electronic device if the one or more user inputs satisfy one or more information transmission criteria, and if the external electronic device is determined to be authorized to receive digital identification credential information, provides enhanced security and can prevent unauthorized users from initiating sensitive operations and/or accessing sensitive information.

In some embodiments, the computer system (e.g., 600) does not transmit any pieces of digital credential information (e.g., requested by the external electronic device or otherwise) to the external electronic device without first providing the user with what pieces of digital credential information have been requested and/or will be transmitted upon authorization and, receiving (subsequent to providing the user with what pieces of digital credential information requested/to be transmitting) user approval by satisfying the one or more information transmission criteria. Thus, in some embodiments, a prior user authorization (received prior to displaying the pieces of information requested/to be transmitted) to transmit digital credential information does not satisfy the one or more information transmission criteria.

In some embodiments, the one or more information transmission criteria includes a first criterion that is satisfied if the one or more user inputs include one or more user inputs (e.g., one or more tap inputs and/or one or more button inputs) corresponding to a request to transmit the requested digital credential information to the external electronic device. In some embodiments, the one or more information transmission criteria includes a second criterion that is satisfied if the one or more user inputs include biometric information (e.g., fingerprint scan, face scan, eye scan, and/or photo) and the biometric information matches biometric information stored on the computer system (e.g., biometric information corresponding to the digital identification credential stored on the computer system).

In some embodiments, in accordance with a determination that the external electronic device is not authorized to receive digital identification credential information (e.g., in accordance with a determination that the external electronic device is not a recognized digital credential reader), the computer system displays a second user interface different from the first user interface. In some embodiments, in accordance with a determination that the one or more user inputs do not satisfy the one or more information transmission criteria, the computer system forgoes transmitting the one or more pieces of digital identification credential information requested by the external electronic device to the external electronic device.

In some embodiments, in response to receiving the request for digital identification from the external electronic device, and in accordance with a determination that the external electronic device is not authorized to receive digital identification credential information (e.g., in accordance with a determination that the external electronic device is not a recognized and/or authorized digital credential reader), the computer system (e.g., 600) displays, via the display generation component, a notification (e.g., 812) indicating that the external electronic device is not authorized to receive digital identification credential information. In some embodiments, in accordance with the determination that the external electronic device is not authorized to receive digital identification credential information, the computer system displays a first option that is selectable to approve transmission of digital identification credential information to the external electronic device (e.g., despite the external electronic device not being authorized to receive digital identification credential information) (e.g., selectable to initiate and/or further a process for transmitting digital identification credential information to the external electronic device). Displaying a notification indicating that the external electronic device is not authorized to receive digital identification credential information provides enhanced security by informing the user that the external electronic device is not authorized, which can help users avoid initiating a transfer of sensitive information.

In some embodiments, displaying the first user interface further includes displaying identifying information identifying an entity corresponding to the external electronic device (e.g., 808A) (e.g., an entity requesting the one or more pieces of digital identification credential information, such as a merchant or government agency). Displaying the first user interface that identifies an entity corresponding to the external electronic device provides the user with feedback about the current state of the device (e.g., that the device has received a request for one or more pieces of digital identification credential information from the entity corresponding to the external electronic device). Displaying entity information identifying the entity that is requesting the digital identification credential information provides enhanced security and can prevent unauthorized users from initiating sensitive operations and/or accessing sensitive information.

In some embodiments, the one or more pieces of digital identification credential information represents a subset (e.g., some (less than all) or all) of digital identification credential information associated with (e.g., corresponding to) the digital identification credential (e.g., 606G) stored on the computer system (e.g., 600) (e.g., name, date of birth, age, above/below specified (non-zero) age threshold (e.g., older than or not older than 18 years old, without specifying an age), gender, ID photo, height, weight, eye color, hair color, organ donor status, veteran status, and/or address) (e.g., a digital identification credential corresponding to a physical identification credential (e.g., a physical driver's license, state identification card, employee identification card, benefits identification card, rewards card, and/or passport)). In some embodiments, the digital identification credential stored on the computer system is associated with a first set of digital identification credential information, and the external electronic device requests some or all of the first set of digital identification credential information. Displaying the first user interface that identifies one or more pieces of digital identification credential information being requested by the external electronic device provides enhanced security and can prevent unauthorized users from initiating sensitive operations and/or accessing sensitive information.

In some embodiments, displaying the first user interface (e.g., 806) that identifies one or more pieces of digital identification credential information being requested by the external electronic device (e.g., 8000) includes: displaying, via the display generation component, a first indication (e.g., 808B-2) that a first subset of the one or more pieces of digital identification credential information will be transmitted to the external electronic device but will not be stored by the external electronic device (e.g., will not be stored by an entity associated with the external electronic device) (e.g., will not be stored in a non-transitory computer readable medium (e.g., will only be stored temporarily in a transitory computer readable medium)) (e.g., will be not be stored in a computer-readable medium in a non-transitory manner such that the information cannot be accessed in the future by the entity associated with the external electronic device); and displaying (e.g., concurrently displaying), via the display generation component, a second indication (e.g., 808B-1) that a second subset (e.g., different from the first subset, not overlapping the first subset) of the one or more pieces of digital identification credential information will be transmitted to the external electronic device and will be stored by the external electronic device (e.g., will be stored by an entity associated with the external electronic device) (e.g., will be stored in a non-transitory computer readable medium) (e.g., will be stored in a computer-readable medium in a non-transitory manner such that the information can be accessed in the future by the entity associated with the external electronic device). In some embodiments, the first indication and the second indication are concurrently displayed. Displaying an indication of which pieces of information will be stored by the external electronic device and which pieces of information will not be stored by the external electronic device provides enhanced security and can prevent unauthorized users from initiating sensitive operations and/or accessing sensitive information.

In some embodiments, prior to receiving the request for digital identification from the external electronic device, the computer system (e.g., 600) forgoes displaying, via the display generation component, any content (e.g., FIG. 8A, left side) (e.g., operating in a sleep state, display is not displaying any content). In some embodiments, prior to receiving the request for digital identification from the external electronic device the computer system and/or a display of the computer system is in a low power state. In some embodiments, prior to receiving the request for digital identification from the external electronic device, the computer system is not displaying any content and/or is operating in a sleep state (e.g., the device generation component in communication with the computer system is in a sleep state and is not displaying any content), and in response to receiving the request for digital identification from the external electronic device, the computer system displays a user interface (e.g., the first user interface and/or a different user interface) indicating that the computer system has received a request for digital identification from the external electronic device. Displaying the first user interface that identifies one or more pieces of digital identification credential information being requested by the external electronic device provides the user with feedback about the current state of the device (e.g., that the device has received a request for one or more pieces of digital identification credential information from an external electronic device). Forgoing displaying any content, and then displaying the first user interface in response to receiving the request for digital identification from the external electronic device, provides the user with feedback about the current state of the device (e.g., that the device has received a request for one or more pieces of digital identification credential information from an external electronic device).

In some embodiments, prior to receiving (e.g., immediately prior to receiving) the request for digital identification from the external electronic device, the computer system displays, via the display generation component, a second user interface (e.g., 802) different from the first user interface (in some embodiments, the computer system receives the request for digital identification from the external electronic device while displaying the second user interface). In some embodiments, displaying the first user interface (e.g., 806) includes displaying the first user interface overlaid on the second user interface (e.g., 802) (e.g., the first user interface partially covers, overlays onto, and/or obscures the second user interface). In some embodiments, while displaying the first user interface, the second user interface is visually deemphasized (e.g., is darkened and/or blurred) (e.g., relative to the first user interface and/or relative to display of the second user interface prior to display of the first user interface). Displaying the first user interface overlaid on the second user interface provides the user with feedback about the current state of the device (e.g., that the device will return to the second user interface after transmission of content to the external electronic device is completed and/or canceled).

In some embodiments, in response to receiving the request for digital identification credential information from the external electronic device, and prior to displaying the first user interface, the computer system (e.g., 600) displays a third user interface (e.g., 804), different from the first user interface, indicating that a connection (e.g., a secure connection) is being established with the external electronic device. In some embodiments, digital identification credential information is not transmitted to the external electronic device while displaying the third user interface. In some embodiments, digital identification credential information is not transmitted to the external electronic device prior to the determination that the one or more user inputs satisfy the one or more information transmission criteria. Displaying the third user interface indicating that a connection is being established with the external electronic device provides the user with feedback about the current state of the device (e.g., that the device is establishing a connection with the external electronic device).

In some embodiments, the one or more user inputs includes biometric information corresponding to a user of the computer system (e.g., FIGS. 8C-8D) (e.g., biometric information collected subsequent to (e.g., while) displaying the first user interface) (e.g., biometric information collected in response to one or more user inputs (e.g., one or more tap inputs, one or more button inputs, and/or one or more different inputs) detected subsequent to (e.g., while) displaying the first user interface) (e.g., a facial scan, a fingerprint scan, and/or a periocular and/or eye scan); and the one or more information transmission criteria includes a criterion that is satisfied if the biometric information corresponds to (e.g., matches) a biometric profile associated with (e.g., corresponding to, is bound to) the digital identification credential stored on the computer system. Requiring biometric authentication prior to transmitting the digital identification credential information to the external electronic device provides enhanced security and can prevent unauthorized users from initiating sensitive operations and/or accessing sensitive information (e.g., by preventing an unauthorized user from utilizing the digital identification credential and/or transmitting digital identification credential information).

In some embodiments, the biometric information includes a facial scan (e.g., including a plurality of characteristics of facial features), and the biometric profile is a facial scan profile (e.g., a facial scan profile stored on the computer system). Requiring facial scan authentication prior to transmitting the digital identification credential information to the external electronic device provides enhanced security and can prevent unauthorized users from initiating sensitive operations and/or accessing sensitive information (e.g., by preventing an unauthorized user from utilizing the digital identification credential and/or transmitting digital identification credential information).

In some embodiments, the biometric information includes a fingerprint scan (e.g., including a plurality of characteristics of fingerprint features), and the biometric profile is a fingerprint scan profile (e.g., a fingerprint scan profile stored on the computer system). Requiring fingerprint scan authentication prior to transmitting the digital identification credential information to the external electronic device provides enhanced security and can prevent unauthorized users from initiating sensitive operations and/or accessing sensitive information (e.g., by preventing an unauthorized user from utilizing the digital identification credential and/or transmitting digital identification credential information).

In some embodiments, the digital identification credential is associated with (e.g., bound with) a first biometric profile stored on the computer system, and is not associated with (e.g., not bound with) a second biometric profile stored on the computer system. In some embodiments, the digital identification credential is associated with only the first biometric profile stored on the computer system, and is not associated with any other biometric profile stored on the computer system. In some embodiments, the one or more information transmission criteria includes a biometric criterion that is satisfied when the biometric information corresponds to a biometric profile associated with (e.g., bound with) the digital identification credential (e.g., the determination that the one or more user inputs satisfy the one or more information transmission criteria includes a determination that the biometric information corresponds to (e.g., matches) the first biometric profile) (e.g., FIGS. 8C-8E). In some embodiments, in response to detecting the one or more user inputs, and in accordance with a determination that the biometric information corresponds to (e.g., matches) the second biometric profile (in some embodiments, and does not correspond to the first biometric profile), the computer system (e.g., 600) forgoes transmitting the one or more pieces of digital identification credential information requested by the external electronic device to the external electronic device. In some embodiments, the digital identification credential is associated with a single biometric profile of a plurality of biometric profiles stored on the computer system, and the one or more user inputs must include biometric information that matches the single biometric profile in order to transmit digital identification credential information to the external electronic device. Requiring biometric authentication prior to transmitting the digital identification credential information to the external electronic device provides enhanced security and can prevent unauthorized users from initiating sensitive operations and/or accessing sensitive information (e.g., by preventing an unauthorized user from utilizing the digital identification credential and/or transmitting digital identification credential information).

Figures 10A, 10B:
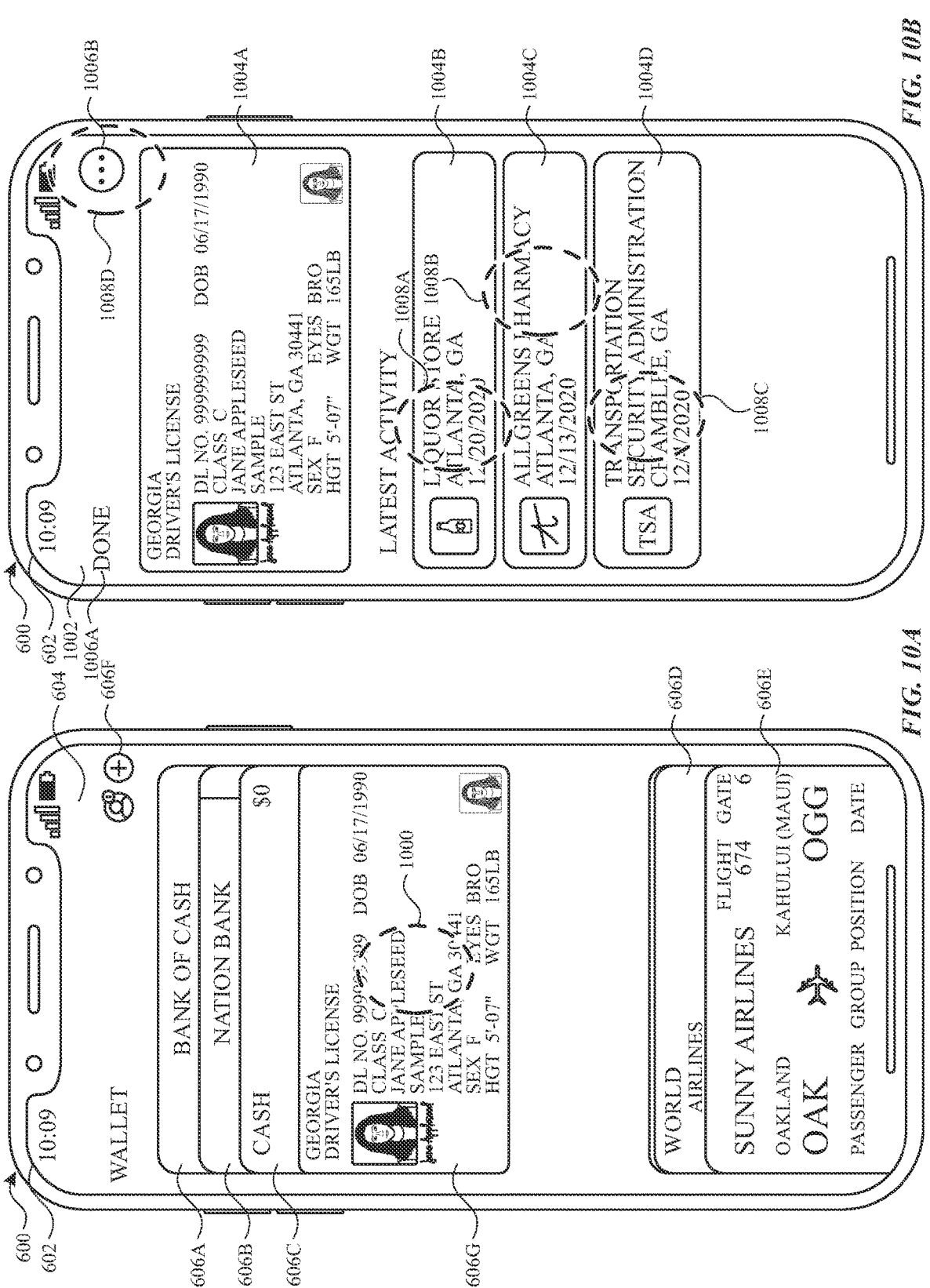
FIGS. 10A-10J illustrate exemplary user interfaces for managing digital identification credentials in accordance with some embodiments.
Figures 10C, 10D:
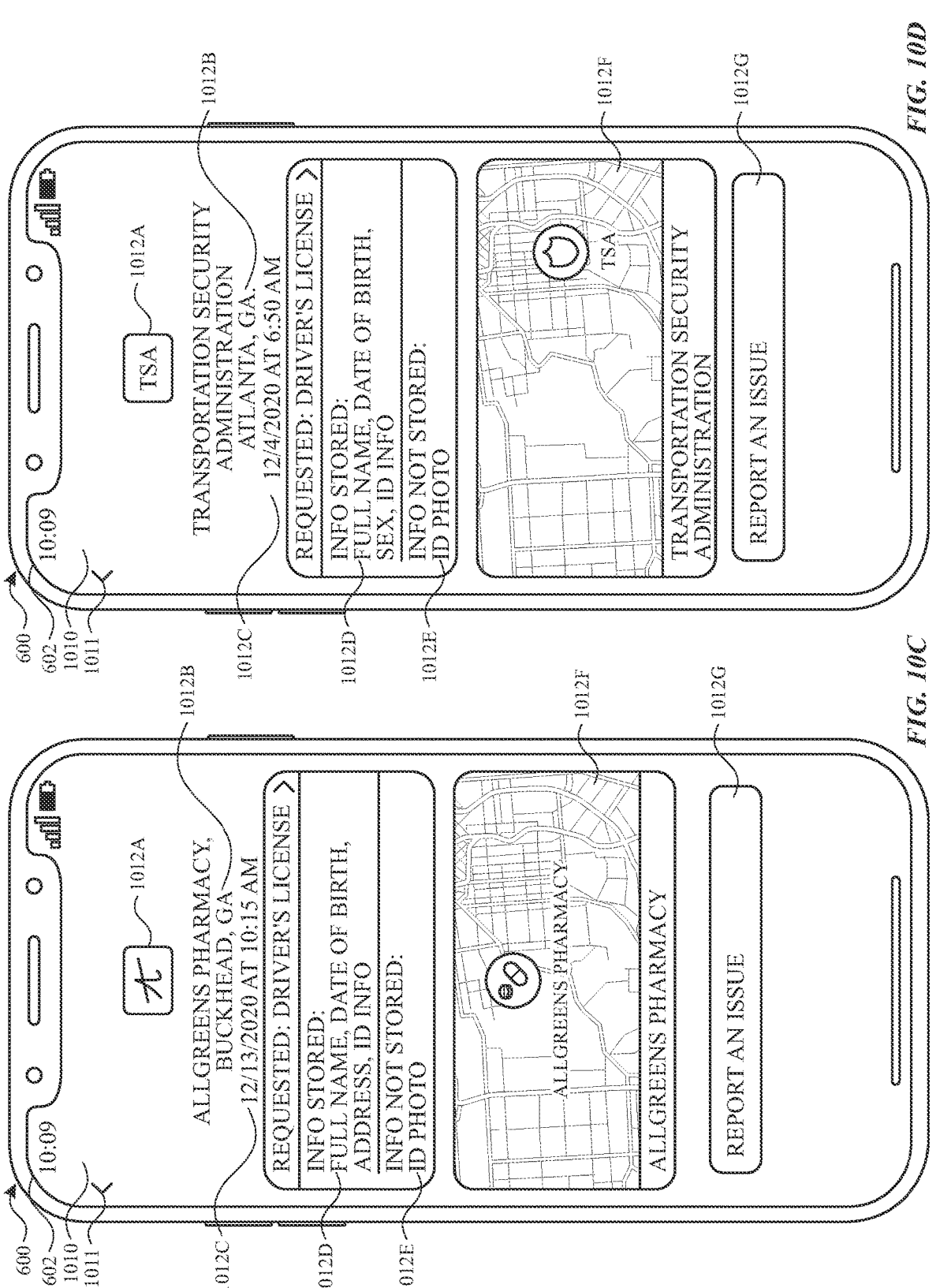
Figures 10E, 10F:
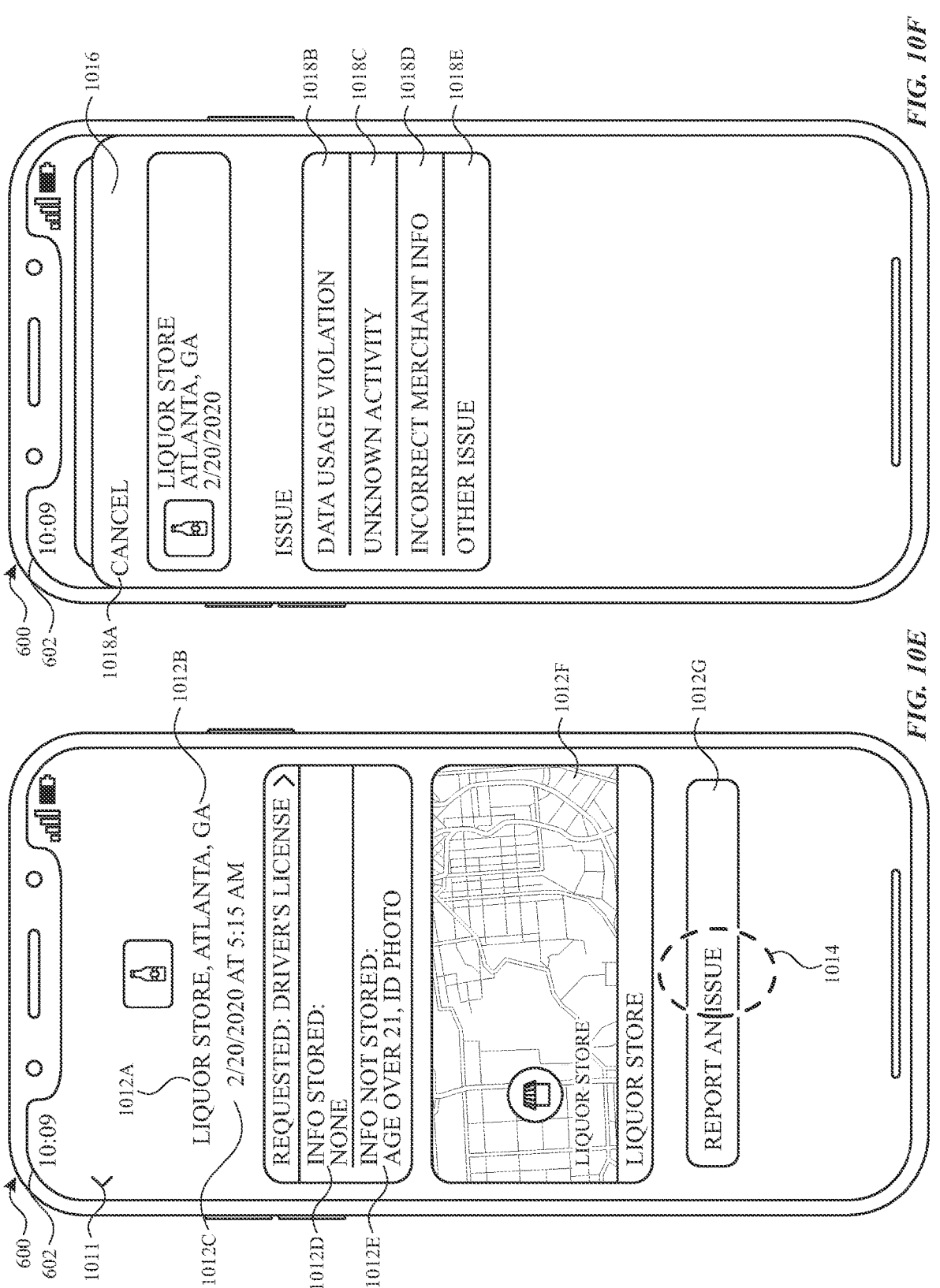

In some embodiments, in response to detecting the one or more user inputs, and in accordance with the determination that the one or more user inputs satisfy the one or more information transmission criteria (in some embodiments, in response to and/or subsequent to transmitting the one or more pieces of digital identification credential information to the external electronic device), the computer system (e.g., 600) stores, on the computer system, first transmission instance information corresponding to the transmitting the one or more pieces of digital identification credential information to the external electronic device (e.g., FIGS. 10C-10E). In some embodiments, the first transmission instance information includes one or more of the following: date and/or time of transmission; a requesting entity associated with the external electronic device; the one or more pieces of digital identification credential information requested by and transmitted to the external electronic device; identification of one or more pieces of digital identification credential information that was transmitted to the external electronic device but was not stored by the external electronic device (e.g., an entity associated with the external electronic device); and/or identification of one or more pieces of digital identification credential information that was transmitted to the external electronic device and was stored by the external electronic device (e.g., an entity associated with the external electronic device). In some embodiments, the transmission instance information can be accessed (e.g., can be displayed) via one or more user interfaces on the computer system. Automatically storing first transmission instance information corresponding to the transmitting the one or more pieces of digital identification credential information to the external electronic device allows a user to store the transmission instance information without requiring further user inputs.

In some embodiments, subsequent to storing the first transmission instance information on the computer system, the computer system (e.g., 600) displays, via the display generation component, a fourth user interface including representations of a plurality of digital credentials (e.g., 604) (e.g., one or more digital payment credentials, one or more digital rewards credentials, one or more digital membership credentials, and/or one or more digital identification credentials), including the digital identification credential (e.g., 606G). While displaying the fourth user interface, the computer system (e.g., 600) detects, via the one or more input devices, a second set of user inputs (e.g., 1000) (e.g., one or more tap inputs and/or one or more non-tap inputs) corresponding to a request to display representations of a plurality of transmission instances corresponding to the digital identification credential (e.g., instances in which digital identification credential information corresponding to the digital identification credential was transmitted to an external electronic device) (e.g., without displaying transmission instances corresponding to other digital credentials). In response to detecting the second set of user inputs, the computer system (e.g., 600) displays, via the display generation component, representations of a plurality of transmission instances (e.g., 1004B, 1004C, 1004D), including a first representation corresponding to (e.g., representative of) the first transmission instance information. While displaying the first representation, the computer system detects, via the one or more input devices, a third set of user inputs (e.g., 1008A, 1008B, 1008C) (e.g., one or more tap inputs and/or one or more non-tap inputs) corresponding to selection of the first representation. In response to detecting the third set of user inputs, the computer system (e.g., 600) displays, via the display generation component, at least a subset of the first transmission instance information (e.g., FIGS. 10C-10E) (e.g., some or all of the first transmission instance information). In some embodiments, the computer system receives a series of user inputs and displays, in response to the series of user inputs, details about a specific transaction (e.g., as part of a wallet application). In some embodiments, the details about the specific transaction includes details about what information was transmitted and will not be stored, what information was transmitted and will be stored, and/or what information was not transmitted. Displaying the fourth user interface that includes representations of a plurality of transmission instances corresponding to the digital identification credential allows a user to quickly and easily access information pertaining to past transmission instances for the digital identification credential, thereby providing a means for selection by the user. Otherwise, additional inputs would be required to further locate transmission instance information.

In some embodiments, the first transmission instance information includes: identification of one or more pieces of digital identification credential information that was transmitted to the external electronic device but was not stored by the external electronic device (e.g., 1012E) (e.g., an entity associated with the external electronic device); and identification of one or more pieces of digital identification credential information that was transmitted to the external electronic device and was stored by the external electronic device (e.g., 1012D) (e.g., an entity associated with the external electronic device). Storing a record of types of information that was transmitted to an external electronic device and was stored by the external electronic device enables the computer system to provide the user with a history of transactions and what information was provided as part of the transaction.

In some embodiments, the digital identification credential (e.g., 606G) is a digital credential of a first type (e.g., an identification credential and/or a non-identification credential). In some embodiments, the computer system stores one or more digital credentials of the first type, and the computer system stores one or more digital credentials of a second type (e.g., 606A-606C) (e.g., different from the first type, a payment credential, and/or a non-payment credential such as a loyalty account credential). In some embodiments, the one or more digital credentials of the second type are configured to be authorized for transmission of digital information to an external device (e.g., 800) before and/or after the computer system detects a nearby external device (e.g., before or after the computer system detects a request for information by the external device) (e.g., digital credentials of the second type can be "pre-armed" (e.g., pre-authorized by a user) to transmit digital information to an external device even before the computer system detects a request from an external device). In some embodiments, the one or more digital credentials of the first type are not configured to be authorized to transmit digital information to an external device until the external device has been detected by the computer system, and the computer system has displayed, via the display generation component, digital information being requested by the external device (e.g., 806, 808B) (e.g., digital credentials of the first type cannot be "pre-armed" (e.g., pre-authorized by a user) to transmit digital information to an external device) (e.g., digital credentials of the first type must first receive a request for digital information from an external device, and must first display the digital information being requested by the external device, prior to receiving authorization from a user to transmit the digital information to the external device (e.g., prior to receiving one or more user inputs that satisfy the information transmission criteria)). In some embodiments, the computer system will not transmit the one or more digital credentials of the first type without receiving explicit user authorization for the transaction after the computer system has received a request from the external electronic device for that transaction (e.g., the computer system does not allow pre-arming and/or pre-approving a transaction before the transaction request has been received and details of the transaction are displayed for the user). As a result, the computer systems helps to prevent a user from authorizing a transaction without first recognizing the information that will be transmitted as part of the transaction. In contrast, the computer system will transmit one or more digital credentials of the second type if the user has provided prior authorization (prior to receiving the request for the transaction) for transfers of the second type. Preventing digital credentials of the first type from being authorized to transmit digital information to an external device until the external device has been detected by the computer system and until digital information being requested by the external device is displayed on the display generation component (e.g., preventing digital credentials of the first type from being "pre-armed") provides enhanced security and can prevent unauthorized users from initiating sensitive operations and/ or accessing sensitive information (e.g., by ensuring that private information is not mistakenly or improperly being transmitted to external devices without explicit user authorization).

In some embodiments, the computer system (e.g., 600) receives, via the one or more input devices, a second request for digital credential information from a second external electronic device (e.g., 800) (e.g., a digital credential reader, and/or an NFC-enabled contactless reader) that is separate from the computer system, wherein the second request for digital credential information is received via a first connection channel (e.g., a first wireless connection channel, and/or a first connection channel of a first type); In some embodiments, the second request is received from the second external electronic device based on the computer system having been placed into an RF field (e.g., an NFC RF field) generated by the second external electronic device. In response to receiving the second request for digital credential information from the second external electronic device, and in accordance with a determination that the second request for digital credential information corresponds to a request for digital credential information corresponding to a digital credential of a second type (e.g., a digital payment credential) and that a first set of transmission conditions have been satisfied, the computer system (e.g., 600) transmits digital credential information to the second external electronic device via the first connection channel; and in accordance with a determination that the second request for digital credential information corresponds to a request for digital credential information from a digital credential of a first type (e.g., a digital identification credential) and that a second set of transmission conditions have been satisfied (e.g., different from the first set of transmission conditions) (e.g., the same as the first set of transmission conditions), the computer system (e.g., 600) transmits digital credential information to the second external electronic device via a second connection channel separate from the first connection channel (e.g., a second wireless connection channel, and/or a second connection channel of a second type different from the first type). In some embodiments, when the digital credential information is of the second type, credentials are transmitted using the same communication channel and/or communication protocol on which the request was received. In some embodiments, when the digital credential information is of the second type, credentials are transmitted using a different communication channel and/or communication protocol than on which the request was received. Receiving a request for information from an external device via a first channel, and transmitting digital credential information to the external device via a second channel, provides enhanced security and can prevent unauthorized users from initiating sensitive operations and/or accessing sensitive information (e.g., by transmitting digital credential information via a more secure channel), such as by transmitting the digital credential information using a channel that is more secure, faster, and/or more stable.

Note that details of the processes described above with respect to method 900 (e.g., FIG. 9) are also applicable in an analogous manner to the methods described below and/or above. For example, methods 700 and/or 1100 optionally include one or more of the characteristics of the various methods described above with reference to method 900. For example, the digital identification credential that is enrolled in method 700 may be the digital identification credential that is used in method 900 and/or that is managed in method 1100. For brevity, these details are not repeated below.

FIGS. 10A-10J illustrate exemplary user interfaces for managing digital credentials, in accordance with some embodiments. The user interfaces in these figures are used to illustrate the processes described below, including the processes in FIGS. 11A-11B.

FIG. 10A electronic device 600, which is a smartphone with touch-sensitive display 602. In some embodiments, electronic device 600 includes one or more features of devices 100, 300, and/or 500. Electronic device 600 depicts wallet user interface 604, which was discussed above with reference to FIGS. 6A and 6AF. Wallet user interface 604 includes representations of a plurality of digital credentials stored on electronic device 600, including representation 606G representative of a first digital identification credential (e.g., a digital Georgia driver's license). In FIG. 10A, electronic device 600 detects user input 1000 corresponding to selection of representation 606G.

At FIG. 10B, in response to user input 1000, electronic device 600 displays user interface 1002 corresponding to the first digital identification credential. User interface 1002 displays a graphical representation 1004A of the first digital identification credential. User interface 1002 also includes representations of transmission instances 1004B, 1004C, 1004D. Each representation 1004B, 1004C, 1004D is representative of an instance in which digital credential information corresponding to the first digital identification credential was transmitted to an external device (e.g., external reader device 800). User interface 1002 also includes done option 1006A, that is selectable to return to wallet user interface 604, and menu option 1006B, that is selectable to display digital credential information corresponding to the first digital identification credential. In FIG. 10B, while displaying user interface 1002, electronic device 600 detects user input 1008A, corresponding to selection of representation 1004B, user input 1008B, corresponding to selection of representation 1004C, user input 1008C, corresponding to selection of representation 1004D, and user input 1008D, corresponding to selection of option 1006B. Each of these user inputs will be discussed in turn in the following figures.

At FIG. 10C, in response to user input 1008A in FIG. 10B corresponding to selection of representation 1004B, electronic device 600 displays user interface 1010. Representation 1004B corresponds to a first transmission instance in which digital credential information was transmitted to an external device that is associated with Allgreens Pharmacy. Accordingly, in FIG. 10C, user interface 1010 displays entity information 1012A corresponding to the first transmission instance identifying an entity that requested and received digital certificate information; transmission location information 1012B corresponding to the first transmission instance identifying a location at which the information transmission occurred; transmission time information 1012C corresponding to the first transmission instance identifying a date and time at which the transmission occurred; a first set of digital credential information 1012D identifying types of digital credential information that were transmitted in the first transmission instance and was stored by the requesting entity; and a second set of digital credential information 1012E identifying types of digital credential information that were transmitted in the first transmission instance and were not stored by the requesting entity. In the first transmission instance depicted in FIG. 10C, information was transmitted to Allgreens Pharmacy in Buckhead Georgia at 10:15 AM on Dec. 13, 2020. Allgreens Pharmacy requested and received the user's full name, date of birth, address, and ID information (e.g., driver's license number), and stored this information, and Allgreens Pharmacy also requested and received the user's ID photo, but did not store this information. User interface 1010 in FIG. 10C also includes map 1012F which visually displays the location at which the first transmission instance occurred. User interface 1010 in FIG. 10C also includes option 1012G that is selectable to report issues with the first transmission instance. User interface 1010 also includes option 1011 that is selectable to return to user interface 1002.

At FIG. 10D, in response to user input 1008B in FIG. 10B corresponding to selection of representation 1004C, electronic device 600 displays user interface 1010. Representation 1004C corresponds to a second transmission instance in which digital credential information was transmitted to an external device that is associated with the Transportation Security Administration (TSA). Accordingly, in FIG. 10D, user interface 1010 displays entity information 1012A corresponding to the second transmission instance identifying an entity that requested and received digital certificate information; transmission location information 1012B corresponding to the second transmission instance identifying a location at which the information transmission occurred; transmission time information 1012C corresponding to the second transmission instance identifying a date and time at which the transmission occurred; a first set of digital credential information 1012D identifying types of digital credential information that were transmitted in the second transmission instance and was stored by the requesting entity; and a second set of digital credential information 1012E identifying types of digital credential information that were transmitted in the second transmission instance and were not stored by the requesting entity. In the second transmission instance depicted in FIG. 10D, information was transmitted to the TSA in Atlanta, Georgia on Dec. 4, 2020 at 6:50 AM. The TSA requested and received the user's full name, date of birth, gender, and ID information (e.g., driver's license number), and stored this information, and the TSA also requested and received the user's ID photo, but did not store this information. User interface 1010 in FIG. 10D also includes map 1012F which visually displays the location at which the second transmission instance occurred. User interface 1010 in FIG. 10D also includes option 1012G that is selectable to report issues with the second transmission instance.

At FIG. 10E, in response to user input 1008C in FIG. 10B corresponding to selection of representation 1004D, electronic device 600 displays user interface 1010. Representation 1004D corresponds to a third transmission instance in which digital credential information was transmitted to an external device that is associated with a store called "Liquor Store." Accordingly, in FIG. 10E, user interface 1010 displays entity information 1012A corresponding to the third transmission instance identifying an entity that requested and received digital certificate information; transmission location information 1012B corresponding to the third transmission instance identifying a location at which the information transmission occurred; transmission time information 1012C corresponding to the third transmission instance identifying a date and time at which the transmission occurred; a first set of digital credential information 1012D identifying types of digital credential information that were transmitted in the third transmission instance and was stored by the requesting entity; and a second set of digital credential information 1012E identifying types of digital credential information that were transmitted in the third transmission instance and were not stored by the requesting entity. In the third transmission instance depicted in FIG. 10E, information was transmitted to Liquor Store in Atlanta, Georgia on Feb. 20, 2020 at 5:15 AM. Liquor Store requested and received a binary determination of whether the user is over 21, and also the user's ID photo, but did not store any information. User interface 1010 in FIG. 10E also includes map 1012F which visually displays the location at which the third transmission instance occurred. User interface 1010 in FIG. 10E also includes option 1012G that is selectable to report issues with the second transmission instance. At FIG. 10E, electronic device detects user input 1014 corresponding to selection of option 1012G.

At FIG. 10F, in response to user input 1014, electronic device 600 displays user interface 1016. User interface 1016 includes option 1018A, that is selectable to return to user interface 1010 of FIG. 10E. User interface 1016 also includes option 1018B that is selectable to report a data usage violation for the third transmission instance (e.g., to report that Liquor Store is using data in an improper way); option 1018C that is selectable to report unknown activity (e.g., to report that the user does not believe he or she authorized the data transmission of the third transmission instance); option 1018D that is selectable to report incorrect merchant information (e.g., to report that the entity information 1012A associated with the third transmission instance is incorrect); and option 1018E to report other types of issues.

Figures 10G, 10H:
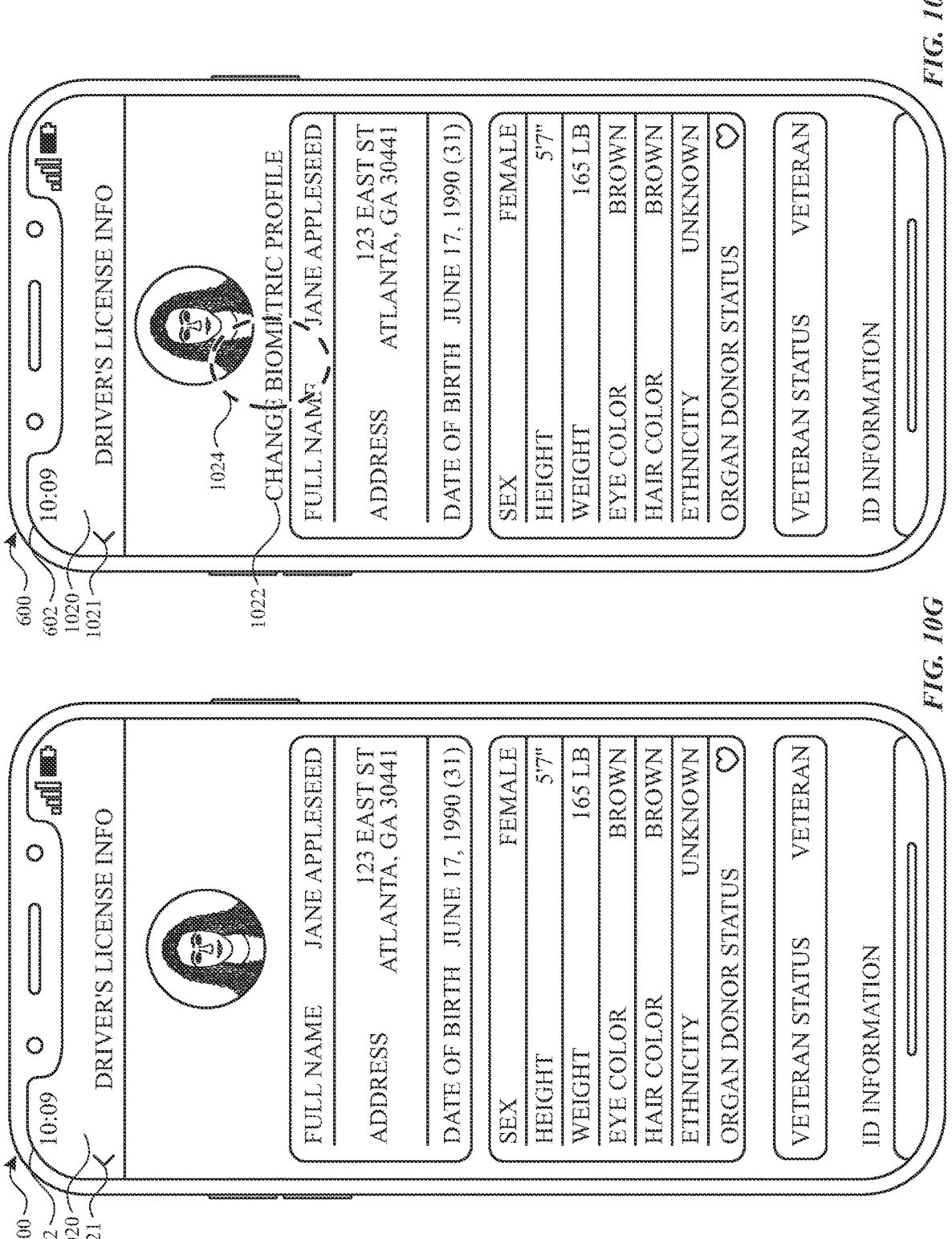

At FIG. 10G, in response to user input 1008D in FIG. 10B corresponding to selection of menu option 1006B, electronic device 600 displays user interface 1020. User interface 1020 identifies digital credential information (e.g., all digital credential information) corresponding to (e.g., stored as part of) the first digital identification credential (e.g., the Georgia driver's license). In some embodiments, digital credential information corresponding to the first digital identification credential includes a set of information that corresponds to a physical identification credential (e.g., physical identification credential 1030) (e.g., a physical Georgia driver's license). In some embodiments, the digital identification credential is a digital representation of the physical identification credential.

FIG. 10H displays a different embodiment of user interface 1020 of FIG. 10G. In FIG. 10H, user interface 1020 includes option 1022 that is selectable to initiate a process for changing a biometric profile associated with (e.g., bound to) the first digital identification credential. As discussed above, in some embodiments, a digital identification credential is bound to a biometric profile, such that transmission of digital identification information corresponding to the digital identification credential requires receipt of biometric information that matches the biometric profile. In some embodiments, electronic device 600 can allow for biometric profiles of different types, such as facial scan profiles and fingerprint scan profiles. In some embodiments, if the first digital identification credential is bound to a biometric profile of a first type (e.g., a facial scan profile), user interface 1020 does not include option 1022 (e.g., as shown in FIG. 10G), but if the first digital identification credential is bound to a biometric profile of a second type (e.g., a fingerprint scan profile), user interface 1020 does include option 1022 (e.g., as shown in FIG. 10H). Accordingly, in some embodiments, if the first digital identification credential is bound to a biometric profile of a first type (e.g., a facial scan profile), the user is not able to change the biometric profile that is bound to the first digital identification credential, but if the first digital identification credential is bound to a biometric profile of a second type (e.g., a fingerprint scan profile), the user is permitted and/or able to change the biometric profile that is bound to the first digital identification credential. At FIG. 10H, electronic device 600 detects user input 1024 corresponding to selection of option 1022.

Figures 10I, 10J:
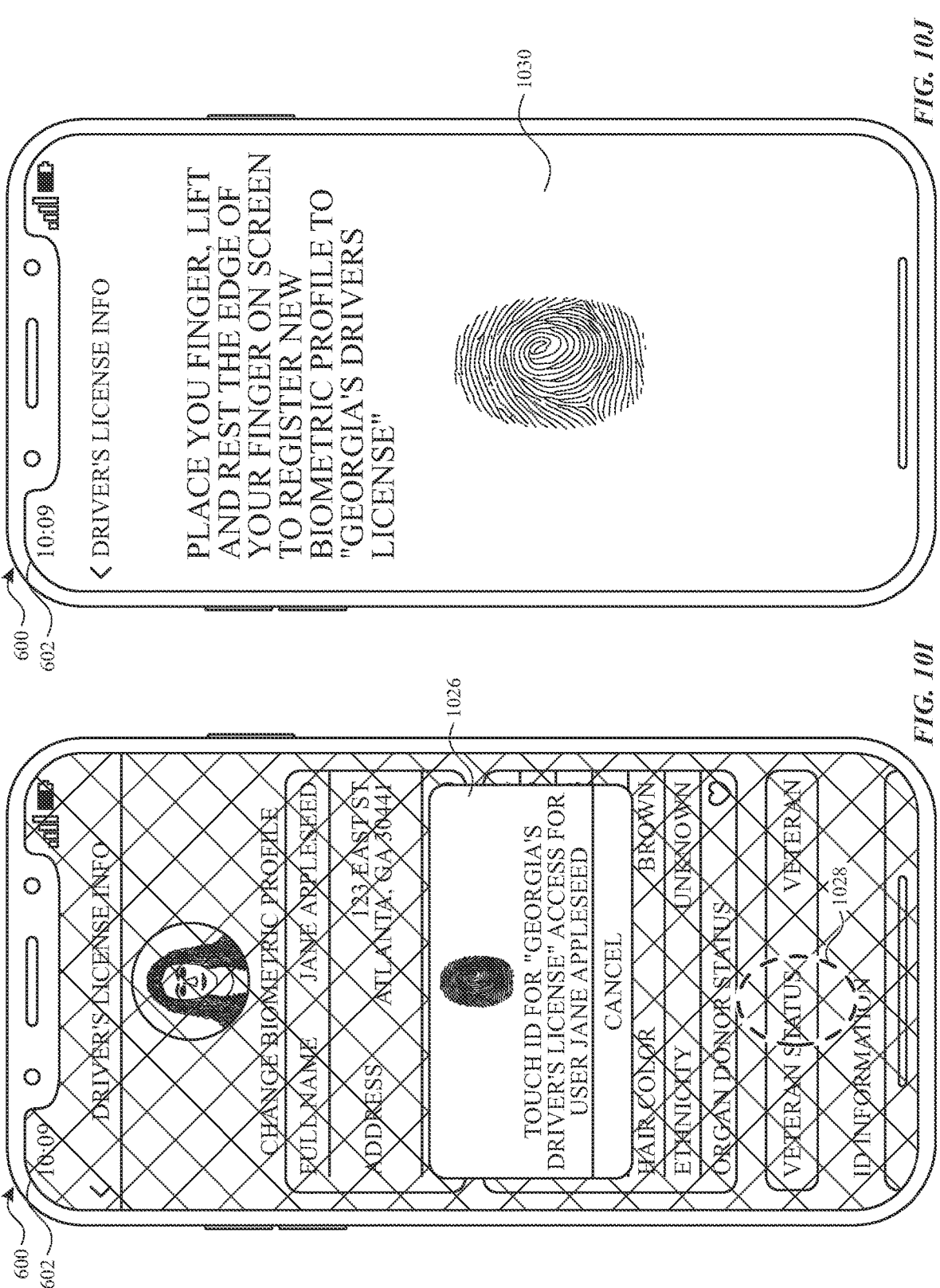

At FIG. 10I, in response to user input 1024, electronic device 600 displays notification 1026 requesting that the user profile biometric information corresponding to the biometric profile that is currently bound to the first digital identification credential. At FIG. 10I, electronic device 600 receives biometric information (e.g., fingerprint input 1028). At FIG. 10J, in accordance with a determination that the received biometric information corresponds to (e.g., matches) the biometric profile currently bound to the first digital identification credential, electronic device 600 displays instruction 1030 requesting that the user provide new biometric information for binding the first digital identification credential to a different and/or new biometric profile. In some embodiments, electronic device 600 receives updated and/or new biometric information, and, in accordance with a determination that the new biometric information corresponds to (e.g., matches) a second biometric profile stored on electronic device 600, electronic device 600 binds the first digital identification credential to the second biometric profile (and the first digital identification credential is no longer bound to the previous biometric profile).

FIGS. 11A-11B are a flow diagram illustrating a method for managing digital credentials using a computer system in accordance with some embodiments. Method 1100 is performed at a computer system (e.g., 100, 300, 500, 600) (e.g., a smart phone, a smart watch, and/or a tablet) that is in communication with a display generation component (e.g., a display controller; a touch-sensitive display system; and/or a display (e.g., integrated and/or connected)) and one or more input devices (e.g., a touch-sensitive surface (e.g., a touch-sensitive display); a mouse; a keyboard; and/or a remote control). Some operations in method 1100 are, optionally, combined, the orders of some operations are, optionally, changed, and some operations are, optionally, omitted.

As described below, method 1100 provides an intuitive way for managing digital credentials. The method reduces the cognitive burden on a user for managing digital credentials, thereby creating a more efficient human-machine interface. For battery-operated computing devices, enabling a user to manage digital credentials faster and more efficiently conserves power and increases the time between battery charges.

The computer system (e.g., 600) displays (1102), via the display generation component, a first user interface (e.g., 604) that includes one or more (e.g., one or multiple) representations of digital identification credentials (e.g., 606G) stored on the computer system including a representation of a first digital identification credential (e.g., 606G). In some embodiments, the first user interface includes one or more representations of digital credentials stored on the computer system, including one or more digital identification credentials and one or more other digital credentials (e.g., one or more payment credentials, one or more loyalty account credentials, and/or one or more transit account credentials). In some embodiments, the first user interface does not include representations of information transmission instances associated with (e.g., corresponding to) the first digital identification credential.

While displaying the first user interface (1104), the computer system (e.g., 600) detects (1106), via the one or more input devices, one or more user inputs (e.g., 1000) (e.g., one or more tap inputs and/or one or more non-tap inputs) corresponding to selection of (e.g., tap input on) the representation of the first digital identification credential.

In response to detecting the one or more user inputs corresponding to selection of the representation of the first digital identification credential (1108), the computer system (e.g., 600) displays (1110), via the display generation component, a second user interface (e.g., 1002) (e.g., a second user interface different from the first user interface) (e.g., replacing display of the first user interface with the second user interface) corresponding to (e.g., corresponding uniquely to) the first digital identification credential. The second user interface (e.g., 1002) includes representations of a plurality of information transmission instances (e.g., 1004B, 1004C, 1004D) associated with (e.g., corresponding to) the first digital identification credential, including a representation of a first transmission instance (e.g., 1004B) and a representation of a second transmission instance (e.g., 1004C) (1112). The first transmission instance corresponds to a first instance in which a first set of digital credential information (e.g., 1012D, 1012E in FIG. 10C) (e.g., name, date of birth, age, above/below specified (non-zero) age threshold (e.g., older than or not older than 18 years old, without specifying an age), gender, ID photo, height, weight, eye color, hair color, organ donor status, veteran status, and/or address) associated with (e.g., corresponding to) the first digital identification credential was transmitted to a first external electronic device (e.g., a wireless reader, an NFC reader) (1114). The second transmission instance corresponds to a second instance (e.g., different from the first instance) in which a second set of digital credential information (e.g., 1012D, 1012E in FIG. 10D) (e.g., name, date of birth, age, above/below specified (non-zero) age threshold (e.g., older than or not older than 18 years old, without specifying an age), gender, ID photo, height, weight, eye color, hair color, organ donor status, veteran status, and/or address) associated with (e.g., corresponding to) the first digital identification credential was transmitted to a second external electronic device (e.g., a wireless reader, an NFC reader) (e.g., a second external electronic device different from the first external electronic device) (1116). In some embodiments, the first set of digital credential information is different from the second set of digital credential information (e.g., the first set of digital credential information represents a first subset of digital credential information associated with the digital identification credential, and the second set of digital credential information represents a second subset of digital credential information associated with the digital identification credential different from the first subset). Storing a record of various transmission instances and types of information that was transmitted to an external electronic device in each of those transmission instances and displaying them provides enhanced security by providing the user with a history of private information that has been transmitted to external devices.

While displaying the second user interface (e.g., 1002) (1118), the computer system (e.g., 600) detects (1120), via the one or more input devices, one or more selection inputs (e.g., 1004B, 1004C, 1004D) (e.g., one or more tap inputs and/or one or more non-tap inputs).

In response to detecting the one or more selection inputs (e.g., 1008A, 1008B, 1008C) (1122): in accordance with a determination that the one or more selection inputs correspond to selection of the representation of the first transmission instance (e.g., 1004B) (1124), the computer system (e.g., 600) displays (1126), via the display generation component, representations of the first set of digital credential information (e.g., 1012D, 1012E in FIG. 10C) that was transmitted to the first external electronic device in the first instance (e.g., without displaying representations of the second set of digital credential information that was transmitted to the second external electronic device in the second instance); and in accordance with a determination that the one or more selection inputs correspond to selection of the representation of the second transmission instance (e.g., 1004C) (1128), the computer system (e.g., 600) displays (1130), via the display generation component, representations of the second set of digital credential information (e.g., 1012D, 1012E in FIG. 10D) that was transmitted to the second external electronic device in the second instance (e.g., without displaying representations of the first set of digital credential information that was transmitted to the first external electronic device in the first instance).

In some embodiments, the first set of digital credential information (e.g., 1012D, 1012E in FIG. 10C) includes a first subset of (e.g., less than all of) a set of credential information that includes: name, address, date of birth, identification photo, gender, height, identification issue date, identification expiration date, and an age threshold determination (e.g., a binary determination of whether a person associated with the digital identification credential satisfies a minimum age requirement); and the second set of digital credential information (e.g., 1012D, 1012E in FIG. 10D) includes a second subset of (e.g., less than all of) the set of credential information different from the first subset. Storing a record of various transmission instances and types of information that was transmitted to an external electronic device in each of those transmission instances provides enhanced security by providing the user with a history of private information that has been transmitted to external devices.

In some embodiments, displaying representations of the first set of digital credential information that was transmitted to the first external electronic device in the first instance includes: displaying, via the display generation component, a first indication that a first subset of (e.g., less than all of) the first set of digital credential information was transmitted to the first external electronic device but was not stored by the first external electronic device (e.g., 1012E) (e.g., was not stored by an entity associated with the first external electronic device, and/or was not stored in a non-transitory computer readable medium (e.g., was only stored temporarily in a transitory computer readable medium)); and displaying (e.g., concurrently displaying), via the display generation component, a second indication that a second subset of (e.g., less than all of) the first set of digital credential information was transmitted to the first external electronic device and was stored by the first external electronic device (e.g., 1012D) (e.g., was stored by an entity associated with the first external electronic device) (e.g., was stored in a non-transitory computer readable medium) (e.g., was stored in a computer-readable medium in a non-transitory manner such that the information can be accessed in the future by the entity associated with the first external electronic device). Storing a record of various transmission instances and types of information that was transmitted to an external electronic device in each of those transmission instances, including a record of what types of information was stored by the external electronic device and what types of information was not stored, provides enhanced security and can prevent unauthorized users from initiating sensitive operations and/or accessing sensitive information (e.g., by ensuring that private information has not been improperly transmitted to external devices and/or the external devices are not improperly storing private information).

In some embodiments, displaying representations of the second set of digital credential information that was transmitted to the second external electronic device in the second instance includes: displaying, via the display generation component, a third indication that a third subset of the second set of digital credential information was transmitted to the second external electronic device but was not stored by the second external electronic device (e.g., was not stored by an entity associated with the second external electronic device) (e.g., was not stored in a non-transitory computer readable medium (e.g., was only stored temporarily in a transitory computer readable medium)); and displaying (e.g., concurrently displaying), via the display generation component, a fourth indication that a fourth subset of the second set of digital credential information was transmitted to the second external electronic device and was stored by the second external electronic device (e.g., was stored by an entity associated with the second external electronic device) (e.g., was stored in a non-transitory computer readable medium) (e.g., was stored in a computer-readable medium in a non-transitory manner such that the information can be accessed in the future by the entity associated with the second external electronic device).

In some embodiments, in response to detecting the one or more selection inputs (e.g., 1008A, 1008B, 1008C): in accordance with a determination that the one or more selection inputs correspond to selection of the representation of the first transmission instance (e.g., 1004B), the computer system (e.g., 600) displays, via the display generation component, entity information (e.g., 1012A in FIG. 10C) identifying a first entity associated with the first external electronic device; and in accordance with a determination that the one or more selection inputs correspond to selection of the representation of the second transmission instance (e.g., 1004C), the computer system (e.g., 600) displays, via the display generation component, entity information (e.g., 1012A in FIG. 10D) identifying a second entity (e.g., different from the first entity) (e.g., without displaying entity information identifying the first entity) associated with the second external electronic device. In some embodiments, the entity information identifying the first entity is displayed concurrently with the representations of the first set of digital credential information. In some embodiments, the entity information identifying the second entity is displayed concurrently with the representations of the second set of digital credential information. Storing a record of various transmission instances, including a record of the information requesting entity associated with each transmission instance, provides enhanced security and provides the user with visual feedback about the entity to which information was transmitted.

In some embodiments, in response to detecting the one or more selection inputs (e.g., 1008A, 1008B, 1008C): in accordance with a determination that the one or more selection inputs correspond to selection of the representation of the first transmission instance (e.g., 1004B), the computer system (e.g., 600) displays, via the display generation component, a first selectable option (e.g., 1012G in FIG. 10C) that is selectable to initiate a process for reporting an issue corresponding to the first transmission instance (e.g., data usage violation, unknown activity, incorrect merchant info, and/or other issues); and in accordance with a determination that the one or more selection inputs correspond to selection of the representation of the second transmission instance (e.g., 1004C), the computer system (e.g., 600) displays, via the display generation component, a second selectable option (e.g., 1012G in FIG. 10D) that is selectable to initiate a process for reporting an issue corresponding to the second transmission instance (e.g., data usage violation, unknown activity, incorrect merchant info, and/or other issues). In some embodiments, the first selectable option is displayed concurrently with the representations of the first set of digital credential information. In some embodiments, the second selectable option is displayed concurrently with the representations of the second set of digital credential information. Displaying a selectable option that is selectable to initiate a process for reporting an issue corresponding to a transmission instance, provides enhanced security and can prevent unauthorized users from initiating sensitive operations and/or accessing sensitive information (e.g., by allowing a user to report an unauthorized or otherwise inappropriate transmission instance).

In some embodiments, the second user interface (e.g., 1002) further includes a third selectable option (e.g., 1006B) that is selectable to display digital credential information corresponding to the first digital identification credential. In some embodiments, the third selectable option is displayed concurrently with the representation of the first transmission instance and the representation of the second transmission instance. In some embodiments, in response to detecting the one or more selection inputs (e.g., 1008D): in accordance with a determination that the one or more selection inputs (e.g., 1008D) correspond to selection of the third selectable option (e.g., 1006B), the computer system (e.g., 600) displays, via the display generation component, a fourth user interface (e.g., 1020) different from the first, second, and third user interfaces. In some embodiments, the fourth user interface displays digital credential information corresponding to the first digital identification credential. Displaying a fourth user interface in response to detecting the one or more selection inputs provides the user with feedback about the current state of the device (e.g., the device has detected the one or more selection inputs).

In some embodiments, the fourth user interface (e.g., 1020) displays digital credential information corresponding to the first digital identification credential. In some embodiments, digital credential information corresponding to the first digital identification credential includes one or more of: name, address, date of birth, identification photo, gender, height, identification issue date, identification expiration date, a geographic region associated with the digital identification credential, one or more commercial licenses associated with the digital identification credential, voter registration status, organ donor status, eye color, hair color, and veteran status. In some embodiments, the fourth user interface displays all digital credential information that can be provided to an external electronic device using the first digital identification credential. Displaying a fourth user interface that displays digital credential information corresponding to the first digital identification credential provides the user with feedback about the current state of the device (e.g., the device has associated the first digital identification credential with the information displayed in the fourth user interface).

In some embodiments, the computer system (e.g., 600) stores a plurality of biometric profiles (e.g., a plurality of facial scan profiles, fingerprint scan profiles, and/or periocular and/or eye scan profiles); and the first digital identification credential (e.g., 606G) is bound to a first biometric profile of the plurality of biometric profiles (e.g., bound exclusively to the first biometric profile, and/or is bound to the first biometric profile and is not bound to any of the other biometric profiles stored on the computer system). In some embodiments, transmission of digital credential information corresponding to the first digital identification credential requires biometric authentication based on the first biometric profile. Binding the digital identification credential to a biometric profile stored on the computer system provides enhanced security and can prevent unauthorized users from initiating sensitive operations and/or accessing sensitive data (e.g., by preventing an unauthorized user from utilizing the digital identification credential).

In some embodiments, subsequent to displaying the second user interface (e.g., 1002), the computer system (e.g., 600) displays, via the display generation component, a fifth user interface (e.g., 1020) corresponding to (e.g., corresponding uniquely to) the first digital identification credential (e.g., 606G). In accordance with a determination that the first biometric profile is a biometric profile of a first type (e.g., a fingerprint scan profile), the fifth user interface (e.g., 1020 in FIG. 10H) includes a fifth selectable option (e.g., 1022) that is selectable to initiate a process for changing the biometric profile that is bound to the first digital identification credential (e.g., to a fingerprint of a different finger). In accordance with a determination that the first biometric profile is a biometric profile of a second type different from the first type (e.g., a facial scan profile), the fifth user interface (e.g., 1020 in FIG. 10G) does not include the fifth selectable option that is selectable to initiate a process for changing the biometric profile that is bound to the first digital identification credential (e.g., does not include any selectable option that is selectable to change the biometric profile that is bound to the first digital identification credential). In some embodiments, the fifth user interface displays digital credential information corresponding to the first digital identification credential. In some embodiments, digital credential information corresponding to the first digital identification credential includes one or more of: name, address, date of birth, identification photo, gender, height, identification issue date, identification expiration date, a geographic region associated with the digital identification credential, one or more commercial licenses associated with the digital identification credential, voter registration status, organ donor status, eye color, hair color, and veteran status. In some embodiments, the fifth user interface is the fourth user interface. Automatically displaying the fifth selectable option in the fifth user interface if the first biometric profile is a biometric profile of a first type provides the user with feedback about the current state of the device (e.g., the device has enabled the user to change the biometric profile that is bound to the digital identification credential). Forgoing displaying the fifth selectable option in the fifth user interface if the first biometric profile is a biometric profile of the second type provides the user with feedback about the current state of the device (e.g., the device has not enabled the user to change the biometric profile that is bound to the digital identification credential).

In some embodiments, while displaying the fifth selectable option (e.g., 1022), the computer system (e.g., 600) detects, via the one or more input devices, a second set of selection inputs (e.g., 1024) (e.g., one or more tap inputs and/or one or more non-tap inputs) corresponding to selection of the fifth selection option. In response to detecting the second set of selection inputs, the computer system (e.g., 600) displays, via the display generation component, a sixth user interface (e.g., 1026) requesting the user to provide biometric information corresponding to the first biometric profile (e.g., requesting the user to provide a fingerprint corresponding to the fingerprint scan profile that is currently bound to the first digital identification credential). In some embodiments, subsequent to (e.g., while) displaying the sixth user interface (e.g., 1026), the computer system (e.g., 600) receives, via the one or more input devices, biometric information from a user (e.g., fingerprint input 1028). In response to receiving the biometric information from the user, and in accordance with a determination that the biometric information from the user corresponds to (e.g., matches) the first biometric profile, the computer system (e.g., 600) displays a seventh user interface (e.g., 1030) requesting the user to provide updated biometric information to be bound to the first digital identification credential. Subsequent to (e.g., while) displaying the seventh user interface (e.g., 1030), the computer system (e.g., 600) receives, via the one or more input devices, updated biometric information from the user. In response to receiving the updated biometric information from the user: in accordance with a determination that the updated biometric information corresponds to a second biometric profile stored on the computer system (e.g., 600) (e.g., different from the first biometric profile), the computer system (e.g., 600) binds the first digital identification credential to the second biometric profile; and in accordance with a determination that the updated biometric information corresponds to a third biometric profile stored on the computer system (e.g., different from the first and second biometric profiles), the computer system (e.g., 600) binds the first digital identification credential to the third biometric profile. In some embodiments, binding the first digital identification credential to a different biometric profile also causes the first digital identification credential to no longer be bound to the first biometric profile. Binding the digital identification credential to a biometric profile stored on the computer system provides enhanced security and can prevent unauthorized users from initiating sensitive operations and/or accessing sensitive data (e.g., by preventing an unauthorized user from utilizing the digital identification credential). Requiring that a user provide biometric information corresponding to a currently applied biometric profile prior to changing the biometric profile bound to the digital identification credential provides enhanced security and can prevent unauthorized users from initiating sensitive operations and/or accessing sensitive data (e.g., by preventing an unauthorized user from changing the biometric profile that is applied to the digital identification credential).

Note that details of the processes described above with respect to method 1100 (e.g., FIGS. 11A-11B) are also applicable in an analogous manner to the methods described above. For example, methods 700 and/or 900 optionally include one or more of the characteristics of the various methods described above with reference to method 1100. For example, the digital identification credential that is enrolled in method 700 may be the digital identification credential that is used in method 900 and/or that is managed in method 1100. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve enrollment, use, and management of digital identification credentials. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enroll, use, and/or manage digital identification credentials. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of digital identification credentials, the present technology can be configured to allow users to select to "opt in" or "opt out" of participation in the collection of personal information data during registration for services or anytime thereafter. In another example, users can select not to provide sensitive and/or personalized information during enrollment, use, and management of digital credentials. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, digital credentials can be enrolled and/or used by a user by inferring preferences based on non-personal information data or a bare minimum amount of personal information, such as the content being requested by the device associated with a user, other non-personal information available to the digital credential services, or publicly available information.

What is claimed is:
1. A computer system comprising:
a display generation component;
one or more input devices;
one or more processors; and
memory storing one or more programs configured to be executed by the one or more processors, the one or more programs including instructions for:
    receiving, via the one or more input devices, a request for digital identification including digital identification credential information from an external electronic device that is separate from the computer system;

in response to receiving the request for the digital identification including the digital identification credential information from the external electronic device:
        in accordance with a determination that the external electronic device is authorized to receive digital identification credential information:
            displaying, via the display generation component, a first user interface that includes:
                a graphical representation of a physical identification credential corresponding to one or more pieces of digital identification credential information being requested by the external electronic device; and
                a first indication that a first subset of the one or more pieces of digital identification credential information will be transmitted to the external electronic device but will not be stored by the external electronic device;
        subsequent to displaying the first user interface that includes the graphical representation of the physical identification credential corresponding to the one or more pieces of digital identification credential information being requested by the external electronic device, detecting, via the one or more input devices, one or more user inputs; and
        in response to detecting the one or more user inputs:
            in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

2. The computer system of claim 1, wherein the one or more programs further include instructions for:
in response to receiving the request for digital identification from the external electronic device:
    in accordance with a determination that the external electronic device is not authorized to receive digital identification credential information:
        displaying, via the display generation component, a notification indicating that the external electronic device is not authorized to receive digital identification credential information.

3. The computer system of claim 1, wherein:
displaying the first user interface further includes displaying identifying information identifying an entity corresponding to the external electronic device.

4. The computer system of claim 1, wherein the one or more pieces of digital identification credential information represents a subset of digital identification credential information associated with the digital identification credential stored on the computer system.

5. The computer system of claim 1, wherein displaying the first user interface further includes:
displaying, via the display generation component, a second indication that a second subset of the one or more pieces of digital identification credential information will be transmitted to the external electronic device and will be stored by the external electronic device.

6. The computer system of claim 1, wherein the one or more programs further include instructions for:

prior to receiving the request for digital identification from the external electronic device, forgoing displaying, via the display generation component, any content.

7. The computer system of claim 1, wherein the one or more programs further include instructions for:

prior to receiving the request for digital identification from the external electronic device, displaying, via the display generation component, a second user interface different from the first user interface, wherein:

displaying the first user interface includes displaying the first user interface overlaid on the second user interface.

8. The computer system of claim 1, wherein the one or more programs further include instructions for:

in response to receiving the request for digital identification credential information from the external electronic device, and prior to displaying the first user interface, displaying a third user interface, different from the first user interface, indicating that a connection is being established with the external electronic device.

9. The computer system of claim 1, wherein:

the one or more user inputs includes biometric information corresponding to a user of the computer system; and the one or more information transmission criteria includes a criterion that is satisfied if the biometric information corresponds to a biometric profile associated with the digital identification credential stored on the computer system.

10. The computer system of claim 9, wherein the biometric information includes a facial scan, and the biometric profile is a facial scan profile.

11. The computer system of claim 9, wherein the biometric information includes a fingerprint scan, and the biometric profile is a fingerprint scan profile.

12. The computer system of claim 9, wherein:

the digital identification credential is associated with a first biometric profile stored on the computer system, and is not associated with a second biometric profile stored on the computer system; and the one or more information transmission criteria includes a biometric criterion that is satisfied when the biometric information corresponds to a biometric profile associated with the digital identification credential; and the one or more programs further include instructions for:

in response to detecting the one or more user inputs, in accordance with a determination that the biometric information corresponds to the second biometric profile, forgoing transmitting the one or more pieces of digital identification credential information requested by the external electronic device to the external electronic device.

13. The computer system of claim 1, wherein the one or more programs further include instructions for:

in response to detecting the one or more user inputs:

in accordance with the determination that the one or more user inputs satisfy the one or more information transmission criteria, storing, on the computer system, first transmission instance information corresponding to the transmitting the one or more pieces of digital identification credential information to the external electronic device.

14. The computer system of claim 13, wherein the one or more programs further include instructions for:

subsequent to storing the first transmission instance information on the computer system, displaying, via the display generation component, a fourth user interface including representations of a plurality of digital credentials, including the digital identification credential;

while displaying the fourth user interface, detecting, via the one or more input devices, a second set of user inputs corresponding to a request to display representations of a plurality of transmission instances corresponding to the digital identification credential;

in response to detecting the second set of user inputs, displaying, via the display generation component, representations of a plurality of transmission instances, including a first representation corresponding to the first transmission instance information;

while displaying the first representation, detecting, via the one or more input devices, a third set of user inputs corresponding to selection of the first representation; and in response to detecting the third set of user inputs:

displaying, via the display generation component, at least a subset of the first transmission instance information.

15. The computer system of claim 13, wherein:

the first transmission instance information includes:

identification of one or more pieces of digital identification credential information that was transmitted to the external electronic device but was not stored by the external electronic device; and identification of one or more pieces of digital identification credential information that was transmitted to the external electronic device and was stored by the external electronic device.

16. The computer system of claim 1, wherein:

the digital identification credential is a digital credential of a first type;

the computer system stores one or more digital credentials of the first type; and the computer system stores one or more digital credentials of a second type;

the one or more digital credentials of the second type are configured to be authorized for transmission of digital information to an external device before and/or after the computer system detects a nearby external device; and the one or more digital credentials of the first type are not configured to be authorized to transmit digital information to an external device until the external device has been detected by the computer system, and the computer system has displayed, via the display generation component, digital information being requested by the external device.

17. The computer system of claim 1, wherein the one or more programs further include instructions for:

receiving, via the one or more input devices, a second request for digital credential information from a second external electronic device that is separate from the computer system, wherein the second request for digital credential information is received via a first connection channel;

in response to receiving the second request for digital credential information from the second external electronic device:

in accordance with a determination that the second request for digital credential information corresponds to a request for digital credential information corresponding to a digital credential of a second type and that a first set of transmission conditions have been satisfied, transmitting digital credential information to the second external electronic device via the first connection channel; and in accordance with a determination that the second request for digital credential information corresponds to a request for digital credential information from a digital credential of a first type and that a second set of transmission conditions have been satisfied, transmitting digital credential information to the second external electronic device via a second connection channel separate from the first connection channel.

18. A non-transitory computer-readable storage medium storing one or more programs configured to be executed by one or more processors of a computer system that includes a display generation component and one or more input devices, the one or more programs including instructions for:

receiving, via the one or more input devices, a request for digital identification including digital identification credential information from an external electronic device that is separate from the computer system;

in response to receiving the request for the digital identification including the digital identification credential information from the external electronic device:

in accordance with a determination that the external electronic device is authorized to receive digital identification credential information:

displaying, via the display generation component, a first user interface that includes:

a graphical representation of a physical identification credential corresponding to one or more pieces of digital identification credential information being requested by the external electronic device; and a first indication that a first subset of the one or more pieces of digital identification credential information will be transmitted to the external electronic device but will not be stored by the external electronic device;

subsequent to displaying the first user interface that includes the graphical representation of the physical identification credential corresponding to the one or more pieces of digital identification credential information being requested by the external electronic device, detecting, via the one or more input devices, one or more user inputs; and in response to detecting the one or more user inputs:

in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

19. A method, comprising:

at a computer system that includes a display generation component and one or more input devices:

receiving, via the one or more input devices, a request for digital identification including digital identification credential information from an external electronic device that is separate from the computer system;

in response to receiving the request for the digital identification including the digital identification credential information from the external electronic device:

in accordance with a determination that the external electronic device is authorized to receive digital identification credential information:

displaying, via the display generation component, a first user interface that includes:

a graphical representation of a physical identification credential corresponding to one or more pieces of digital identification credential information being requested by the external electronic device; and a first indication that a first subset of the one or more pieces of digital identification credential information will be transmitted to the external electronic device but will not be stored by the external electronic device;

subsequent to displaying the first user interface that includes the graphical representation of the physical identification credential corresponding to the one or more pieces of digital identification credential information being requested by the external electronic device, detecting, via the one or more input devices, one or more user inputs; and in response to detecting the one or more user inputs:

in accordance with a determination that the one or more user inputs satisfy one or more information transmission criteria, transmitting the one or more pieces of digital identification credential information requested by the external electronic device to the external electronic device, wherein the one or more pieces of digital identification credential information are associated with a digital identification credential stored on the computer system.

20. The non-transitory computer-readable storage medium of claim 18, wherein the one or more programs further include instructions for:

in response to receiving the request for digital identification from the external electronic device:

in accordance with a determination that the external electronic device is not authorized to receive digital identification credential information:

displaying, via the display generation component, a notification indicating that the external electronic device is not authorized to receive digital identification credential information.

21. The non-transitory computer-readable storage medium of claim 18, wherein:

displaying the first user interface further includes displaying identifying information identifying an entity corresponding to the external electronic device.

22. The non-transitory computer-readable storage medium of claim 18, wherein the one or more pieces of digital identification credential information represents a subset of digital identification credential information associated with the digital identification credential stored on the computer system.

23. The non-transitory computer-readable storage medium of claim 18, wherein displaying the first user interface further includes:

displaying, via the display generation component, a second indication that a second subset of the one or more pieces of digital identification credential information will be transmitted to the external electronic device and will be stored by the external electronic device.

24. The non-transitory computer-readable storage medium of claim 18, wherein the one or more programs further include instructions for:

prior to receiving the request for digital identification from the external electronic device, forgoing displaying, via the display generation component, any content.

25. The non-transitory computer-readable storage medium of claim 18, wherein the one or more programs further include instructions for:

prior to receiving the request for digital identification from the external electronic device, displaying, via the display generation component, a second user interface different from the first user interface, wherein:

displaying the first user interface includes displaying the first user interface overlaid on the second user interface.

26. The non-transitory computer-readable storage medium of claim 18, wherein the one or more programs further include instructions for:

in response to receiving the request for digital identification credential information from the external electronic device, and prior to displaying the first user interface, displaying a third user interface, different from the first user interface, indicating that a connection is being established with the external electronic device.

27. The non-transitory computer-readable storage medium of claim 18, wherein:

the one or more user inputs includes biometric information corresponding to a user of the computer system; and the one or more information transmission criteria includes a criterion that is satisfied if the biometric information corresponds to a biometric profile associated with the digital identification credential stored on the computer system.

28. The non-transitory computer-readable storage medium of claim 27, wherein the biometric information includes a facial scan, and the biometric profile is a facial scan profile.

29. The non-transitory computer-readable storage medium of claim 27, wherein the biometric information includes a fingerprint scan, and the biometric profile is a fingerprint scan profile.

30. The non-transitory computer-readable storage medium of claim 27, wherein:

the digital identification credential is associated with a first biometric profile stored on the computer system, and is not associated with a second biometric profile stored on the computer system; and the one or more information transmission criteria includes a biometric criterion that is satisfied when the biometric information corresponds to a biometric profile associated with the digital identification credential; and the one or more programs further include instructions for:

in response to detecting the one or more user inputs, in accordance with a determination that the biometric information corresponds to the second biometric profile, forgoing transmitting the one or more pieces of digital identification credential information requested by the external electronic device to the external electronic device.

31. The non-transitory computer-readable storage medium of claim 18, wherein the one or more programs further include instructions for:

in response to detecting the one or more user inputs:

in accordance with the determination that the one or more user inputs satisfy the one or more information transmission criteria, storing, on the computer system, first transmission instance information corresponding to the transmitting the one or more pieces of digital identification credential information to the external electronic device.

32. The non-transitory computer-readable storage medium of claim 31, wherein the one or more programs further include instructions for:

subsequent to storing the first transmission instance information on the computer system, displaying, via the display generation component, a fourth user interface including representations of a plurality of digital credentials, including the digital identification credential;

while displaying the fourth user interface, detecting, via the one or more input devices, a second set of user inputs corresponding to a request to display representations of a plurality of transmission instances corresponding to the digital identification credential;

in response to detecting the second set of user inputs, displaying, via the display generation component, representations of a plurality of transmission instances, including a first representation corresponding to the first transmission instance information;

while displaying the first representation, detecting, via the one or more input devices, a third set of user inputs corresponding to selection of the first representation; and in response to detecting the third set of user inputs:

displaying, via the display generation component, at least a subset of the first transmission instance information.

33. The non-transitory computer-readable storage medium of claim 31, wherein:

the first transmission instance information includes:

identification of one or more pieces of digital identification credential information that was transmitted to the external electronic device but was not stored by the external electronic device; and identification of one or more pieces of digital identification credential information that was transmitted to the external electronic device and was stored by the external electronic device.

34. The non-transitory computer-readable storage medium of claim 18, wherein:

the digital identification credential is a digital credential of a first type;

the computer system stores one or more digital credentials of the first type; and the computer system stores one or more digital credentials of a second type;

the one or more digital credentials of the second type are configured to be authorized for transmission of digital information to an external device before and/or after the computer system detects a nearby external device; and the one or more digital credentials of the first type are not configured to be authorized to transmit digital information to an external device until the external device has been detected by the computer system, and the computer system has displayed, via the display generation component, digital information being requested by the external device.

35. The non-transitory computer-readable storage medium of claim 18, wherein the one or more programs further include instructions for:

receiving, via the one or more input devices, a second request for digital credential information from a second external electronic device that is separate from the computer system, wherein the second request for digital credential information is received via a first connection channel;

in response to receiving the second request for digital credential information from the second external electronic device:

in accordance with a determination that the second request for digital credential information corresponds to a request for digital credential information corresponding to a digital credential of a second type and that a first set of transmission conditions have been satisfied, transmitting digital credential information to the second external electronic device via the first connection channel; and in accordance with a determination that the second request for digital credential information corresponds to a request for digital credential information from a digital credential of a first type and that a second set of transmission conditions have been satisfied, transmitting digital credential information to the second external electronic device via a second connection channel separate from the first connection channel.

36. The method of claim 19, further comprising:
in response to receiving the request for digital identification from the external electronic device:
in accordance with a determination that the external electronic device is not authorized to receive digital identification credential information:
displaying, via the display generation component, a notification indicating that the external electronic device is not authorized to receive digital identification credential information.

37. The method of claim 19, wherein:
displaying the first user interface further includes displaying identifying information identifying an entity corresponding to the external electronic device.

38. The method of claim 19, wherein the one or more pieces of digital identification credential information represents a subset of digital identification credential information associated with the digital identification credential stored on the computer system.

39. The method of claim 19, wherein displaying the first user interface further includes:
displaying, via the display generation component, a second indication that a second subset of the one or more pieces of digital identification credential information will be transmitted to the external electronic device and will be stored by the external electronic device.

40. The method of claim 19, further comprising:
prior to receiving the request for digital identification from the external electronic device, forgoing displaying, via the display generation component, any content.

41. The method of claim 19, further comprising:
prior to receiving the request for digital identification from the external electronic device, displaying, via the display generation component, a second user interface different from the first user interface, wherein:
displaying the first user interface includes displaying the first user interface overlaid on the second user interface.

42. The method of claim 19, further comprising:
in response to receiving the request for digital identification credential information from the external electronic device, and prior to displaying the first user interface, displaying a third user interface, different from the first user interface, indicating that a connection is being established with the external electronic device.

43. The method of claim 19, wherein:
the one or more user inputs includes biometric information corresponding to a user of the computer system; and
the one or more information transmission criteria includes a criterion that is satisfied if the biometric information corresponds to a biometric profile associated with the digital identification credential stored on the computer system.

44. The method of claim 43, wherein the biometric information includes a facial scan, and the biometric profile is a facial scan profile.

45. The method of claim 43, wherein the biometric information includes a fingerprint scan, and the biometric profile is a fingerprint scan profile.

46. The method of claim 43, wherein:
the digital identification credential is associated with a first biometric profile stored on the computer system, and is not associated with a second biometric profile stored on the computer system; and
the one or more information transmission criteria includes a biometric criterion that is satisfied when the biometric information corresponds to a biometric profile associated with the digital identification credential; and
the method further comprising:
in response to detecting the one or more user inputs, in accordance with a determination that the biometric information corresponds to the second biometric profile, forgoing transmitting the one or more pieces of digital identification credential information requested by the external electronic device to the external electronic device.

47. The method of claim 19, further comprising:
in response to detecting the one or more user inputs:
in accordance with the determination that the one or more user inputs satisfy the one or more information transmission criteria, storing, on the computer system, first transmission instance information corresponding to the transmitting the one or more pieces of digital identification credential information to the external electronic device.

48. The method of claim 47, further comprising:
subsequent to storing the first transmission instance information on the computer system, displaying, via the display generation component, a fourth user interface including representations of a plurality of digital credentials, including the digital identification credential;
while displaying the fourth user interface, detecting, via the one or more input devices, a second set of user inputs corresponding to a request to display representations of a plurality of transmission instances corresponding to the digital identification credential;
in response to detecting the second set of user inputs, displaying, via the display generation component, representations of a plurality of transmission instances, including a first representation corresponding to the first transmission instance information;
while displaying the first representation, detecting, via the one or more input devices, a third set of user inputs corresponding to selection of the first representation; and
in response to detecting the third set of user inputs:
displaying, via the display generation component, at least a subset of the first transmission instance information.

49. The method of claim 47, wherein:

the first transmission instance information includes:

identification of one or more pieces of digital identification credential information that was transmitted to the external electronic device but was not stored by the external electronic device; and identification of one or more pieces of digital identification credential information that was transmitted to the external electronic device and was stored by the external electronic device.

50. The method of claim 19, wherein:

the digital identification credential is a digital credential of a first type;

the computer system stores one or more digital credentials of the first type; and the computer system stores one or more digital credentials of a second type;

the one or more digital credentials of the second type are configured to be authorized for transmission of digital information to an external device before and/or after the computer system detects a nearby external device; and the one or more digital credentials of the first type are not configured to be authorized to transmit digital information to an external device until the external device has been detected by the computer system, and the computer system has displayed, via the display generation component, digital information being requested by the external device.

51. The method of claim 19, further comprising:

receiving, via the one or more input devices, a second request for digital credential information from a second external electronic device that is separate from the computer system, wherein the second request for digital credential information is received via a first connection channel;

in response to receiving the second request for digital credential information from the second external electronic device:

in accordance with a determination that the second request for digital credential information corresponds to a request for digital credential information corresponding to a digital credential of a second type and that a first set of transmission conditions have been satisfied, transmitting digital credential information to the second external electronic device via the first connection channel; and in accordance with a determination that the second request for digital credential information corresponds to a request for digital credential information from a digital credential of a first type and that a second set of transmission conditions have been satisfied, transmitting digital credential information to the second external electronic device via a second connection channel separate from the first connection channel.

* * * * *